(12) United States Patent
Koshino et al.

(10) Patent No.: US 6,785,465 B1
(45) Date of Patent: Aug. 31, 2004

(54) DISK APPARATUS, VIDEO/AUDIO DATA PROCESSOR, AND VIDEO/AUDIO CONTROL METHOD THAT DETECT AUDIOVISUAL FRAME INFORMATION TO CONTROL OUTPUT

(75) Inventors: Toshiharu Koshino, Kadoma (JP); Toshiki Yamamura, Suita (JP); Yuji Nagaishi, Daito (JP); Tsukasa Yoshiura, Hirakata (JP); Yasushi Ayaki, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/485,881
(22) PCT Filed: Jun. 11, 1999
(86) PCT No.: PCT/JP99/03153
§ 371 (c)(1),
(2), (4) Date: May 4, 2000
(87) PCT Pub. No.: WO99/66507
PCT Pub. Date: Dec. 23, 1999

(30) Foreign Application Priority Data

Jun. 17, 1998 (JP) .......................................... 10-169634
Jul. 29, 1998 (JP) .......................................... 10-229324

(51) Int. Cl.[7] .............................. H04N 9/89; H04N 9/79; H04N 7/08; H04N 5/91

(52) U.S. Cl. ............................ 386/105; 386/15; 386/45; 386/92; 386/105; 386/106

(58) Field of Search ................................. 386/113, 116, 386/66, 109, 125–126, 111, 107, 117, 67, 124, 46; 360/32; 369/50, 47, 48

(56) References Cited

U.S. PATENT DOCUMENTS 5,737,481 A    4/1998  Gushima et al.
6,233,391 B1 * 5/2001  Morikawa et al. ............. 386/67
6,661,755 B2 * 12/2003 Yamamoto ............... 369/47.33

FOREIGN PATENT DOCUMENTS

| JP | 8237588    | 9/1996 |
| JP | 8-237588   | 9/1996 |
| JP | 10-93902   | 4/1998 |
| JP | 10145435 A | 5/1998 |
| JP | 10254811 A | 9/1998 |

* cited by examiner

Primary Examiner—Chris Kelley
Assistant Examiner—Jamie Vent
(74) Attorney, Agent, or Firm—Akin Gump Strauss Hauer & Feld, L.L.P.

(57) ABSTRACT

The disk apparatus and the audiovisual data processing apparatus in accordance with the present invention are apparatuses having a stream data processing function and virtually provided with each command processing function for digital VCRs so as to be capable of meeting various processing requests from external apparatuses; and they are configured so that the audiovisual frame boundaries of audiovisual data are detected, so that audiovisual data received externally and continuously is divided in audiovisual frame units in accordance with the detected audiovisual frame boundaries, and so that the data divided in audiovisual frame units is controlled so as to be stored on a disk medium.

Furthermore, the audiovisual control method in accordance with the present invention is configured to carry out control so that the audiovisual frame boundaries of audiovisual data are detected, and so that audiovisual data received externally and continuously is divided in audiovisual frame units in accordance with the detected audiovisual frame boundaries.

16 Claims, 84 Drawing Sheets

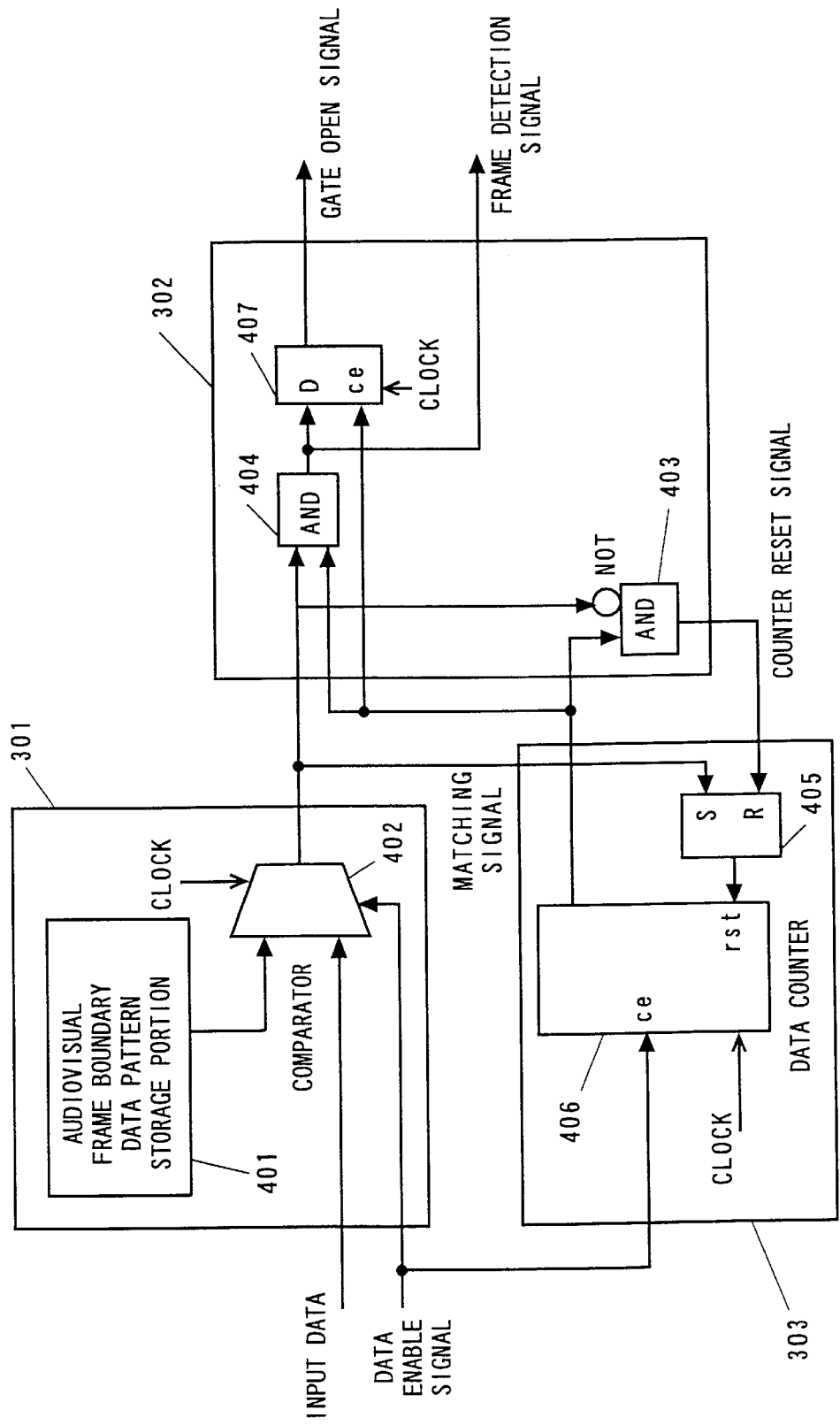
F I G. 5 a. HEAD ADDRESS OF RECORDING AREA OF MAGNETIC DISK
b. END ADDRESS OF RECORDING AREA OF MAGNETIC DISK
c. RECORD START ADDRESS OF HEAD AUDIOVISUAL FRAME DATA
d. RECORD START ADDRESS OF END AUDIOVISUAL FRAME DATA
e. HEAD ADDRESS OF UNRECORDED AREA

FIG. 3.5

FIG. 36 FORWARD DIRECTION/NORMAL-SPEED PLAYBACK

FIG. 38  FORWARD DIRECTION/HIGH-SPEED PLAYBACK

FIG. 39  FORWARD DIRECTION/HIGH-SPEED PLAYBACK

FIG. 40 REVERSE DIRECTION/NORMAL-SPEED PLAYBACK

FIG. 41  REVERSE DIRECTION/HIGH-SPEED PLAYBACK

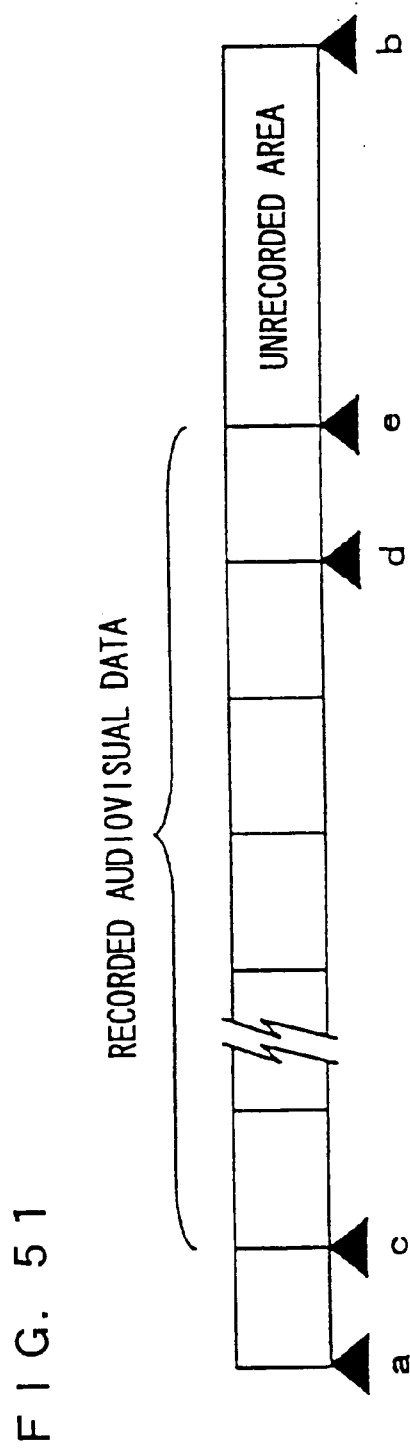

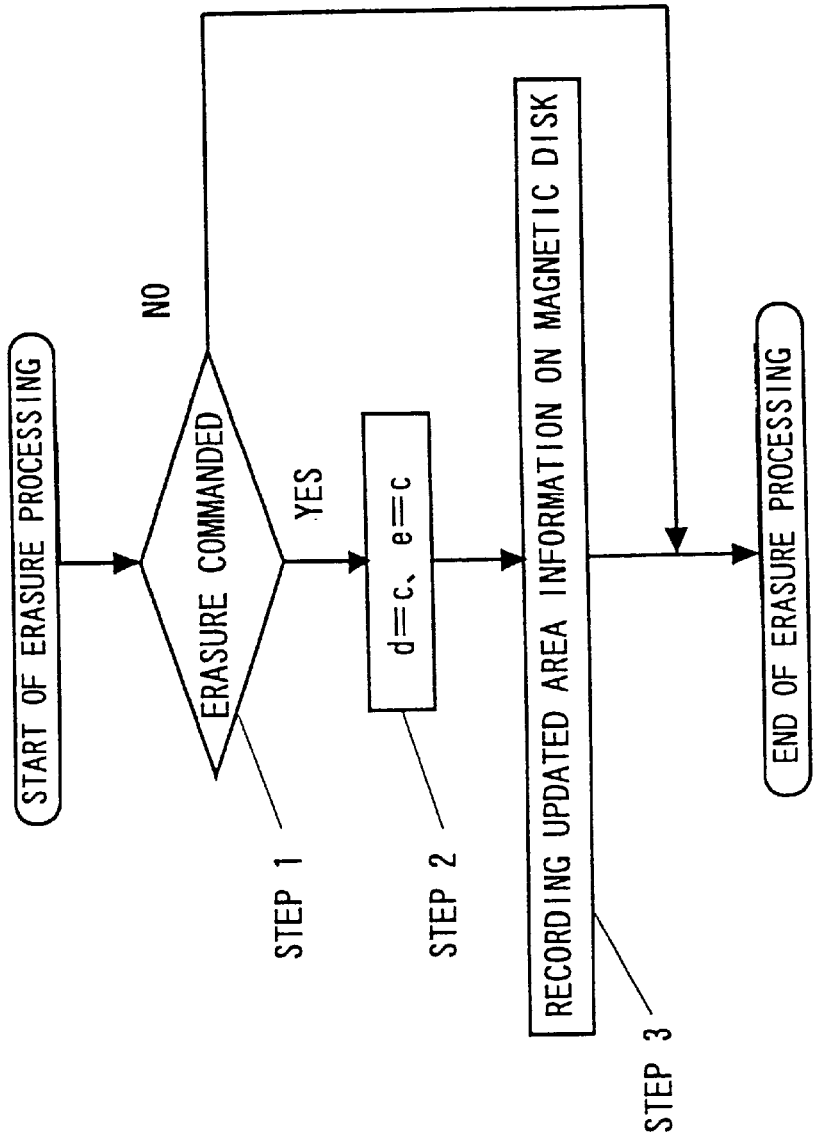
F I G. 5 2

FIG. 61

| RECORD START ADDRESS | TIME CODE | ABSOLUTE TRACK NUMBER |
|---|---|---|
| AD1 | TC1 | ATN1 |
| AD2 | TC2 | ATN2 |
| AD3 | TC3 | ATN3 |
| ------ | ------ | ------ |

FIG. 66

MARK INFORMATION STORED IN MAGNETIC DISK APPARATUS

| RECORD START ADDRESS | TIME CODE | ABSOLUTE TRACK NUMBER |
|---|---|---|
| AD1 | TC1 | ATN1 |
| AD4 | TC4 | ATN4 |
| AD6 | TC6 | ATN6 |

EXTERNALLY RECEIVED MARK INFORMATION AND RECORD START ADDRESS

| RECORD START ADDRESS | TIME CODE | ABSOLUTE TRACK NUMBER |
|---|---|---|
| AD2 | TC2 | ATN2 |
| AD3 | TC3 | ATN3 |
| AD5 | TC5 | ATN5 |

UPDATED MARK INFORMATION IN MAGNETIC DISK APPARATUS

| RECORD START ADDRESS | TIME CODE | ABSOLUTE TRACK NUMBER |
|---|---|---|
| AD1 | TC1 | ATN1 |
| AD2 | TC2 | ATN2 |
| AD3 | TC3 | ATN3 |
| AD5 | TC5 | ATN5 |
| AD6 | TC6 | ATN6 |

FIG. 68

| TRANSMISSION FORMAT OF MARK INFORMATION |
|---|
| N (MARK INFORMATION AMOUNT) |
| ATN1 (ABSOLUTE TRACK NUMBER) |
| ATN2 (ABSOLUTE TRACK NUMBER) |
| ATN3 (ABSOLUTE TRACK NUMBER) |
| ATN4 (ABSOLUTE TRACK NUMBER) |
| ATN5 (ABSOLUTE TRACK NUMBER) |
| ---- |
| ATNN (ABSOLUTE TRACK NUMBER) |

F I G. 8 2
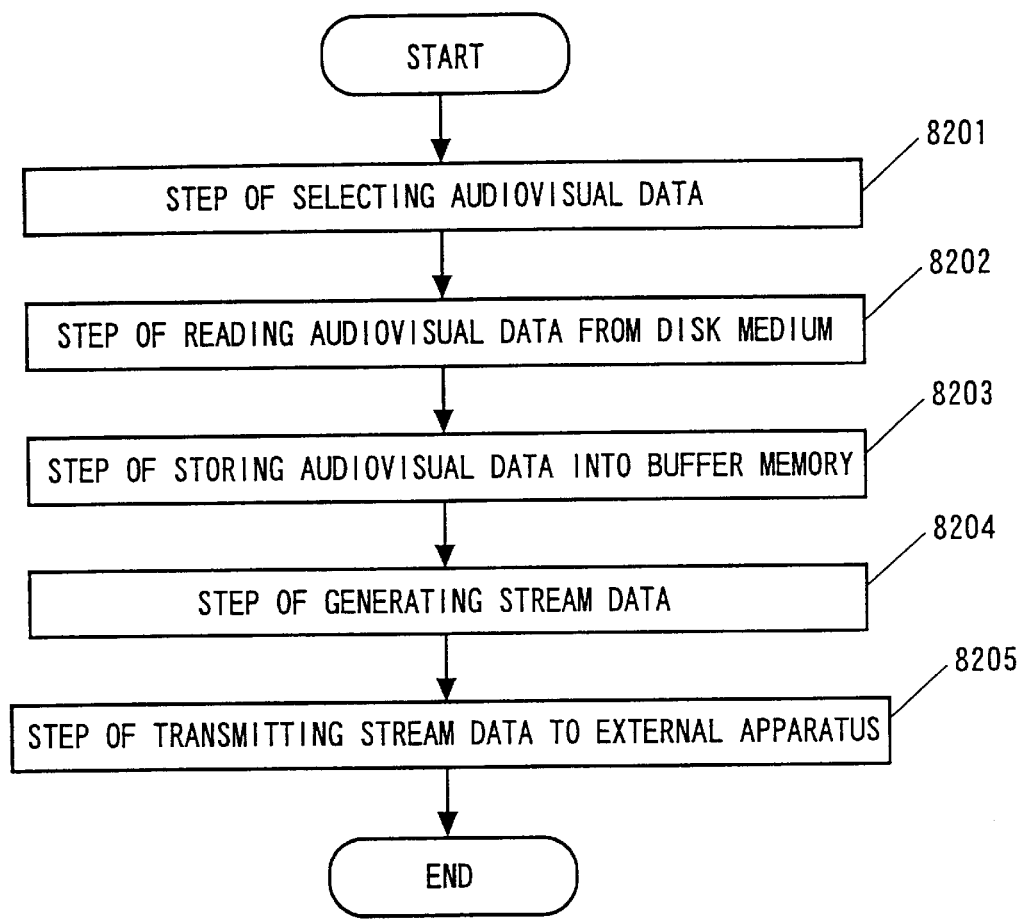

F I G. 8 3
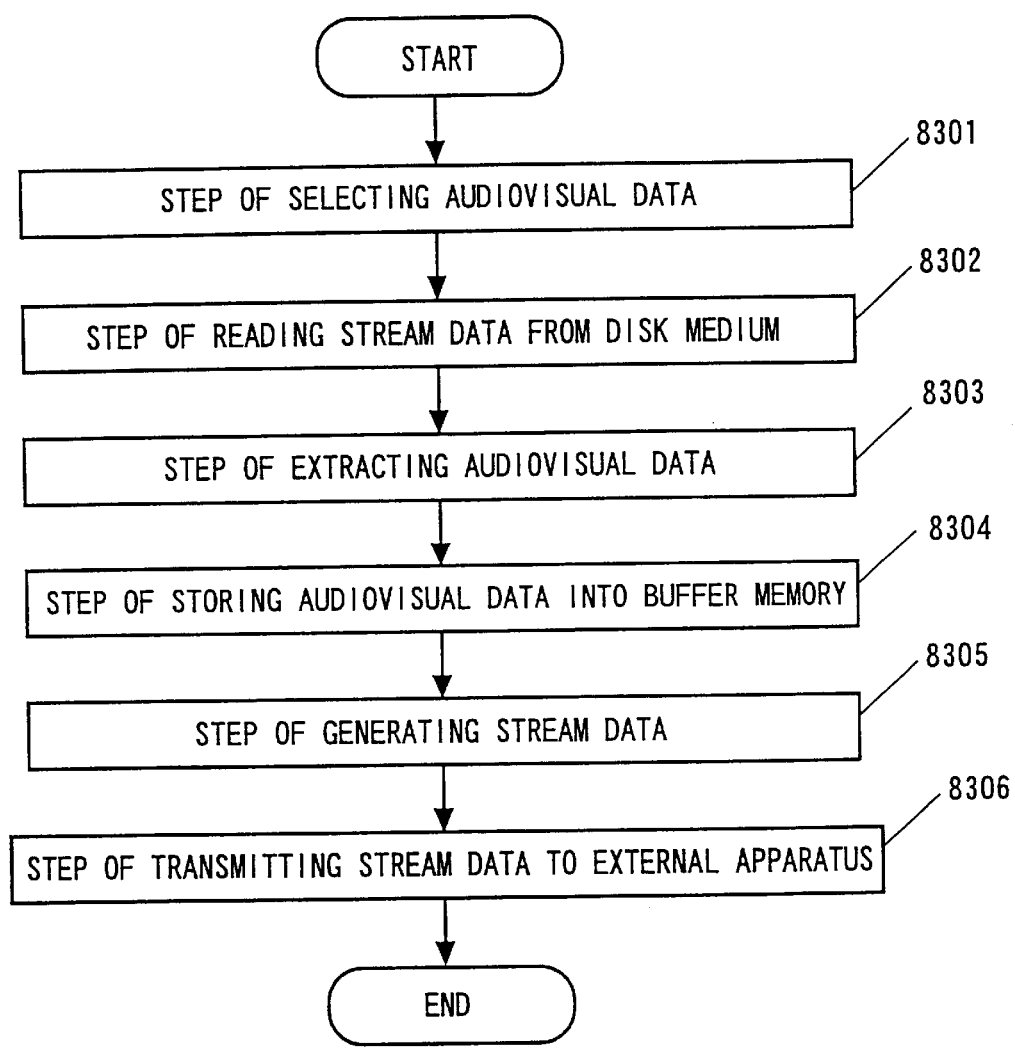

DISK APPARATUS, VIDEO/AUDIO DATA PROCESSOR, AND VIDEO/AUDIO CONTROL METHOD THAT DETECT AUDIOVISUAL FRAME INFORMATION TO CONTROL OUTPUT

TECHNICAL FIELD

The present invention relates to a disk apparatus such as a hard disk apparatus, more particularly to a disk apparatus capable of recording and playing back audiovisual data input continuously via a digital interface in audiovisual frame units, to an audiovisual data processing apparatus, and to an audiovisual control method for processing audiovisual data in audiovisual frame units.

BACKGROUND ART

In recent years, disk apparatuses, such as magnetic disk apparatuses and optical disk apparatuses, have been improved rapidly in performance regarding recording capacity and transfer speed, and have been used frequently for recording and playback of audiovisual data, i.e., moving picture data. In particular, the performance of hard disk apparatuses has been improved significantly, and hard disk apparatuses have been used for video servers and the like for carrying out storage, delivery and the like of audiovisual data.

In comparison with data, such as programs, processed by computers, audiovisual data is characterized in that it is uninterrupted continuous data (hereinafter referred to as stream data).

In a conventional magnetic disk apparatus, writing processing is required to be carried out in data block units, each having a predetermined size (hereinafter referred to as block data). Furthermore, the reading processing of the conventional magnetic disk apparatus is also required to be carried out in block data units on a magnetic disk, just like the writing processing.

Therefore, when stream data is recorded in the conventional magnetic disk apparatus, block data to be written is generated by dividing stream data at an external apparatus, and transmitted to the magnetic disk apparatus in block data units. Furthermore, the record address on the magnetic disk wherein block data should be written is also selected by the external apparatus and notified to the magnetic disk apparatus.

In accordance with a data writing request from the external apparatus and on the basis of the record address notified by the external apparatus, the conventional magnetic disk apparatus sequentially writes the data of the external apparatus in the following recording area.

In recent years, the development of digital interfaces has advanced, and the digital interfaces of the IEEE 1394 Standard have been mounted on digital VCR apparatuses as standard equipment. In the IEEE 1394 Standard, an ISOCHRONOUS transfer system is stipulated as a system for transmitting stream data between digital apparatuses.

In the transfer system using the IEEE 1394, a transfer system for digital VCR format audiovisual data is stipulated in IEC 61883, for example.

A digital apparatus, such as a digital VCR, having the above-mentioned IEEE 1394 interface as standard equipment is examined in a form wherein connection is carried out without using any host apparatus (an apparatus for controlling apparatuses connected to buses), and stream data is transmitted mutually.

However, no hard disk is available which has a digital interface provided with the ISOCHRONOUS transfer function of the IEEE 1394 Standard; in the case that stream data is transferred from an external apparatus to a conventional hard disk apparatus, a conventional transfer system wherein stream data is divided by the external apparatus and transferred is used.

When a digital VCR provided with the digital interface of the IEEE 1394 Standard is connected to the hard disk apparatus, it is necessary to add a special apparatus having the function of processing the above-mentioned stream data.

Furthermore, as the stream data processing functions in the digital VCR, commands, such as the record start command (hereinafter referred to as the REC command) and the playback start command (hereinafter referred to as the PLAY command) are used usually; however, the conventional hard disk apparatus does not have functions of processing these commands.

Furthermore, information on playback speed, playback direction or the like is added to the PLAY command and then transmitted; however, the conventional hard disk apparatus does not have means for carrying out the processing corresponding to the information.

DISCLOSURE OF THE INVENTION

In consideration of the above-mentioned problems, the present invention intends to provide a disk apparatus, an audiovisual data processing apparatus and an audiovisual control method, wherein a stream data processing function is newly added to a hard disk apparatus, and command processing functions for digital VCRs are provided virtually so as to meet various processing requests from external apparatuses.

In order to attain the above-mentioned objects, a disk apparatus in accordance with the present invention comprises:

a disk medium capable of recording/playing back data, a buffer memory for temporarily storing audiovisual data, buffer memory control means for controlling the input/output of the above-mentioned audiovisual data for the above-mentioned buffer memory, audiovisual frame detection means for detecting audiovisual frame boundaries from the above-mentioned audiovisual data and for outputting a detection signal, data division management means for dividing the above-mentioned audiovisual data depending on the above-mentioned detection signal and for forming the management information of the divided data, and writing means for writing the above-mentioned audiovisual data on the above-mentioned disk medium in accordance with the above-mentioned management information.

The disk apparatus of the present invention configured as described above is configured so that the audiovisual frame boundaries of audiovisual data are detected, and audiovisual data externally received continuously is divided in audiovisual frame units in accordance with the detected audiovisual frame boundaries, whereby the writing of the audiovisual data on a disk medium can be controlled in the divided audiovisual frame units.

Furthermore, in the disk apparatus of the present invention, audiovisual data can be written on a disk medium in audiovisual frame units at the timing of detecting audiovisual frame boundaries, whereby, when audiovisual frames are received periodically (DV data and the like transmitted on the IEEE 1394 bus), the recording of the audiovisual frames on the disk medium can be carried out periodically.

A disk apparatus in accordance with the present invention from another aspect comprises:

a disk medium capable of recording/playing back data, a buffer memory for temporarily storing audiovisual data, playback data selection means for selecting the above-mentioned audiovisual data to be output externally from among the above-mentioned audiovisual data recorded on the above-mentioned disk medium, reading means for reading the above-mentioned audiovisual data selected by the above-mentioned playback data selection means from the above-mentioned disk medium, buffer memory control means for storing the above-mentioned audiovisual data read from the above-mentioned disk medium into the above-mentioned buffer memory, and stream data generation means for generating stream data by combining the data stored in the above-mentioned buffer memory and for externally outputting the above-mentioned stream data continuously.

In the disk apparatus of the present invention configured as described above, an external apparatus connected to the disk apparatus can play back the audiovisual data stored on the disk medium in the same procedure as that carried out when the playback start command is used for a VCR apparatus, whereby the external apparatus can be provided with the same operability as that of the VCR apparatus.

A disk apparatus in accordance with the present invention from another aspect comprises:

a disk medium capable of recording/playing back data, record/playback means for recording/playing back data on the above-mentioned disk medium, a buffer memory for temporarily storing the above-mentioned audiovisual data, buffer memory control means for controlling the input/output of the above-mentioned audiovisual data to the above-mentioned buffer memory, playback-data selection means for selecting data to be output externally, reading means for reading the above-mentioned audiovisual data selected by the above-mentioned playback data selection means from the above-mentioned disk apparatus via the above-mentioned external disk interface means, data extraction means for extracting the above-mentioned audiovisual data to be output externally from among the above-mentioned audiovisual data read from the above-mentioned disk medium, and stream data generation means for combining and externally outputting the above-mentioned audiovisual data extracted by the above-mentioned data extraction means.

The disk apparatus of the present invention configured as described above has a function of extracting audiovisual data to be externally transmitted from among the audiovisual data read from a disk medium, whereby the writing or reading unit of audiovisual data for the disk medium can be set as desired, and the writing/reading control for the disk medium can be carried out easily.

A disk apparatus in accordance with the present invention from another aspect comprises:

a disk medium capable of recording/playing back data, record/playback means for recording/playing back data on the above-mentioned disk medium, a buffer memory for temporarily storing audiovisual data, disposed between the above-mentioned record/playback means and an interface to an external apparatus, buffer memory control means for controlling the input/output of the above-mentioned audiovisual data for the above-mentioned buffer memory, and audiovisual frame detection means for detecting audiovisual frame boundaries from the above-mentioned audiovisual data and for outputting a detection signal.

The disk apparatus of the present invention configured as described above can grasp audiovisual data in audiovisual frame time units by the detection signal output by the audiovisual frame detection means, and can easily carry out data transfer control. In addition, the disk apparatus of the present invention can easily attain special playback and the like by gaining access to the audiovisual data in the buffer memory in frame units.

A disk apparatus in accordance with the present invention from another aspect comprises:

a disk medium capable of recording/playing back data, record/playback means for recording/playing back data on the above-mentioned disk medium, and recording area management means for managing and updating the recording area information of recorded audiovisual data, wherein the above-mentioned record/playback means carries out data record/playback in the sequence of the addresses on the above-mentioned disk medium, the above-mentioned recording area management means manages and updates the record start address information of the head audiovisual frame data of the above-mentioned recorded audiovisual data, the record start address information of the end audiovisual frame data of the above-mentioned recorded audiovisual data and the head address information of the unrecorded area on the above-mentioned disk medium, and carries out writing in predetermined areas on the above-mentioned disk medium.

The disk apparatus of the present invention configured as described above can manage the audiovisual data recorded on the disk medium without using complicated management means. Furthermore, the disk apparatus of the present invention plays back the audiovisual data on the disk medium on the basis of the address information, whereby the audiovisual data unrecorded portion on the disk medium can be prevented from being played back.

In addition, the disk apparatus of the present invention records audiovisual data on the disk medium on the basis of the address information, whereby continuous additional recording can be carried out without causing unrecorded areas.

An audiovisual data processing apparatus in accordance with the present invention comprises:

external disk interface means for controlling record/playback of audiovisual data for a disk apparatus, external audiovisual apparatus interface means for controlling record/playback of the above-mentioned audiovisual data for an audiovisual apparatus, a buffer memory for temporarily storing the above-mentioned audiovisual data, disposed between the above-mentioned external disk interface means and the above-mentioned audiovisual apparatus interface means, buffer memory control means for controlling the input/output of the above-mentioned audiovisual data for the above-mentioned buffer memory, audiovisual frame detection means for detecting audiovisual frame boundaries from the above-mentioned audiovisual data and for outputting a detection signal, and data division management means for dividing the above-mentioned audiovisual data in accordance with the above-mentioned audiovisual frame boundaries and for forming the management information of the divided data, wherein the above-mentioned external disk interface means is configured to transmit the above-mentioned audiovisual data to the above-mentioned disk apparatus in accordance with the above-mentioned management information.

The audiovisual data processing apparatus in accordance with the present invention configured as described above is configured to detect the audiovisual frame boundaries of audiovisual data and to divide the audiovisual data received continuously from an external apparatus in accordance with the detected audiovisual frame boundaries in audiovisual frame units, whereby the writing of audiovisual data on a disk medium can be controlled in divided audiovisual frame units.

Furthermore, in the audiovisual data processing apparatus of the present invention, audiovisual data can be written on a disk medium in audiovisual frame units at the timing of detecting audiovisual frame boundaries, whereby the recording of audiovisual frames on the disk medium can be carried out periodically in the case that the audiovisual frames are received periodically (DV data or the like transmitted on the IEEE 1394 bus).

An audiovisual data processing apparatus in accordance with the present invention from another aspect comprises:

external disk interface means for controlling record/playback of audiovisual data for a disk apparatus, external audiovisual apparatus interface means for controlling record/playback of the above-mentioned audiovisual data for an audiovisual apparatus, a buffer memory for temporarily storing the above-mentioned audiovisual data, disposed between the above-mentioned external disk interface means and the above-mentioned audiovisual apparatus interface means, buffer memory control means for controlling the input/output of the above-mentioned audiovisual data for the above-mentioned buffer memory, playback data selection means for selecting the above-mentioned audiovisual data to be transmitted to the above-mentioned external audiovisual apparatus interface means from among the above-mentioned audiovisual data recorded in the above-mentioned disk apparatus, reading means for reading the above-mentioned audiovisual data selected by the above-mentioned playback data selection means from the above-mentioned disk apparatus to the above-mentioned buffer memory via the above-mentioned external disk interface means, and stream data generation means for generating stream data by combining the data stored in the above-mentioned buffer memory and for transmitting to the above-mentioned stream data continuously to an external apparatus via the above-mentioned external audiovisual apparatus interface means.

In the audiovisual data processing apparatus of the present invention configured as described above, an external apparatus connected to the audiovisual data processing apparatus can play back the audiovisual data stored on the disk medium in the same procedure as that carried out when the playback start command is used for a VCR apparatus, whereby the external apparatus can be provided with the same operability as that of the VCR apparatus.

An audiovisual data processing apparatus in accordance with the present invention from another aspect comprises:

external disk interface means for controlling record/playback of audiovisual data for an external disk apparatus, external audiovisual apparatus interface means for controlling record/playback of the above-mentioned audiovisual data for an external audiovisual apparatus, a buffer memory for temporarily storing the above-mentioned audiovisual data, disposed between the above-mentioned external disk interface means and the above-mentioned external audiovisual apparatus interface means, buffer memory control means for controlling the input/output of the above-mentioned audiovisual data for the above-mentioned buffer memory, playback data selection means for selecting the above-mentioned audiovisual data to be transmitted to the above-mentioned external audiovisual apparatus interface means from among the above-mentioned audiovisual data recorded in the above-mentioned disk apparatus, reading means for reading the above-mentioned audiovisual data selected by the above-mentioned playback data selection means from the above-mentioned disk apparatus to the above-mentioned buffer memory via the above-mentioned external disk interface means, data extraction means for extracting the above-mentioned audiovisual data to be output externally from among the above-mentioned audiovisual data read from the above-mentioned disk apparatus, and stream data generation means for combining and externally outputting the above-mentioned audiovisual data extracted by the above-mentioned data extraction means.

The audiovisual data processing apparatus of the present invention configured as described above has a function of extracting audiovisual data to be externally transmitted from among the audiovisual data read from a disk medium, whereby the writing or reading unit of audiovisual data for the disk medium can be set as desired, and the writing/reading control for the disk medium can be carried out easily.

An audiovisual data processing apparatus in accordance with the present invention from another aspect comprises:

external disk interface means for controlling record/playback of audiovisual data for an external disk apparatus, external audiovisual apparatus interface means for controlling record/playback of the above-mentioned audiovisual data for an external audiovisual apparatus, a buffer memory for temporarily storing the above-mentioned audiovisual data, disposed between the above-mentioned external disk interface means and the above-mentioned external audiovisual apparatus interface means, buffer memory control means for controlling the input/output of the above-mentioned audiovisual data for the above-mentioned buffer memory, and audiovisual frame detection means for detecting audiovisual frame boundaries from the above-mentioned audiovisual data and for outputting a detection signal.

The audiovisual data processing apparatus of the present invention configured as described above can grasp audiovisual data in audiovisual frame time units by the detection signal output by the audiovisual frame detection means, and can easily carry out data transfer control. In addition, the audiovisual data processing apparatus of the present invention can easily attain special playback and the like by gaining access to the audiovisual data in the buffer-memory in frame units.

An audiovisual data processing apparatus in accordance with the present invention from another aspect comprises:

external disk interface means for controlling record/playback of audiovisual data for an external disk apparatus, external audiovisual apparatus interface means for controlling record/playback of the above-mentioned audiovisual data for an external audiovisual apparatus, and recording area management means for managing and updating the record start address information of the head audiovisual frame data of the above-mentioned recorded audiovisual data, the record start address information of the end audiovisual frame data of the above-mentioned recorded audiovisual data and the head address information of the unrecorded area in the above-mentioned disk apparatus as the area information of the recorded audiovisual data recorded in the above-mentioned disk apparatus, and for carrying out writing in predetermined areas in the above-mentioned disk apparatus.

The audiovisual data processing apparatus of the present invention configured as described above can manage the audiovisual data recorded on the disk medium without using complicated management means. Furthermore, the audiovisual data processing apparatus of the present invention plays back the audiovisual data on the disk medium on the basis of the address information, whereby the audiovisual data unrecorded portion on the disk medium can be prevented from being played back.

In addition, the audiovisual data processing apparatus of the present invention records audiovisual data on the disk medium on the basis of the address information, whereby continuous additional recording can be carried out without causing unrecorded areas.

An audiovisual control method in accordance with the present invention comprises:

a step of temporarily storing audiovisual data in a buffer memory, a step of detecting the audiovisual frame boundaries of the above-mentioned audiovisual data, a step of dividing the above-mentioned audiovisual data in accordance with the above-mentioned detected audiovisual frame boundaries, and of forming the management information of the divided audiovisual data, and a step of transmitting the above-mentioned audiovisual data to a disk medium in accordance with the above-mentioned management information.

In the audiovisual control method of the present invention having the above-mentioned steps, the audiovisual frame boundaries of audiovisual data are detected, and audiovisual data externally received continuously in accordance with the detected audiovisual frame boundaries is divided in audiovisual frame units, whereby the writing of the audiovisual data on a disk medium can be controlled in the divided audiovisual frame units.

Furthermore, in the audiovisual control method of the present invention, audiovisual data can be written on a disk medium in audiovisual frame units at the timing of detecting audiovisual frame boundaries, whereby, when audiovisual frames are received periodically (DV data and the like transmitted on the IEEE 1394 bus), the recording of the audiovisual frames on the disk medium can be carried out periodically.

An audiovisual control method in accordance with the invention from another aspect comprises:

a step of reading selected audiovisual data from a disk medium, a step of storing the above-mentioned read audiovisual data in a buffer memory, and a step of generating stream data by combining the above-mentioned stored audiovisual data, and of externally outputting the above-mentioned stream data continuously.

In the audiovisual control method of the present invention having the above-mentioned steps, an external apparatus connected to the audiovisual data processing apparatus can play back the audiovisual data stored on the disk medium in the same procedure as that carried out when the playback start command is used for a VCR apparatus, whereby the external apparatus can be provided with the same operability as that of the VCR apparatus.

An audiovisual control method in accordance with the invention from another aspect comprises:

a step of selecting audiovisual data recorded on a disk medium, a step of reading the above-mentioned selected audiovisual data from said disk medium, a step of extracting audiovisual data to be output externally from the above-mentioned read audiovisual data, a step of storing the extracted audiovisual data in the buffer memory, a step of generating stream data by combining the stored audiovisual data, and a step of externally outputting the above-mentioned generated stream data.

The present invention comprises:

a disk medium capable of recording and playing back data, record/playback means for starting record or playback operation in accordance with a record or playback request from an external apparatus, and for ending the record or playback operation in accordance with the stop or standby request from the external apparatus, and address management means for managing the head address, on the disk medium, of the audiovisual frame data being recorded or played back, or the audiovisual data to be recorded or played back.

The audiovisual control method of the present invention having the above-mentioned steps has a function of extracting audiovisual data to be transmitted from among the audiovisual data read from a disk medium, whereby the writing or reading unit of audiovisual data for the disk medium can be set as desired, and the writing/reading control for the disk medium can be carried out easily.

An audiovisual control method in accordance with an invention from another aspect comprises:

a record/playback processing step of recording/playing audiovisual data to be input from an external apparatus and the above-mentioned audiovisual data to be output to the external apparatus, and a recording area management step of managing and updating the record start address information of the head audiovisual frame data of the above-mentioned recorded audiovisual data, the record start address information of the end audiovisual frame data of the above-mentioned recorded audiovisual data and the head address information of the unrecorded area on the above-mentioned disk medium as the area information of the recorded audiovisual data recorded on the above-mentioned disk medium, and of carrying out writing in predetermined areas on the above-mentioned disk medium.

The audiovisual control method of the present invention having the above-mentioned steps can manage the audiovisual data recorded on the disk medium without using complicated management means. Furthermore, the audiovisual control method of the present invention plays back the audiovisual data on the disk medium on the basis of the address information, whereby the audiovisual data unrecorded portion on the disk medium can be prevented from being played back.

Furthermore, the audiovisual control method of the present invention records audiovisual data on the disk medium on the basis of the address information, whereby continuous additional recording can be carried out without causing unrecorded areas.

BRIEF DESCRIPTION OF THE DRAWINGS

FIG. 5 is a logic circuit diagram of the audiovisual frame detection means in accordance with Embodiment 1 of the present invention;

FIG. 51 is an explanatory view showing address information at the time before erasure is commanded in accordance with Embodiment 1 of the present invention;

FIG. 52 is a flowchart showing the operation procedure in the case that erasure is commanded in accordance with Embodiment 1 of the present invention;

FIG. 61 is an explanatory view showing a series of discontinuous point information in accordance with Embodiment 1 of the present invention;

FIG. 66 is an explanatory view showing mark information update in accordance with Embodiment 1 of the present invention;

FIG. 68 is an explanatory view showing a format at the time of mark information transmission in accordance with Embodiment 1 of the present invention;

FIG. 82 is a flowchart showing the playback processing procedure for the audiovisual data of the hard disk apparatus in accordance with Embodiment 1 of the present invention;

FIG. 83 is a flowchart showing the playback processing procedure for the audiovisual data of the hard disk apparatus in accordance with Embodiment 2 of the present invention.

BEST MODE FOR CARRYING OUT THE INVENTION

Figure 1:
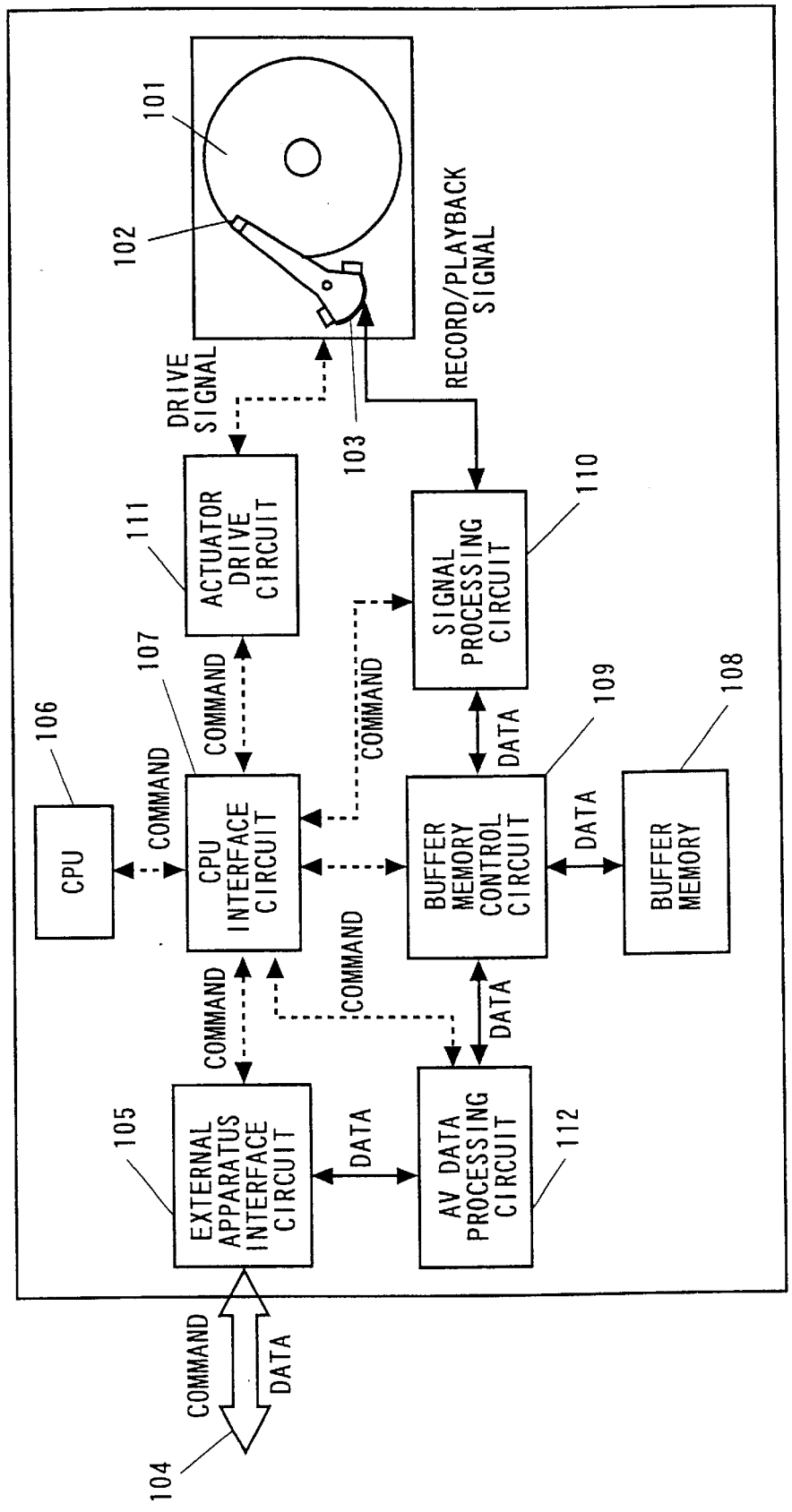
FIG. 1 is a block diagram showing the configuration of a magnetic disk apparatus in accordance with Embodiment 1 of the present invention.

A magnetic disk apparatus in accordance with Embodiment 1, an embodiment of a disk apparatus of the present invention, will be described below referring to the drawings.

Embodiment 1

FIG. 1 is a block diagram showing the configuration of a hard disk apparatus used as a magnetic disk apparatus in accordance with Embodiment 1 of the present invention.

The magnetic disk apparatus of Embodiment 1 shown in FIG. 1 is connected to an input/output bus 104 for transmitting commands and data from an external apparatus (not shown), and an external apparatus interface circuit 105 for transmitting and receiving commands, data and parameters between the circuit and the external apparatus via this input/output bus 104 is provided.

As shown in FIG. 1, the magnetic disk apparatus of Embodiment 1 has a CPU 106, a CPU interface circuit 107 for transmitting and receiving commands and data from this CPU 106, a buffer memory 108 used as a temporary storage circuit, and a buffer memory control circuit 109 used as a buffer memory control means for controlling data input/output to the buffer memory.

The CPU 106 has a function of adding dummy data of a predetermined size to the audiovisual frames of the audiovisual data stored in the buffer memory 108. The specific operations thereof will be described later. In addition, the CPU 106 receives additional information, such as playback direction and playback speed information, corresponding to the PLAY command received from the external apparatus.

The CPU, used as a playback data selection means, has a function of selecting audiovisual data to be transmitted externally in accordance with the additional information in audiovisual frame units. Furthermore, the CPU 106, used as a stream data selection means, carries out control by selecting the audiovisual data stored in the buffer memory in audiovisual frame units and by transmitting the data as continuous data to the external apparatus.

Moreover, the CPU 106, used as a data extraction means, has functions of extracting and selecting only the data to be transmitted to the external apparatus from among the audiovisual data stored in the buffer memory, and of continuously transmitting the data to the external apparatus.

In addition, the magnetic disk apparatus comprises a signal processing circuit 110 for controlling data input/output to the magnetic disk 101, an actuator drive circuit 111 for carrying out the positional control of a magnetic head 102 by providing a drive signal to a positioning mechanism 103, and an audiovisual data processing circuit (hereinafter referred to as an AV data processing circuit) 112 for carrying out predetermined processing in accordance with audiovisual data received via the external apparatus interface circuit 105.

The AV data processing circuit 112, used as a data division management means, has a function of managing the frame boundary information of the audiovisual data, and notifies the frame boundary information to the CPU 106.

In addition, in Embodiment 1, the AV data processing circuit 112 manages the storage address in the buffer memory corresponding to the audiovisual frame head data of the audiovisual data, as frame boundary information.

The signal processing circuit 110, positioning mechanism 103, magnetic head 102 and actuator drive circuit 111 have functions of writing audiovisual data on a disk medium and reading audiovisual data from the disk medium as writing and reading means.

The signal processing circuit 110 shown in FIG. 1 receives write data from the buffer memory 108 via the buffer memory control circuit 109, modulates the input data, inputs the data to the magnetic head 102, and records the data on the magnetic disk 101 as a record signal.

Furthermore, the signal processing circuit 110 demodulates the signal read from the magnetic disk 101 by the magnetic head 102, and outputs the signal to the buffer memory control circuit 109 as read data.

The actuator drive circuit 111 controls the positioning mechanism 103 on the basis of an actuator control signal from a control signal input/output circuit (not shown), and drives the magnetic head 102.

The magnetic disk apparatus of Embodiment 1 is configured so that data is recorded and played back on the magnetic disk 101, a disk-shaped disk medium, by the magnetic head 102, and the magnetic head 102 is positioned by the positioning mechanism 103.

In Embodiment 1, the data recording area on the magnetic disk 101 is divided into regions of 512 byte units (hereinafter referred to as sectors). Data writing and reading on the magnetic disk 101 are carried out in sector units.

The audiovisual data recording procedure for the hard disk apparatus in accordance with Embodiment 1 will be described using the flowchart shown in FIG. 80.

First, at step 8001, audiovisual frame boundaries are detected from among audiovisual data input externally.

Next, at step 8002, the audiovisual data is stored in the buffer memory.

Then, at step 8003, the storage addresses in the buffer memory corresponding to the audiovisual frame boundaries of the audiovisual data are managed, whereby the audiovisual data in the buffer memory is divided and managed in audiovisual frame units.

Next, at step 8004, the audiovisual data is transmitted to the magnetic disk 101, used as a disk medium, in the divided and managed audiovisual frame units.

The audiovisual data playback procedure for the hard disk apparatus in accordance with Embodiment 1 will be described using the flowchart shown in FIG. 82.

First, at step 8201, audiovisual data to be transmitted externally is selected from among the audiovisual data recorded on the magnetic disk 101 in audiovisual frame units.

Next, at step 8202, the selected audiovisual data is read from the magnetic disk 101.

Then, at step 8203, the read audiovisual data is stored in the buffer memory.

Next, at step 8204, the audiovisual data stored in the buffer memory is read sequentially to generate continuous stream data.

Then, at step 8205, the stream data is transmitted externally.

The operation of each function block will be described below.

[AV Data Processing Circuit 112]

Next, the AV data processing circuit 112 of the disk apparatus of Embodiment 1 will be described below.

The external apparatus interface circuit 105 carries out data control in accordance with the IEEE 1394-1995 Standard, and supports the transfer of DV format data standardized by IEC 61883. The external apparatus interface circuit 105 is configured to start the control of data transfer to or from an external apparatus in accordance with transmitted commands and register setting.

The data transfer between the external apparatus interface circuit 105 and the AV data processing circuit 112 is carry out by using a data signal, a data enable signal and a clock signal as described later. At the time of this data transfer, the data signal is transmitted and received in synchronization with the clock signal.

At that time, the data enable signal is used to determine whether the data is valid or invalid. When the data enable signal is high (H) output, this indicates that the data is valid; and when the data enable signal is low (L) output, this indicates that the data is invalid.

The data input from the external apparatus via the input/output bus 104 is output from the external apparatus interface circuit 105 to the AV data processing circuit 112, and processed. Commands and parameters are output to the CPU interface circuit 107, and processed by the CPU 106.

Furthermore, the external apparatus interface circuit 105 outputs the audiovisual data from the buffer memory 108 and the command responses from the CPU 106 to the external apparatus via the input/output bus 104.

Figure 2:
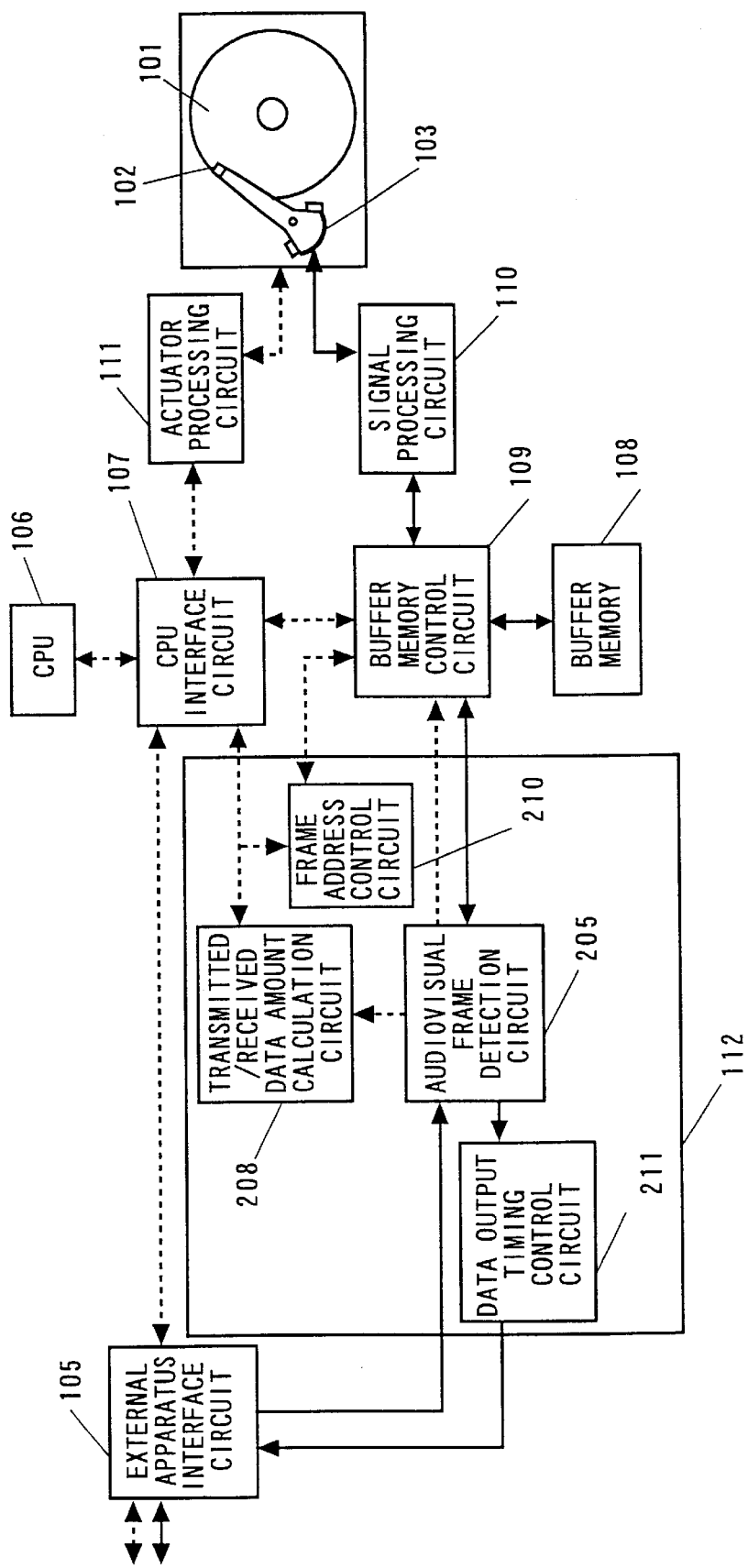
FIG. 2 is a block diagram showing the configuration of an AV data processing circuit in accordance with Embodiment 1 of the present invention.

FIG. 2 is a block diagram showing the details of the AV data processing circuit 112 for attaining the function of the audiovisual frame division management means of the disk apparatus of Embodiment 1.

The AV data processing circuit 112 has a frame address management circuit 210 used as a frame address management means, an audiovisual frame detection circuit 205 used as an audiovisual frame detection means, a transmitted/received data amount calculation circuit 208 used as a transmitted/received data amount calculation means, and a data output timing control circuit 211 used as a data output timing control means.

Audiovisual data is input from the external apparatus interface circuit 105, passes through the AV data processing circuit 112, the buffer memory 108, the signal processing circuit 110 and the like, and is recorded on the magnetic disk 101. At this time, the audiovisual frame detection circuit 205 and the frame address management circuit 210 function as data division management means.

The audiovisual frame detection circuit 205 detects the audiovisual frame boundaries of the input audiovisual data. As frame address information, the frame address management circuit 210 manages the addresses in the buffer memory regarding the frame boundaries at the time when the audiovisual data is stored in the buffer memory 108.

The CPU 106 divides the audiovisual data stored in the buffer memory 108 in audiovisual frame units on the basis of the management information used as this frame address information, and transfers the data to the magnetic disc 101 used as a disc medium.

Figure 80:
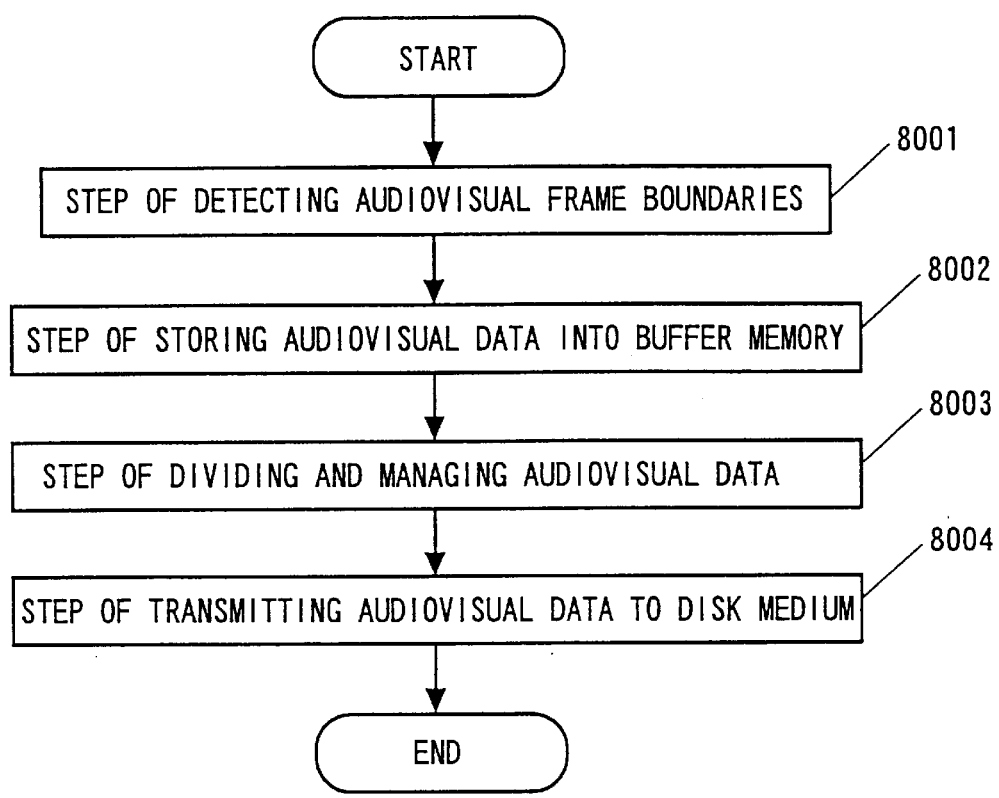
FIG. 80 is a flowchart showing the record processing procedure for the audiovisual data of a hard disk apparatus in accordance with Embodiment 1 of the present invention.

FIG. 80 is a flowchart showing the above-mentioned processing steps for dividing the audiovisual data and transferring it to the disk medium in time series.

First, step (8001) is carried out to detect the audiovisual frame boundaries of the audiovisual data, and the audiovisual data is stored in the buffer memory 108 (8002). In the audiovisual data stored in the buffer memory 108, the addresses of the audiovisual frame boundaries in the buffer memory are recognized, and the audiovisual data stored in the buffer memory 108 is divided and managed in audiovisual frame units (8003). Next, the audiovisual data is divided and transmitted to the magnetic disk 101 used as a disk medium (8004).

The audiovisual data recorded on the magnetic disk 101 passes through the signal processing circuit 110, the buffer memory 108, the AV data processing circuit 112 and the like, and is output to an external audiovisual apparatus via the external apparatus interface circuit 105.

When the audiovisual data is input to the AV data processing circuit 112, each of the above-mentioned circuits of the disk apparatus processes the audiovisual data. The processing will be described below in detail.

[Audiovisual Frame Detection Circuit 205]

Figure 3:
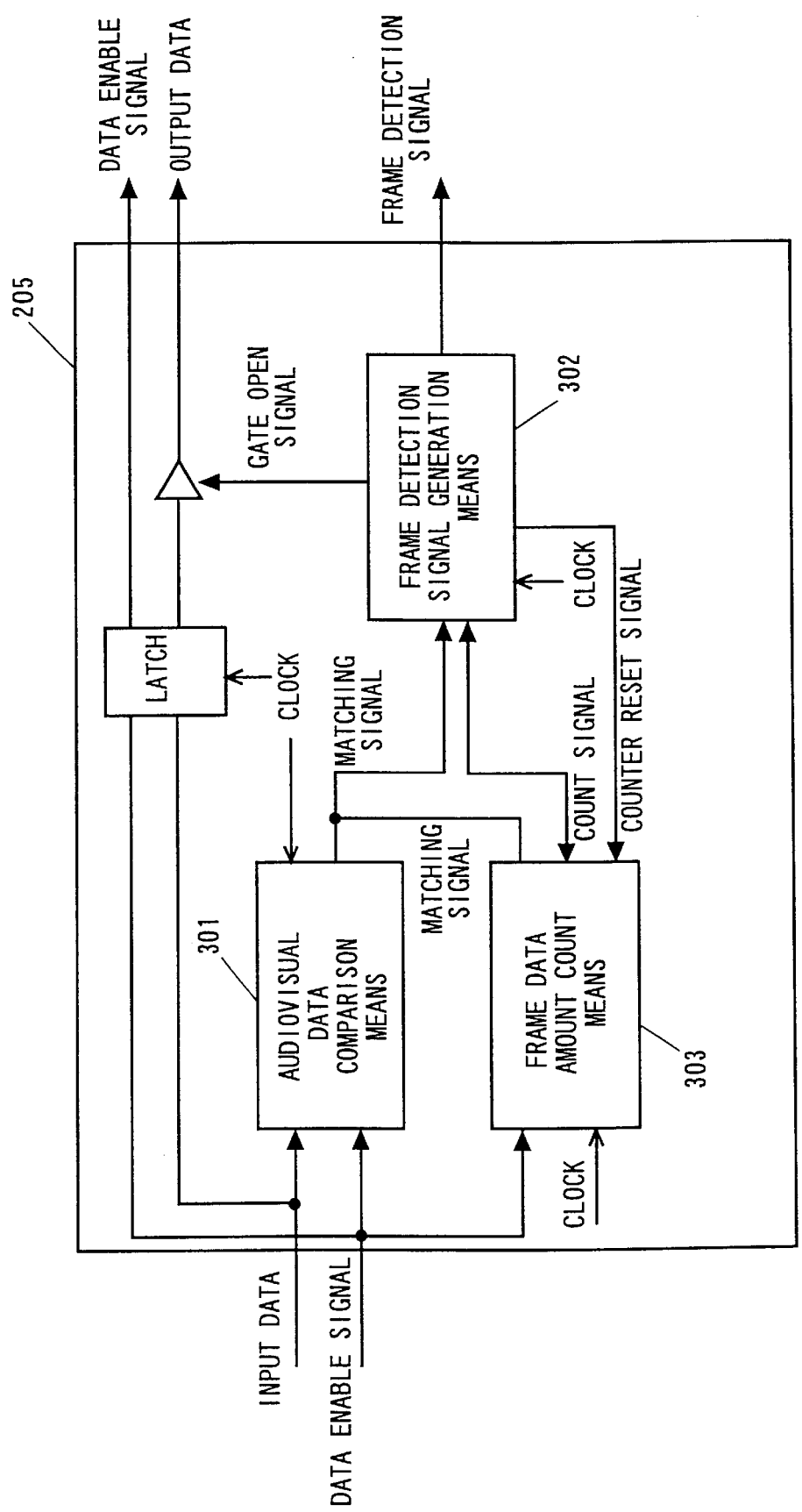
FIG. 3 is a block diagram explaining an audiovisual frame detection means in accordance with Embodiment 1 of the present invention.
Figure 4:
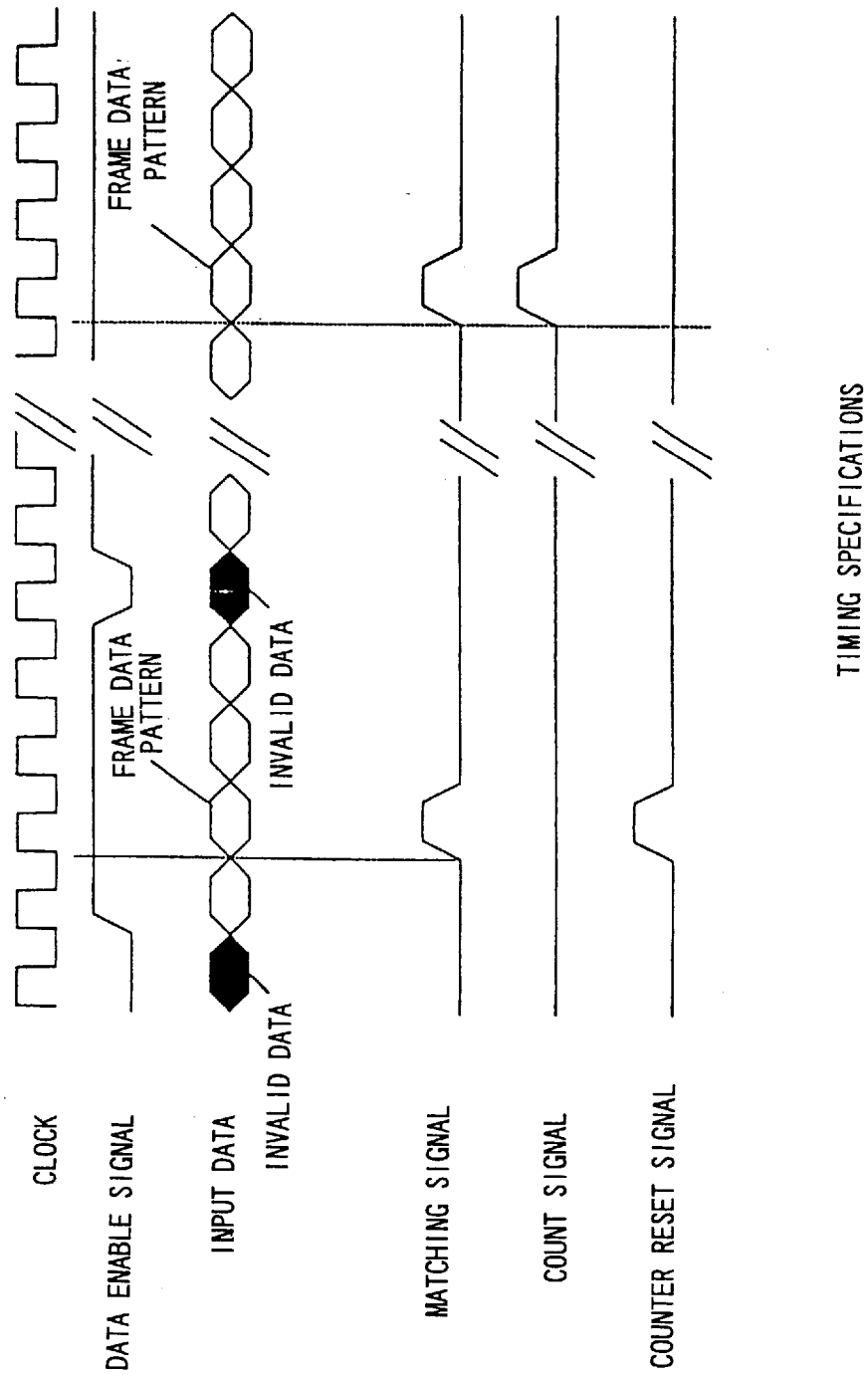
FIG. 4 is a data input timing chart of the audiovisual frame detection means in accordance with Embodiment 1 of the present invention.

The audiovisual frame detection circuit 205 comprises an audiovisual data comparison means 301, a frame detection signal generation means 302 and a frame data amount count means 303 as shown in FIG. 3.

When the data enable signal is high (H) input, the audiovisual data comparison means 301 makes a comparison as to whether the input data coincides with a preset audiovisual frame data pattern. The frame data amount count circuit 303 counts the amount of data to be input to the audiovisual data comparison means 301.

The frame detection signal generation means 302 judges frame boundaries on the basis of the signals from the audiovisual data comparison means 301 and the frame data amount count circuit 303, and generates a frame detection signal and a gate open signal for controlling the output of the input data.

FIG. 5 is a circuit configuration diagram for attaining the audiovisual frame detection circuit 205 shown in FIG. 3.

In FIG. 5, the audiovisual data comparison means 301 comprises an audiovisual frame boundary data pattern storage portion 401 for storing the data pattern of audiovisual frames and a comparator 402 for comparing the data pattern with the input data in synchronization with the clock.

When the input data coincides with the data pattern of the audiovisual frames, the comparator 402 outputs a matching signal to the frame detection signal generation means 302 and the frame data amount count means 303.

The frame data amount count means 303 comprises a data counter 406 capable of at least 120,000 counts in order to count the audiovisual frame size of DV data, and an SR flip-flop 405.

In the frame data amount count means 303, when the input data coincides with the data pattern of the audiovisual frames at the audiovisual data comparison means 301, a signal is input from the comparator 402 to the SR flip-flop 405, and the data counter 406 starts count operation.

When the count value reaches a preset value (120, 000 bytes are set as the frame data size of DV data in Embodiment 1), the data counter 406 outputs a count signal to the frame detection signal generation means 302.

The frame detection signal generation means 302 comprises a latch 407 and two AND gages 403 and 404. The AND gate 403 calculates a counter reset signal from the matching signal from the audiovisual data comparison means 301 and the count signal from the frame data count means 303. In addition, the AND gate 404 and the latch 407 generate a gate open signal for controlling the output of the frame detection signal and input data.

By the above-mentioned configuration, the audiovisual frame detection circuit 205 operates as described below.

The audiovisual data comparison means 301 compares input audiovisual data with the data stored in the audiovisual frame boundary data pattern storage portion 401, and activates the frame data amount count means 303 in the case of coincidence.

The frame data amount count means 303 counts a preset frame data size, and calculates the timing when the next audiovisual frame boundary data should appear.

When the audiovisual data comparison means 301 cannot detect audiovisual frame boundary data at the timing calculated by the frame data count means 303, the frame detection signal generation means 302 resets the frame data amount count means 303, and performs the frame data detection processing again from the beginning.

On the other hand, when the audiovisual frame boundary data can be detected by the audiovisual data comparison means 301, processing is carried out assuming that the frame data has been detected properly, and the AND gate 403 does not perform counter reset. In this case, the gate open signal and the frame detection signal are output by the AND gate 404 and the latch 407.

Furthermore, the AND gate 404 constituting the frame detection signal generation means 302 is changed to an OR gate. When the signal of the audiovisual data comparison means 301 or the signal of the frame data amount count means 303 is output, the audiovisual frame detection circuit 205 outputs the frame detection signal.

In this case, it is not considered that the audiovisual frame detection circuit 205 detects the head of frames from two factors: pattern matching and data amount; however, when one of the signals is not output for some reason, it is characterized that the two signals can compensate for each other.

As described above, the audiovisual frame detection circuit 205 of Embodiment 1 is configured so that the audiovisual frame boundaries can be detected by the comparison processing of pattern data and the count processing of count amount.

In addition, the audiovisual frame detection circuit 205 of Embodiment 1 is configured to start data transfer after audiovisual frames are detected by two kinds of processing by using pattern data and data amount, thereby securely preventing the start of data transfer due to improper detection of audiovisual frames.

[Transmitted/received Data Amount Calculation Circuit 208]

Figure 6:
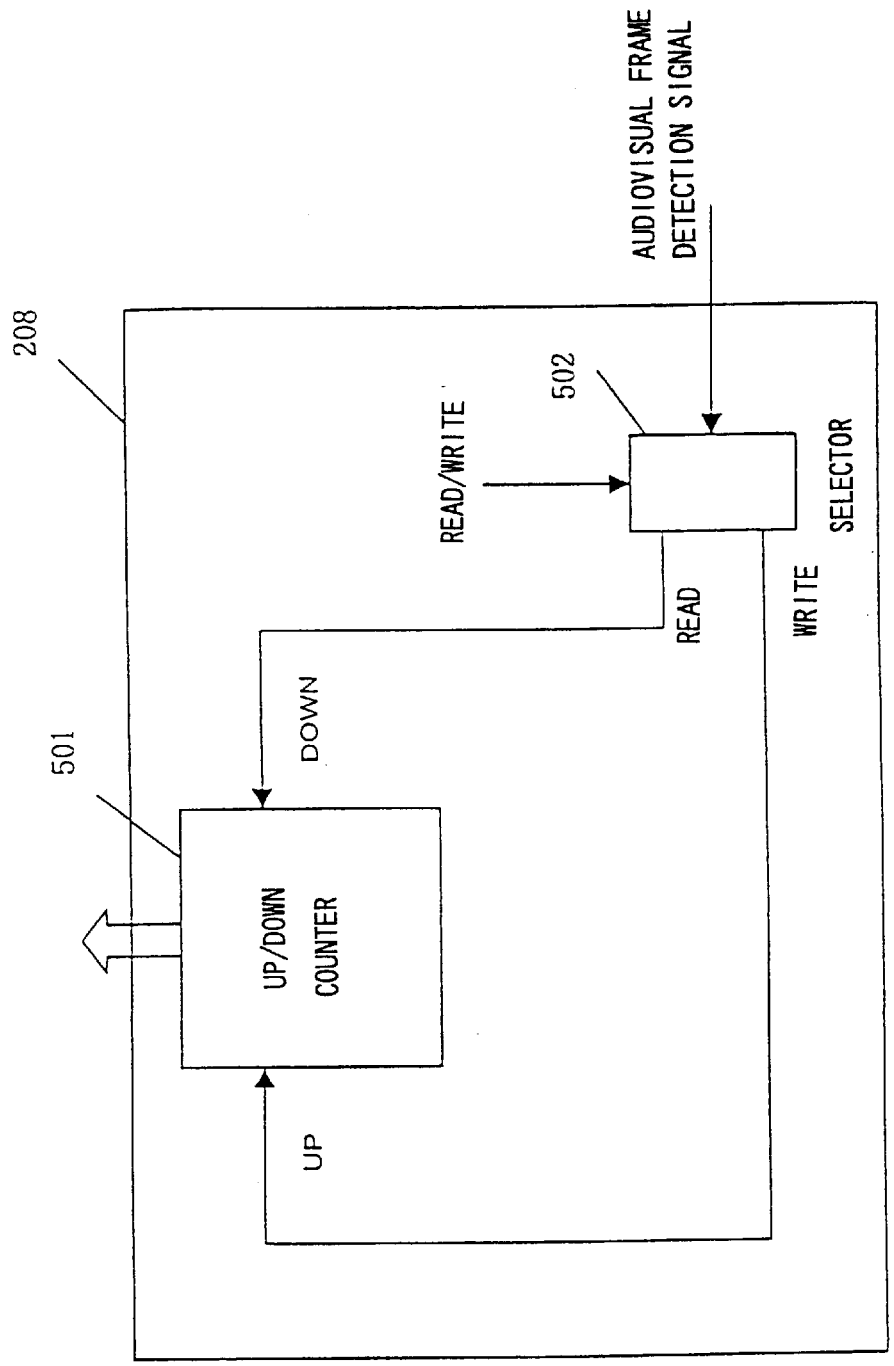
FIG. 6 is a logic circuit diagram of a transmitted/received data amount calculation means in accordance with Embodiment 1 of the present invention.

FIG. 6 is a block diagram showing the configuration of the transmitted/received data amount calculation circuit 208 used as a transmitted/received data amount calculation means.

Hereinafter, the case wherein the audiovisual data input from the external apparatus interface circuit 105 (FIG. 2) is written in the buffer memory 108 (when write operation is performed on a disk medium) will be described.

When input data is written in the buffer memory 108, the audiovisual frame detection circuit 205 detects the audiovisual frame boundaries of the audiovisual data input from the external apparatus interface circuit 105.

The frame detection signal from the audiovisual frame detection circuit 205 is transmitted to the transmitted/received data amount calculation circuit 208. The detection signal input to the transmitted/received data amount calculation circuit 208 is input to an up/down counter (up/down counter) 501 via a selector 502 as shown in FIG. 6.

When the input data is written in the buffer memory 108, write access is performed for the buffer memory 108, and the input frame detection signal is input as an UP counter for the up/down counter 501. The up/down counter 501 counts the input frame detection signal and calculates the amount of data stored in the buffer memory 108 in frame units.

For example, the case wherein audiovisual data for t frames is input from an external apparatus is described below. In this case, since the buffer memory 108 undergoes write access, the audiovisual frame detection circuit 205 outputs t pulses as an UP counter for the up/down counter 501 of the transmitted/received data amount calculation circuit 208.

Therefore, the up/down counter 501 is incremented t times. In the case of the DV format audiovisual data, transmission is performed in the condition that the amount of data of audiovisual frames has a fixed size of 120,000 bytes; therefore, the current access data amount transmitted from the external apparatus interface circuit 105 to the buffer memory can be grasped by multiplying the amount of data by the incremented value.

The following describes the case wherein, when data is transferred from the buffer memory 108 to the magnetic disk 101, the data storage amount in the buffer memory 108 is calculated. Data transfer from the buffer memory 108 to the magnetic disk 101 is activated by an access command that has designated the data transfer amount from the CPU 106.

Therefore, the data transfer amount has been grasped in advance by the CPU 106. The CPU 106 outputs the amount of data read from the buffer memory 108 as a frame detection signal for the transmitted/received data amount calculation circuit 208.

In this case, read access is performed, for the buffer memory 108; therefore, output is carried out to the DOWN counter. In this way, the amount of data input to and output from the buffer memory 108 can be grasped in frame units by the up/down counter 501.

In Embodiment 1, it is configured that data transfer between the buffer memory 108 and the magnetic disk 101 is processed by the CPU 106; however, data transfer can also be attained by newly adding another audiovisual frame detection means between the buffer memory 108 and the signal processing circuit 110.

In this case, the newly provided audiovisual frame detection means is configured so that the frame detection signal is input to the up/down counter (up/down counter) 501. In addition, it is also configured so that the data output from the buffer memory 108 is input to the audiovisual frame detection means.

When data is transferred from the buffer memory 108 to the signal processing circuit 110, the audiovisual frame detection means outputs t pulses to the DOWN counter of the up/down counter 501 of the transmitted/received data amount calculation circuit 208.

Therefore, at the up/down counter 501, decrement is performed t times corresponding to the amount of frames read from the buffer memory 108. As a result, the amount of data input to and output from the buffer memory 108 can be grasped in frame units.

The following describes the case wherein data is read from the magnetic disk 110 and stored temporarily in the buffer memory 108, and the data is output to the external apparatus interface circuit 105 (at the time of read operation on the disk medium). In this case, data transfer from the magnetic disk 101 to the buffer memory 108 is also activated by the CPU 106, just like the above-mentioned case of the data transfer from the buffer memory 108 to the magnetic disk 101.

Therefore, the data transfer amount can be grasped by the CPU 106 in advance. The CPU 106 outputs the amount of data read from the buffer memory 108 to the transmitted/received data amount calculation circuit 208 as an audiovisual frame detection signal. Since write access is performed to the buffer memory 108 in this case, output is carried out to the UP counter.

Furthermore, when output is carried out from the buffer memory 108 to the external apparatus interface circuit 105, the audiovisual frame detection circuit 205 performs read access to the buffer memory 108.

The read access data is input to the audiovisual frame detection circuit 205, and t pulses are output to the DOWN counter of the up/down counter 501 of the transmitted/received data amount calculation circuit 208 as the audiovisual frame detection signal. Therefore, the transmitted/received data amount calculation circuit 208 can grasp the amount of data input/output to the buffer memory 108.

In addition, the amount of data transfer between the buffer memory 108 and the magnetic disk 101 is processed by the CPU 106; however, this processing can also be attained by newly adding another audiovisual frame detection means (B) between the buffer memory 108 and the signal processing circuit 110, just like the example of data writing on the magnetic medium.

In this way, the CPU 106 can grasp the amount of data input/output to the buffer memory 108 in frame units by using the audiovisual frame detection circuit 205 and the transmitted/received data amount calculation circuit 208.

[Frame Address Management Circuit 210]

Figure 7:
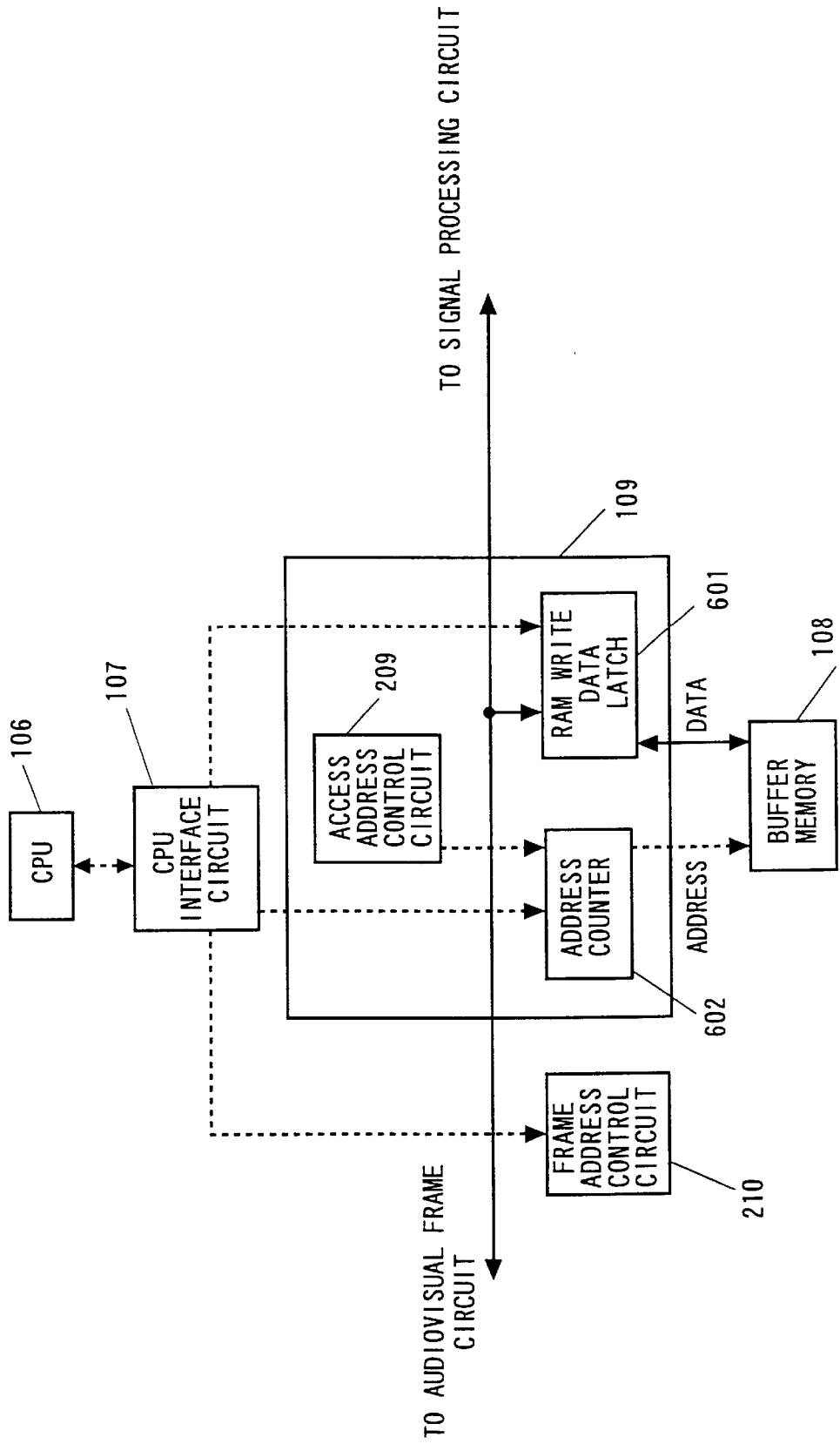
FIG. 7 is a block diagram explaining a frame address management means in accordance with Embodiment 1 of the present invention.

Next, the frame address management circuit 210 of the AV data processing circuit 112 shown in FIG. 2, used as a frame address management means, will be described in detail referring to the drawings. FIG. 7 is a block diagram showing the buffer memory control circuit 109, used as a buffer memory control means, and the frame address management circuit 210.

It comprises the buffer memory control circuit 109, the CPU interface circuit 107 and the CPU 106. The buffer memory control circuit 109 comprises an access address control circuit 209 used as an access address control means described later, an address counter 602 and a RAM write data latch 601, and manages access addresses and data for the buffer memory 108.

The frame address management circuit 210 manages the addresses of the storage positions of the frame boundaries of audiovisual data when the audiovisual data is written in the buffer memory 108. The values of the address counter 602 are stored as the addresses of the storage positions in synchronization with the frame detection signal output from the audiovisual frame detection circuit 205.

As shown in FIG. 7, the buffer memory control circuit 109 is provided with the RAM write data latch 601 and the address counter 602. In addition, the frame address management circuit 210 is provided with a frame address storage circuit 603 used as a frame address storage means for storing frame addresses.

Data to be transmitted from the AV data processing circuit 112 to the buffer memory 108 passes through the RAM write data latch 601 and is transmitted to the buffer memory 108. An access address to the buffer memory 108 is determined by the address counter 602 and transmitted to the buffer memory 108.

If the frame detection signal transmitted from the AV data processing circuit 112 is input at this time, the access address is also transmitted to the frame address management circuit 210 in synchronization with this signal, and its value is stored in the frame address storage circuit 603.

Figure 8:
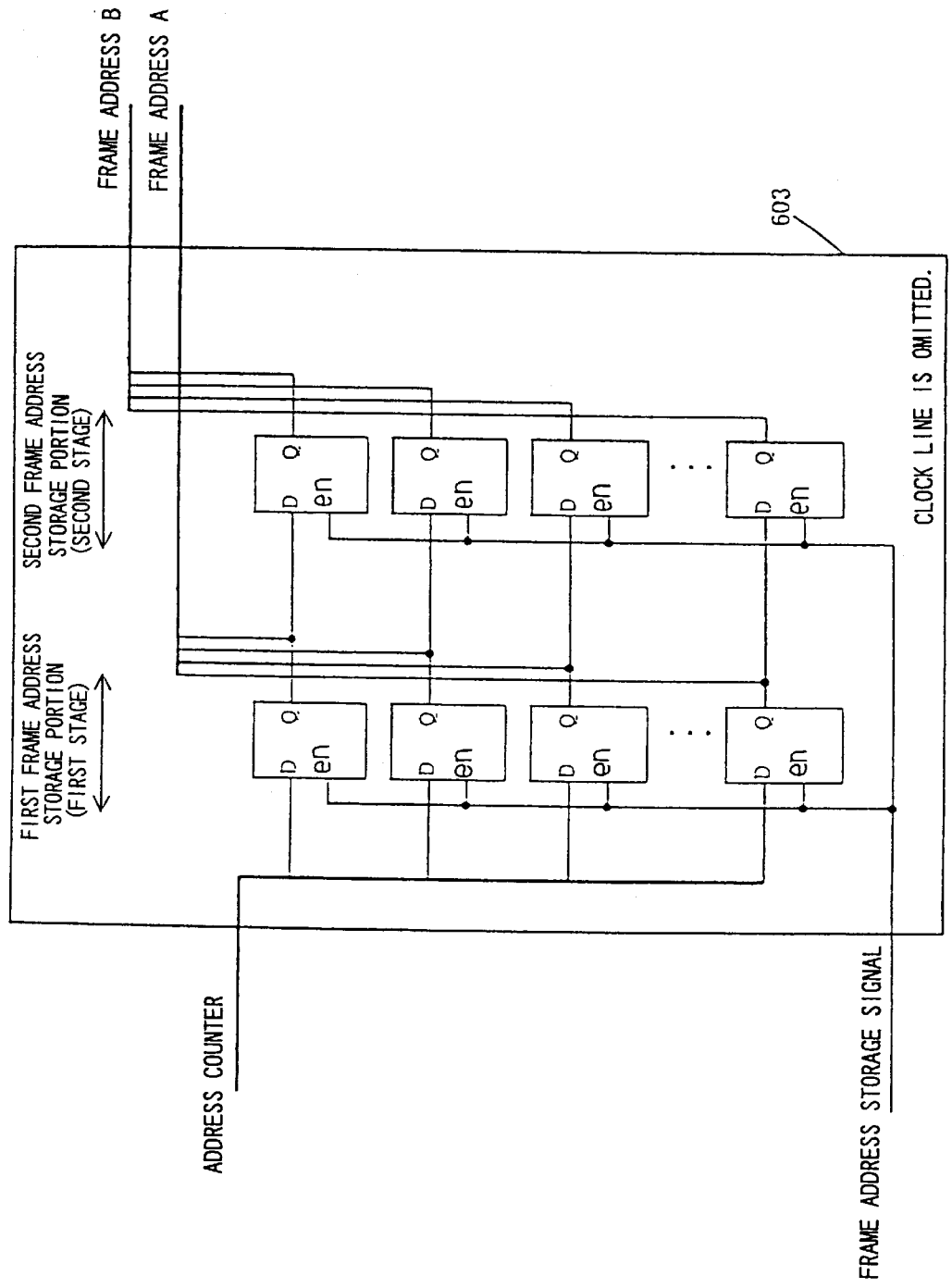
FIG. 8 is a circuit diagram of the frame address storage means of the frame address management means in accordance with Embodiment 1 of the present invention.

FIG. 8 shows the frame address storage circuit 603 used as a frame address storage means of Embodiment 1.

The address output from the address counter 602 is input to a first frame address storage portion having a bus, the width of which is the same as the address width, and the output of the first frame address storage portion is input to a latch constituting a second frame address storage portion, respectively.

The frame detection signal input from the AV data processing circuit 112 is input as a frame address storage signal (=frame detection signal) in synchronization with the timing when data is written in the buffer memory, and used as an address storage timing signal.

Since the frame address storage circuit 603 comprises two stages of frame address storage portions, it is configured so that the frame address detected the last time is stored in the second frame address storage portion of the second stage, and so that the frame address detected this time is stored in the first frame address storage portion of the first stage.

The first frame address storage portion outputs frame address A, and the second frame address storage portion outputs frame address B. By using the two-stage configuration of the frame address storage portions as described above, addresses for two frames can be stored.

Furthermore, in Embodiment 1, the configuration wherein the frame address storage circuit 603 comprises two stages of frame address storage portions is taken as an example; however, the present invention is not limited to this; when one or more frame address storage portions are available, any number of stages may be used; each time the number of stages increases by one stage, the frame address detected at the previous time can be stored.

Figure 9:
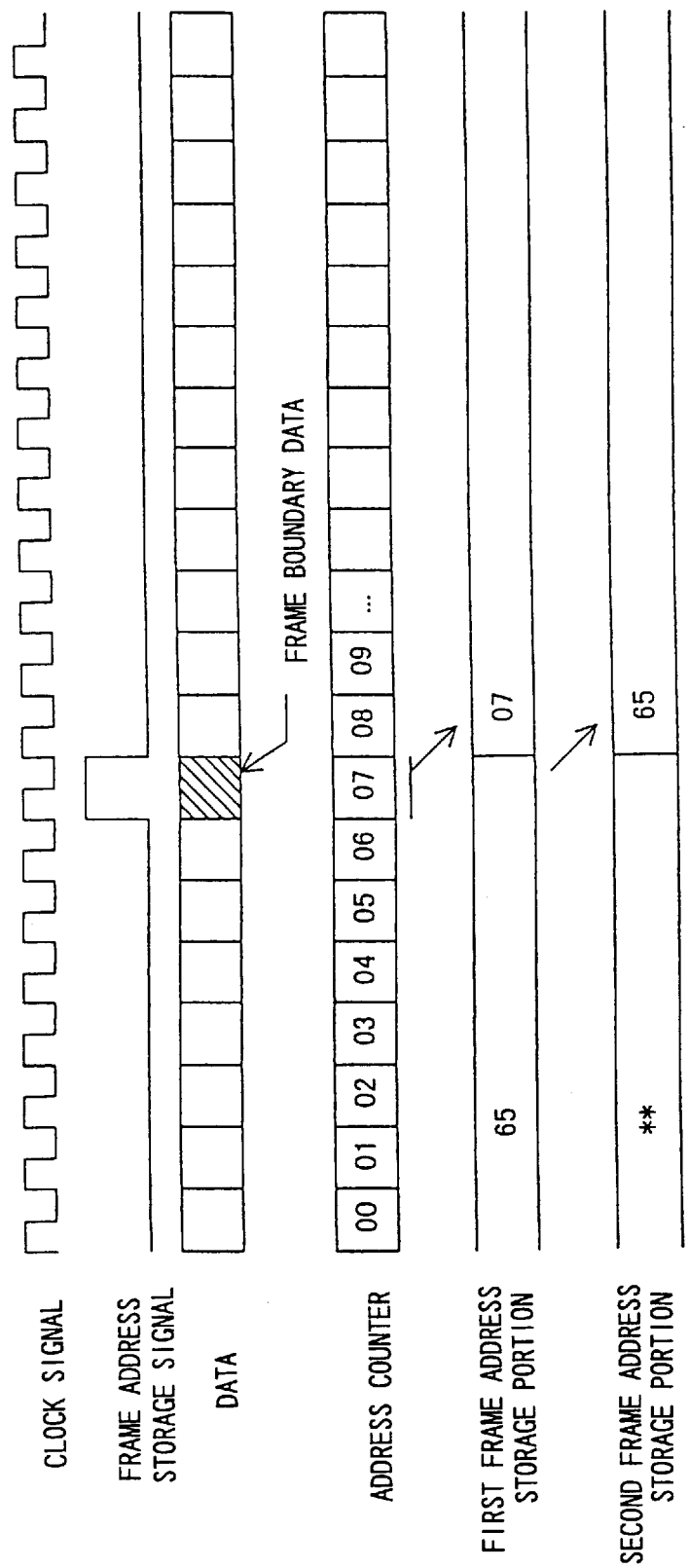
FIG. 9 is a timing chart explaining the frame address management means in accordance with Embodiment 1 of the present invention.

FIG. 9 is a timing chart showing the storage processing timing of the frame storage circuit 603 of Embodiment 1. The frame address storage signal is a signal obtained by synchronizing the frame detection signal with the timing when data is stored in the buffer memory 108. The data shown in FIG. 7 is the data transmitted from the RAM write data latch to the buffer memory 108.

When the data is frame boundary data as shown in FIG. 7, a frame address storage signal (frame detection signal) is output. When it is assumed that the address counter is 07 at this time, this value is stored in the first frame address storage portion. And the value (65 in FIG. 7) stored in the first frame address storage portion up to now is stored in the second frame address storage portion.

By comparing the two storage address values stored in the frame address storage circuit 603, the data amount of the audiovisual frames stored in the buffer memory 108 can be confirmed by the difference between the storage addresses.

Since the magnetic disk apparatus of Embodiment 1 is provided with the frame address storage circuit 603 as described above, the CPU can thus grasp the storage address position of the frame head of audiovisual data being stored in the buffer memory 108. Furthermore, by forming plural frame address storage circuits 603, the CPU can grasp the storage address positions of plural pieces of audiovisual data.

[Access Address Control Circuit 209]

Next, the access address control circuit 209 (FIG. 7) of Embodiment 1 will be described in detail.

Figure 10:
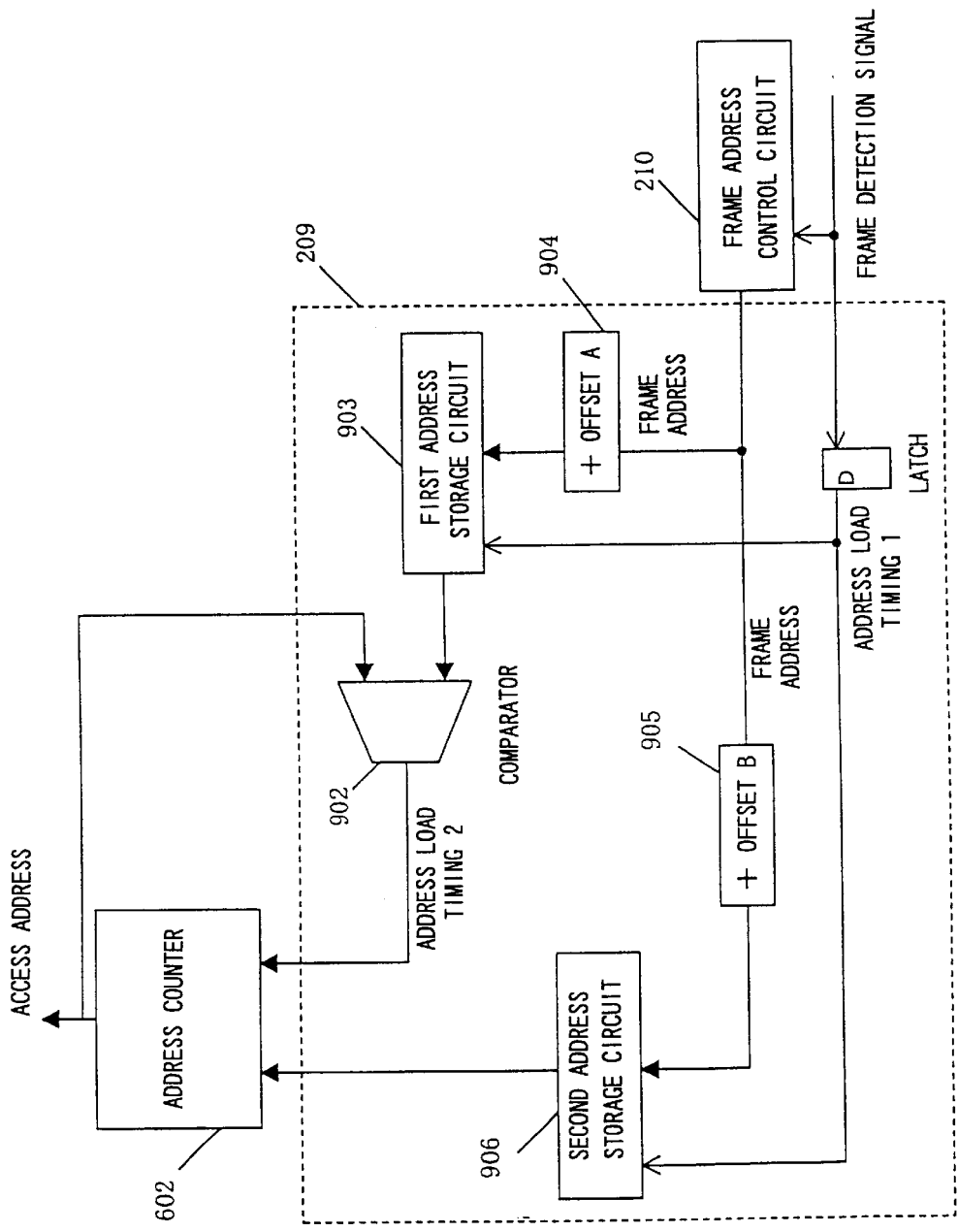
FIG. 10 is a logic circuit diagram of an access address control means in accordance with Embodiment 1 of the present invention.

FIG. 10 shows a circuit configuration for attaining the access address control circuit 209, and it also shows the frame address management circuit 210 and the address counter 602 in the buffer memory control circuit 109.

The access address control circuit 209 comprises a comparator 902, a first address storage circuit 903, a first offset adder 904, a second offset adder 905 and a second address storage circuit 906.

Figure 11:
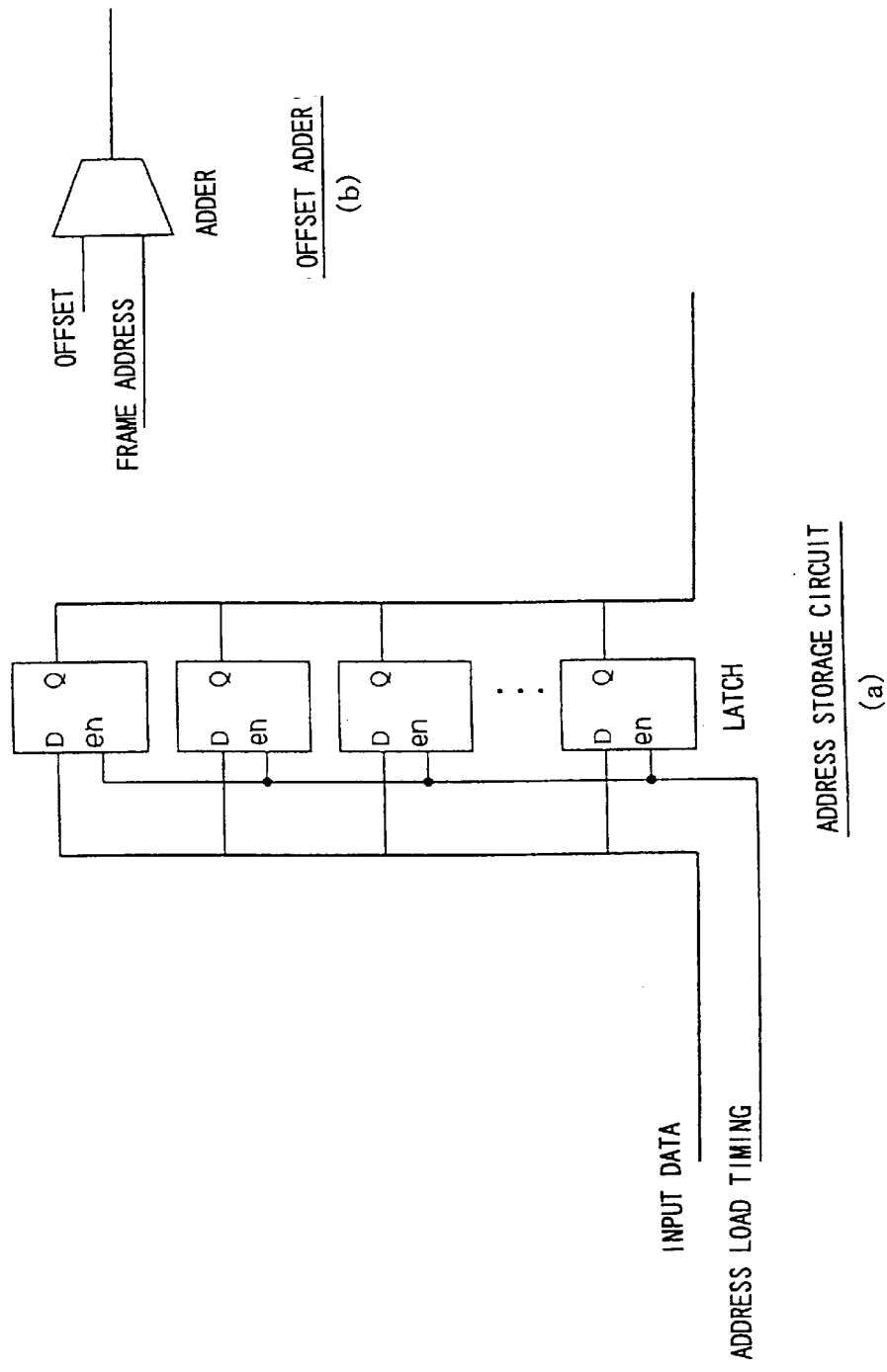
FIG. 11 is a circuit diagram of the address storage means of the access address control means in accordance with Embodiment 1 of the present invention.

A(a) of FIG. 11 shows a configuration example of the first address storage circuit 903 and the second address storage circuit 906, and the first address storage circuit 903 and the second address storage circuit 906 comprise plural latches. A (b) of FIG. 11 shows a configuration example of the first offset adder 904 and the second offset adder 905.

These offset adders output a value obtained by adding an offset value to an input frame address. The first offset adder 904 and the second offset adder 905 are each attained by the circuit configuration shown in FIG. 11(b).

In FIG. 10, when the storage address in the buffer memory corresponding to the frame boundary data is stored, the frame address management circuit 210 carries out output to the first offset adder 904 and the second offset adder 905 at the storage address.

The first offset adder 904 and the second offset adder 905 carry out the addition of the offset values (A and B), and carry out output to the first address storage circuit 903 and the second address storage circuit 906. In addition, address load timing 1 synchronized with the frame detection signal is input to the first address storage circuit 903 and the second address storage circuit 906, and the address values synchronized with the address load timing 1 are stored.

The address value stored in the first address storage circuit 903 is compared with the value of the address counter 602 (FIG. 7) by the comparator 902. When the value from the address counter 602 coincides with the value from the first address storage circuit 903, the comparator 902 outputs address load timing 2 to the address counter 602.

When the address load timing 2 is input to the address counter 602, the address value of the second address storage circuit 906 is input to the address counter 602. And the counter of the address counter 602 is set at the value of the second address storage circuit 906.

Figure 12:
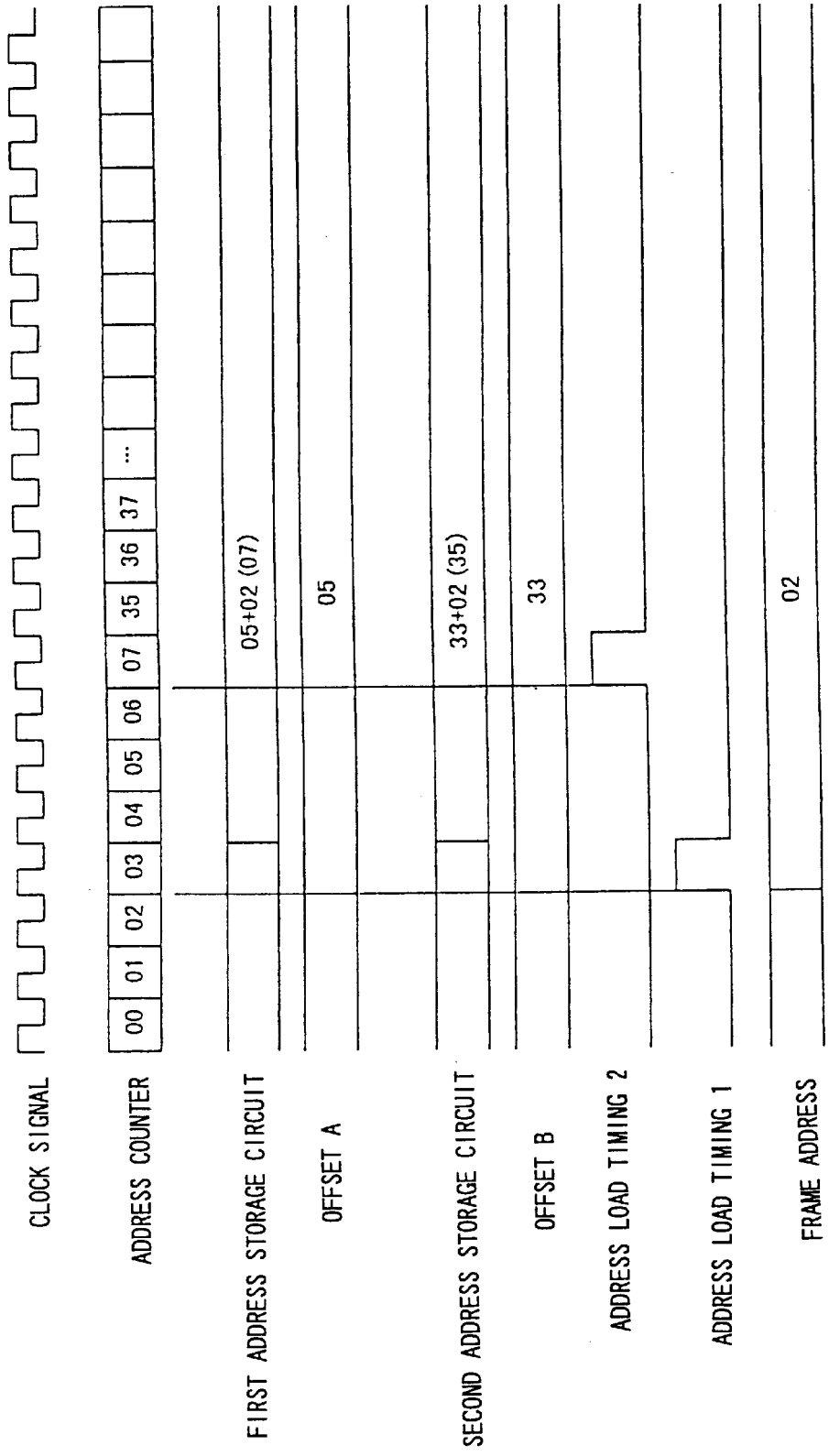
FIG. 12 is a timing chart explaining the access address control means in accordance with Embodiment 1 of the present invention.

FIG. 12 is a timing chart showing the signal generation timing in the access address control circuit 209.

When the frame detection signal is input to the access address control circuit 209, it is synchronized, and the address load timing 1 is output.

By the first offset adder 904 and the second offset adder 905, different offset values (A and B) are added to the address value stored in the frame address management circuit 210, and stored in the first address storage circuit 903 and the second address storage circuit 906, respectively.

As shown in FIG. 12, it is assumed that the address value stored in the frame address management circuit 210 is 02 and that the offset value added by the first offset adder 904 is 05, for example.

Furthermore, it is also assumed that the offset value to be added by the second offset adder 905 is set at 33; the address values stored in the first address storage circuit 903 and the second address storage circuit 906 are 07 (=05+02) and 35 (=33+02).

After that, when the counter value of the address counter 602 becomes equal to the address value 07 stored in the first address storage circuit 903, the comparator 902 outputs the address load timing 2 to the address counter 602. When the address load timing 2 is input, the address counter 602 shifts the counter value to 35, i.e., the address value of the second address storage circuit 906.

In other words, it is configured that when the counter value of the address counter 602 reaches the address value of the first address storage circuit 903, the counter value is skipped to the value of the second address storage circuit 906, whereby the access operation to the buffer memory 108 can be controlled.

Since the access address control circuit 209 of Embodiment 1 is configured as described above, access in frame units can be made by setting the offset value to multiples of the frame data length. For example, it is assumed that audiovisual frame size N is set as the offset value of the first offset adder 904, and that audiovisual frame size 4N, quadruple of N, is set as the offset value of the second offset adder 905.

Figure 13:
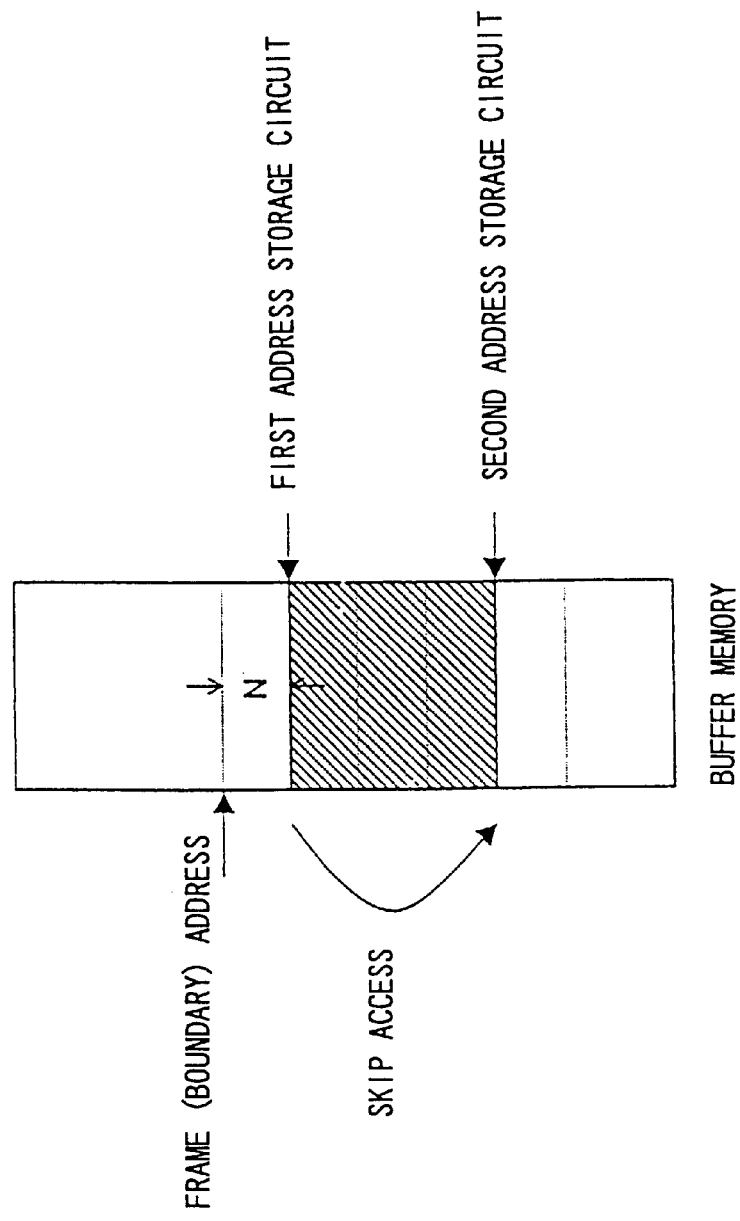
FIG. 13 is a view explaining an access address for the buffer memory of the access address control means in accordance with Embodiment 1 of the present invention.

Then, the magnetic disk apparatus of Embodiment 1 becomes an audiovisual playback apparatus capable of gaining access to every three frames. FIG. 13 is an explanatory view showing skip access at the buffer memory 108 of the magnetic disk apparatus configured as described above.

As shown in FIG. 13, when the access address (the address counter 602) in the buffer memory reaches the address value stored in the first address storage circuit 903, the access address skips 3N amount of frame data to the address value stored in the second address storage circuit 906.

Since the value of the address counter 602 is updated by the access address control circuit 209 as described above, the magnetic disk apparatus of Embodiment 1 can gain access to data in audiovisual frame units, whereby processing such as skip access can be attained.

[Data Output Timing Control Circuit 211]

Next, the data output timing control circuit 211 (FIG. 2) of the AV data processing circuit 112 of Embodiment 1 will be described in detail.

The data output timing control circuit 211 of Embodiment 1 is provided to carry out the timing adjustment of data output from the buffer memory 108 to the external apparatus interface circuit 105.

Figure 14:
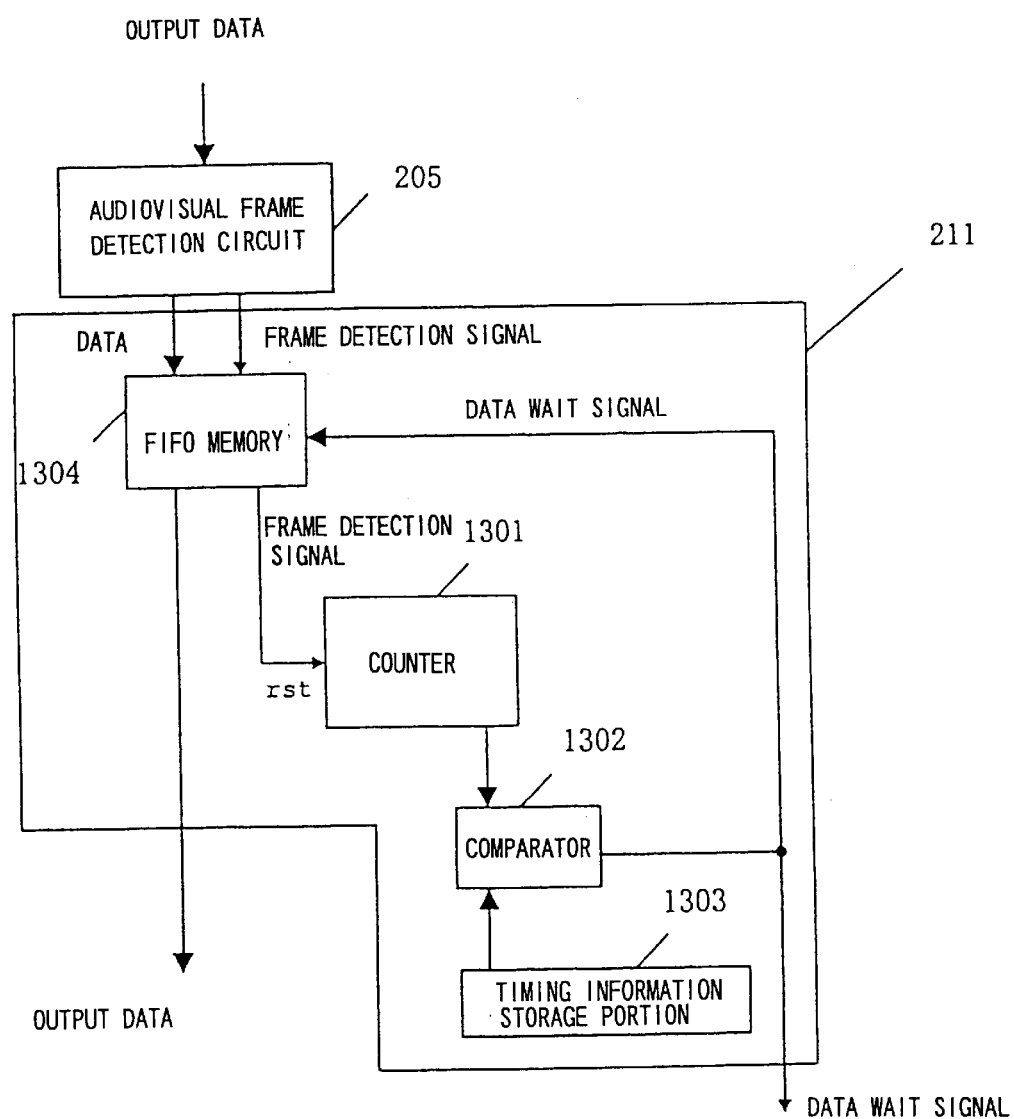
FIG. 14 is a logic circuit diagram explaining a data output timing control means in accordance with Embodiment 1 of the present invention.

FIG. 14 is a block diagram showing the configuration of the data output timing control circuit 211 and the audiovisual frame detection circuit 205. As shown in FIG. 14, the data output timing control circuit 211 comprises a counter 1301, a comparator 1302, a timing information storage portion 1303 and a FIFO memory 1304.

The frame detection signal detected by the audiovisual frame detection circuit 205 is input to the FIFO memory 1304 together with data. The data and frame detection signal output from the FIFO memory 1304 are output to the external apparatus interface circuit 105 in synchronization with the clock. At that time, the frame detection signal synchronously resets the counter 1301. When the counter 1301 is synchronously reset, the counter value becomes 0.

After that, the counter 1301 counts up in synchronization with the clock, and the plural pieces of timing information stored in the timing information storage portion 1303 are compared with the counter value of the counter 1301 by the comparator 1302.

Timing information for temporarily delaying data to be taken out from the FIFO memory 1304 is stored in the timing information storage portion 1303; when the counter value of the counter 1301 coincides with the timing information stored in the timing information storage portion 1303, a data wait signal for temporarily stopping data output from the FIFO memory 1304 is output from the comparator 1302.

The data wait signal is used as a read enable signal for the FIFO memory 1304, and at the same time it is output to the external apparatus interface circuit 105. When the data wait signal used as the read enable signal is input to the FIFO memory 1304, and when the data wait signal is high (H) output, output data to the external apparatus becomes valid, and data is taken out from the FIFO memory 1304.

The data wait signal output to the external apparatus interface circuit 105 is used as a data transfer enable signal to the external apparatus interface circuit 105, and only when the data wait signal is high (H) output, the output data becomes valid.

Since the data output timing control circuit 211 is configured as described above, data output to the external apparatus is adjusted in accordance with the data timing set in the timing information storage portion 1303 and then output.

Since the disk apparatus of Embodiment 1 is provided with this kind of data output timing control circuit 211, the magnetic disk apparatus of Embodiment 1 can adjust data to the timing (or frequency) requested by the external apparatus at the audiovisual frame frequency, and can output data.

As shown in FIG. 1, the CPU 106 receives commands, parameters and the like from the external apparatus via the external apparatus interface circuit 105 and the CPU interface circuit 107, analyzes the received commands, and controls the buffer memory control circuit 109, the signal processing circuit 110 and the actuator drive circuit 111.

Then, the CPU 106 carries out data transfer between the external apparatus and the buffer memory 108, and data writing/reading processing between the buffer memory 108 and the magnetic disk 101. In addition, when a command requesting a response is input from the external apparatus, a command response is carried out to the external apparatus via the CPU interface circuit 107 and the external apparatus interface circuit 105.

The operations for various kinds of commands will be described later for each command.

The buffer memory control circuit 109 carries out audiovisual data input/output control for the buffer memory 108; and the data input/output control is performed on the basis of transfer data size and transfer data storage address notified by the CPU 106.

For access to the buffer memory 108, the buffer memory control circuit 109 adjusts and controls access from buses of up to the four channels for the CPU interface circuit 107, the AV data processing circuit 112, the signal processing circuit 110 and RAM refresh.

Figure 15:
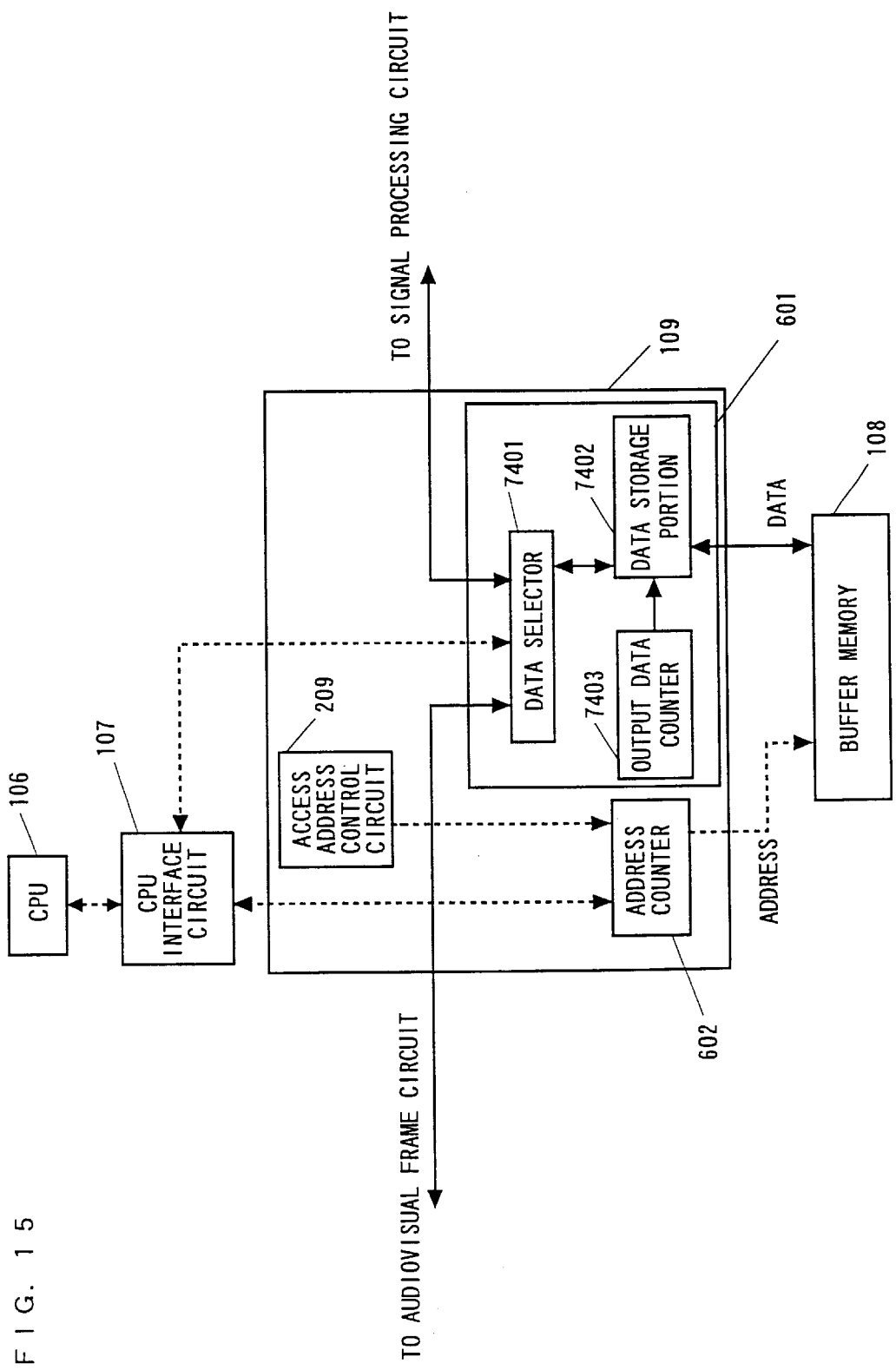
FIG. 15 is a block diagram showing the configuration of a buffer memory control circuit in accordance with Embodiment 1 of the present invention.

FIG. 15 is a block diagram showing the configuration of the buffer memory control circuit 109. As shown in FIG. 15, the buffer memory control circuit 109 is provided with a RAM write data latch 601, an address counter 602 and an access address circuit 209 used as an access address control means.

The RAM write data latch 601 comprises a data selector 7401, an output data counter 7403 and a data storage portion 7402.

The output data counter 7403 counts data read from the buffer memory 108, and the data storage portion 7402 buffers write data once. The data selector 7401 is a bus selector for gaining access to the buffer memory 108. The address counter 602 generates an access address for the buffer memory 108.

Figure 16:
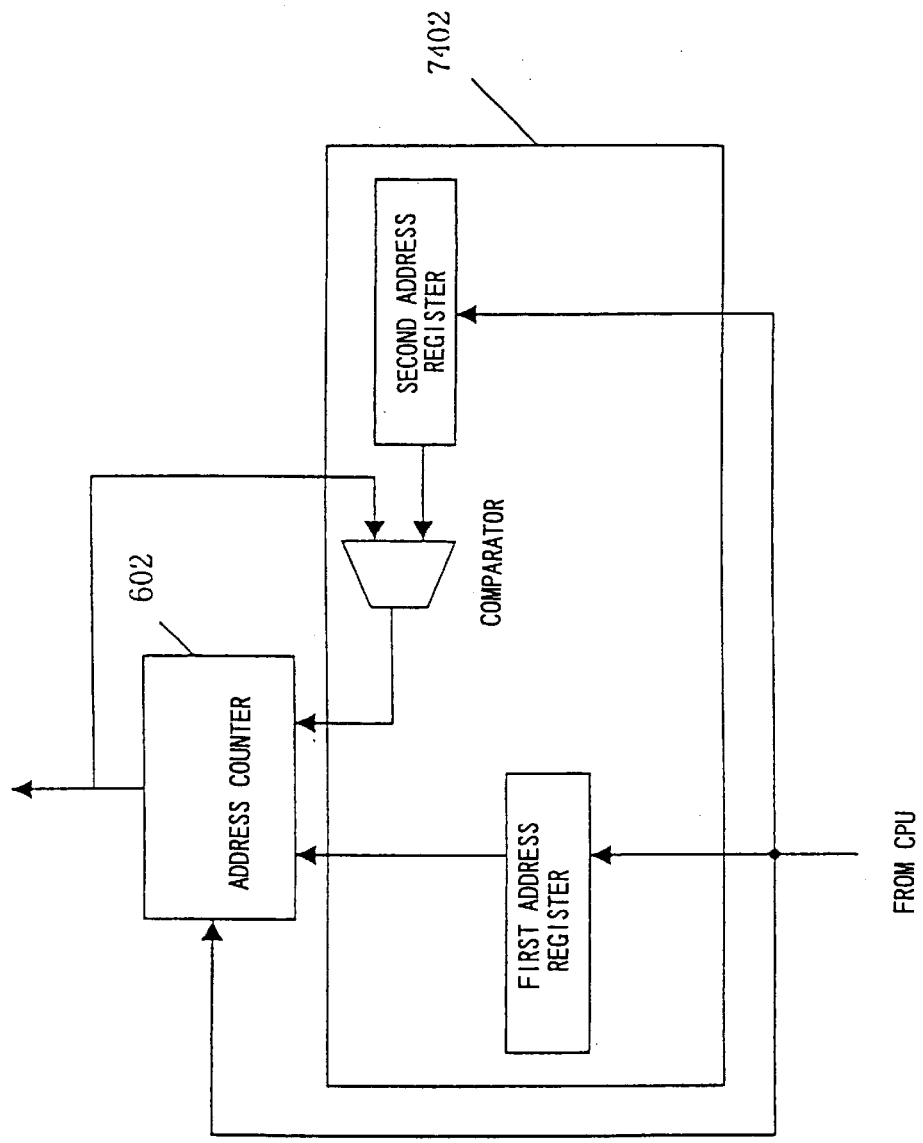
FIG. 16 is a block diagram showing an address control portion included in the buffer memory control circuit in accordance with Embodiment 1 of the present invention.

FIG. 16 is a block diagram schematically showing the access address control circuit 209 shown in FIGS. 15 and 10.

The magnetic disk apparatus of Embodiment 1 is configured so that access addresses can be set from the CPU 106 to the address counter 602.

In addition, the CPU 106 of the magnetic disk apparatus is configured so that the first address register and the second address register thereof can be set. It is also configured so that the address value set in the second address register is compared with the output of the address counter 602 by a comparator.

The comparator is configured so that the address value of the first address register is loaded to the counter value of the address counter when the output of the address counter 602 becomes equal to the address value of the second address register. As a result, the magnetic disk apparatus of Embodiment 1 can gain access to the buffer memory 108 by ring buffer configuration.

Figure 17:
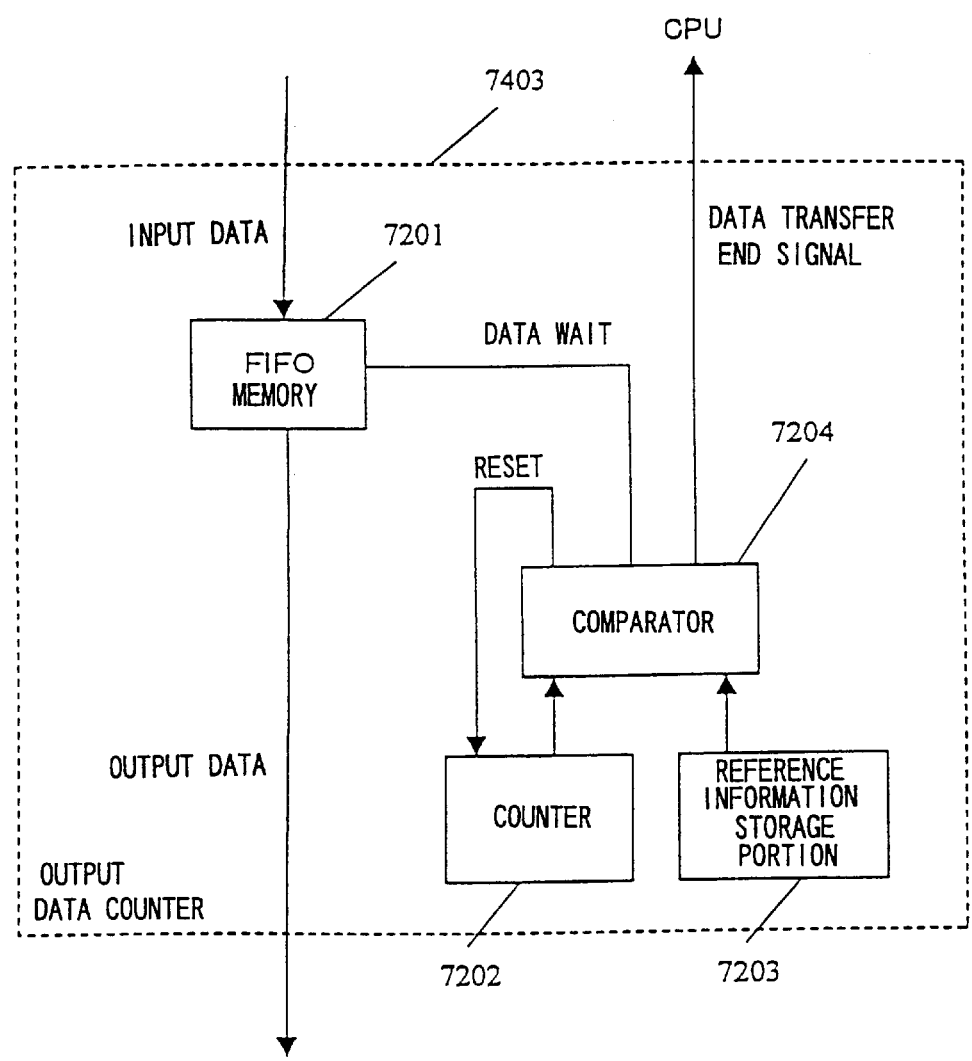
FIG. 17 is an explanatory view showing an output data counter means of the buffer memory control circuit in accordance with Embodiment 1 of the present invention.

FIG. 17 is a block diagram showing the configuration of the output data counter 7403 accommodated in the buffer memory control circuit 109 of Embodiment 1.

In FIG. 17, the data output from the buffer memory 108 is input to a FIFO memory 7201. The data stored in the FIFO memory 7201 is output to the signal processing circuit 110 (FIG. 1) in synchronization with the clock signal input from a clock means (not shown).

The counter 7202 returns its counter value to 0 at the time of power-on, and then counts up in synchronization with the clock signal. The comparator 7204 compares the counter value of the counter 7202 with the amount (120,000 bytes) of data stored in the reference information storage portion 7203 and corresponding to the DV format audiovisual frames.

When an equal comparison occurs, the comparator 7204 outputs a data transfer end signal to the CPU 106. At the same time, the comparator 7204 synchronously resets the counter 7202. In response to this synchronous reset, the counter 7202 returns its counter value to 0, and then counts up in synchronization with the clock signal.

[Audiovisual Data Management Method]

Next, a maangement method for audiovisual data recorded on the magnetic disk 101 will be described specifically.

Figure 18:
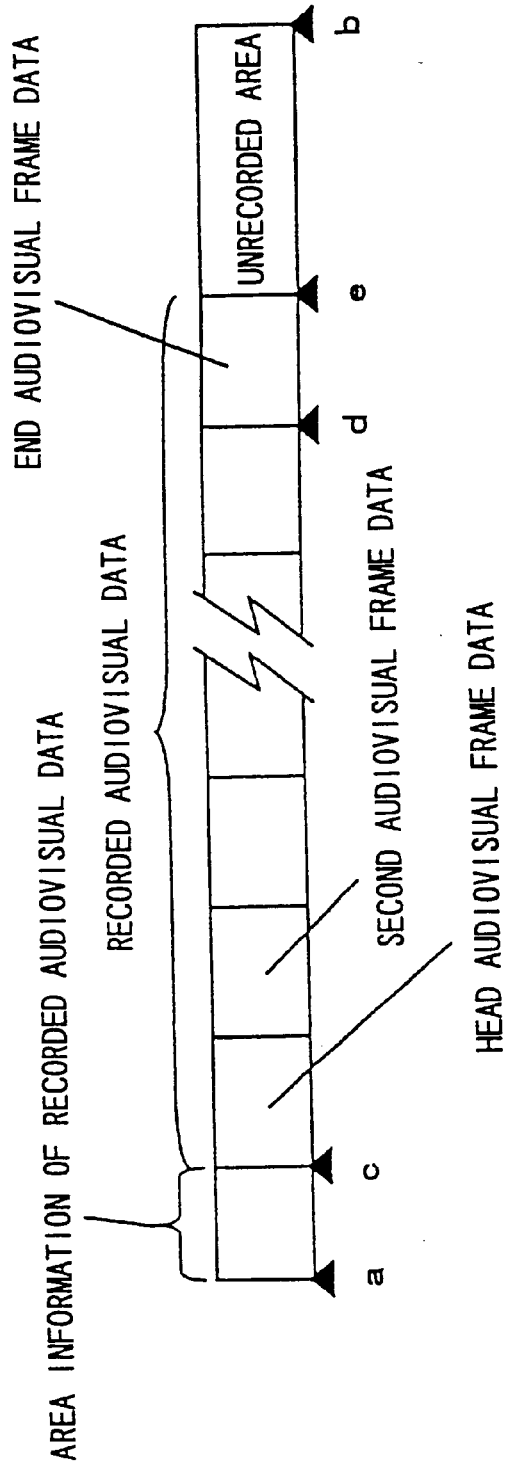
FIG. 18 is an explanatory view showing address information, on a magnetic disk, managed by a recording area management means in accordance with Embodiment 1 of the present invention.

FIG. 18 is a schematic view showing the storage condition of audiovisual data in the recording area of the magnetic disk 101. As shown in FIG. 18, not only the audiovisual data but also the area information (management information) of the audiovisual data recorded in the recording area ranging from the head address (point a) to the record start address (point c) of the audiovisual data in the recording area of the magnetic disk 101 are recorded in the recording area of the magnetic disk 101.

The CPU 106 used as a recording area management means manages the record start address (point c) of the head audiovisual frame data of the recorded audiovisual data, the record start address (point d) of the end audiovisual frame data and the head address (point e) of the unrecorded area on the magnetic disk 101 as the area information of the recorded audiovisual data.

After the activation processing and initialization processing of the magnetic disk apparatus, the CPU 106 reads area information regarding the above-mentioned recorded audiovisual data, and stores the area information in the random access memory (hereinafter simply referred to as a built-in RAM) built in the CPU 106.

In FIG. 18, when no audiovisual data is written on the magnetic disk 101 used as a recording medium (when not used), the positions of the points d and e are the same as the position of the point c. When audiovisual data is newly written on the magnetic disk 101 in this condition, the writing of the audiovisual data begins from the point c.

By managing the information in the recording area of the magnetic disk 101 as described above, when audiovisual data is recorded in an unused condition, recording can start from the specific position at all times.

At the time of recording or playback, the CPU 106 used as an address management means manages the addresses on the magnetic disk 101 used at that time. Furthermore, at the time when recording or playback is not performed, the CPU 106 manages the address pointer for indicating the address to be recorded or played back next on the magnetic disk 101.

Figure 19:
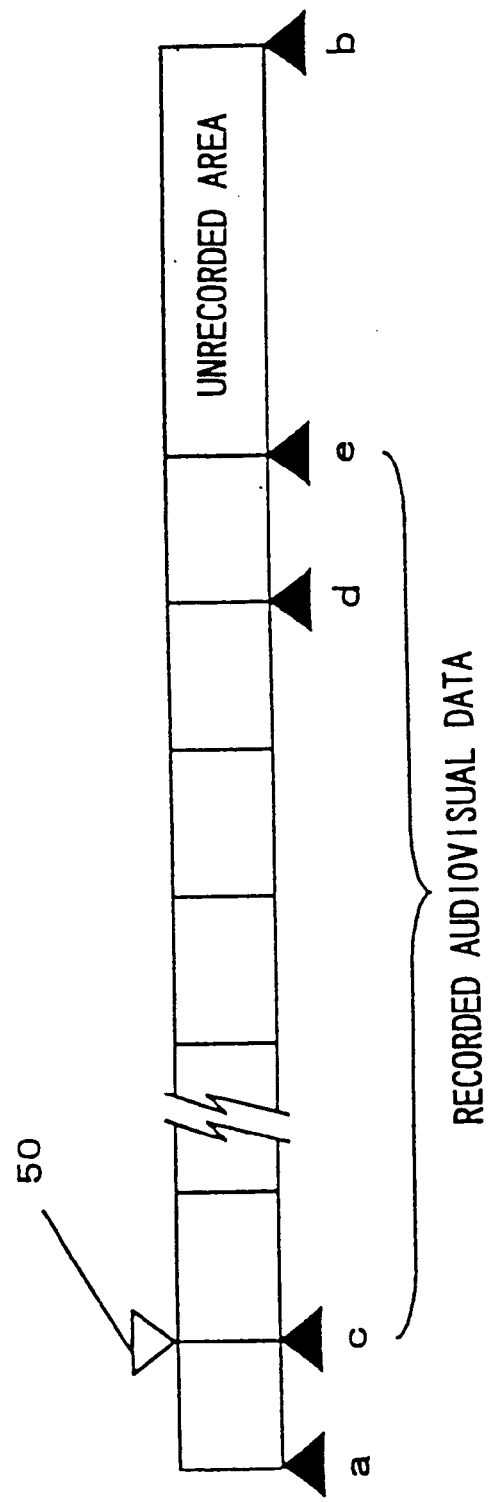
FIG. 19 is an explanatory view showing the address pointer position after initialization processing at the magnetic disk apparatus in accordance with Embodiment 1 of the present invention.

FIG. 19 is a schematic view showing the storage condition of the recording area of the magnetic disk 101 after a series of activation/initialization processing in the magnetic disk apparatus. As shown in FIG. 19, an address pointer 50 is set to have the same address as that of the record start address (point c) of the head frame data of the recorded audiovisual data stored in the built-in RAM.

Since the magnetic disk apparatus of Embodiment 1 is provided with the address management means as described above, when an inquiry about the current position (the absolute track number or time code) during recording or playback is made by an external apparatus, it is possible to immediately respond to the inquiry.

One audiovisual frame of DV format audiovisual data has 120,000 bytes. In order to quantize one audiovisual frame of DV data in the sector units of the magnetic disk 101, it is necessary to add stuffing bytes (additional data) to the audiovisual frame data.

In Embodiment 1, stuffing bytes (additional data) of 2,880 bytes are added to generate record frame data of 122,880 bytes. This record frame data of 122,880 bytes is assigned to 240 sectors and used as the recording unit for one frame amount of data.

[Command Processing]

Next, the receiving processing in the case that the magnetic disk apparatus of Embodiment 1 receives a command from an external apparatus will be described.

Figure 20:
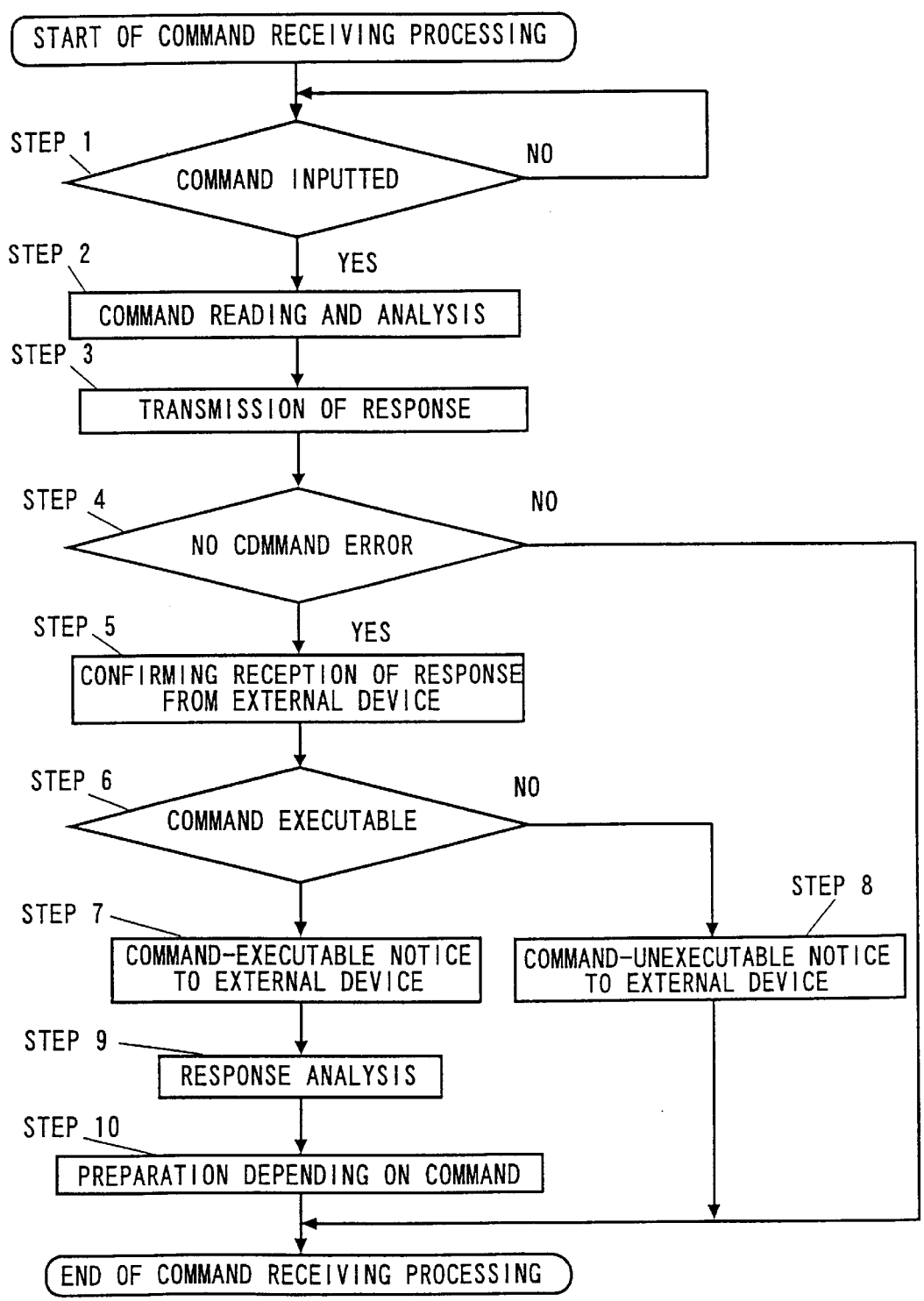
FIG. 20 is a flowchart showing the command receiving processing procedure of the magnetic disk apparatus in accordance with Embodiment 1 of the present invention.

FIG. 20 is a flowchart showing the flow of command processing in the case that a command is received.

At step 1 of FIG. 20, a judgment is made as to whether a command is received from an external apparatus or not. If no command is received, the processing at step 1 is repeated until a command is input.

On the other hand, if a command is received, response processing and preparation processing described below are performed before data reading from the magnetic disk 101 is started.

By the response processing at step 2 of FIG. 20, the command received from the external apparatus interface circuit 105 (FIG. 1) is read out first. The CPU 106 makes analysis as to whether the read command has an error or not. The result of the analysis is notified as a response to the external apparatus that transmitted the command (step 3).

It is confirmed that the received command has no error (step 4) and that the external apparatus has received the response properly from the magnetic disk apparatus (step 5). Next, at step 6, the CPU 106 makes a judgment as to whether the received command can be executed or not from the current operation condition of the magnetic disk apparatus.

If the command can be executed, the CPU 106 notifies the external apparatus that the received command can be executed (step 7). In addition, if the command cannot be executed because of the operation condition of the magnetic disk 101, this fact is notified to the external apparatus (step 8).

At step 9, it is confirmed that the external apparatus has properly received the command-executable notice from the magnetic disk apparatus, and then the response to the executable notice received from the external apparatus is analyzed.

At step 10, it is confirmed that the above-mentioned response processing has ended properly and that there is no error in the received response, and then the preparation processing described below is carried out in accordance with the received command.

If the command received from the external apparatus is a playback-related command (PLAY including special playback) or a search-related command (search), the following preparation processing is carried out. In order to output audiovisual data on the bus to which the external apparatus interface circuit 105 is connected, the processing for acquiring a transmission channel and the processing for acquiring a band required for transmitting audiovisual data desired to be transmitted are carried out for the management apparatus for managing the band and channel of the bus.

If the received command is record (REC), the connection establishment processing for maintaining connection condition is carried out so that, in an external apparatus outputting audiovisual data, the output of the audiovisual data is not disturbed by other external apparatuses.

If the received command is stop (STOP), processing must be carried out in accordance with the command being executed at that time. In other words, if a playback-related command (including special playback) is being executed, the processing for returning the band and transmission channel acquired for the above-mentioned management apparatus is carried out. In addition, if recording is being carried out when the received command is stop (STOP), disconnection processing is carried out.

When the preparation processing corresponding to the command is ended properly as described above, the CPU 106 carries out the processing corresponding to the commands described below.

[Record Start (REC) Command]

Figure 21:
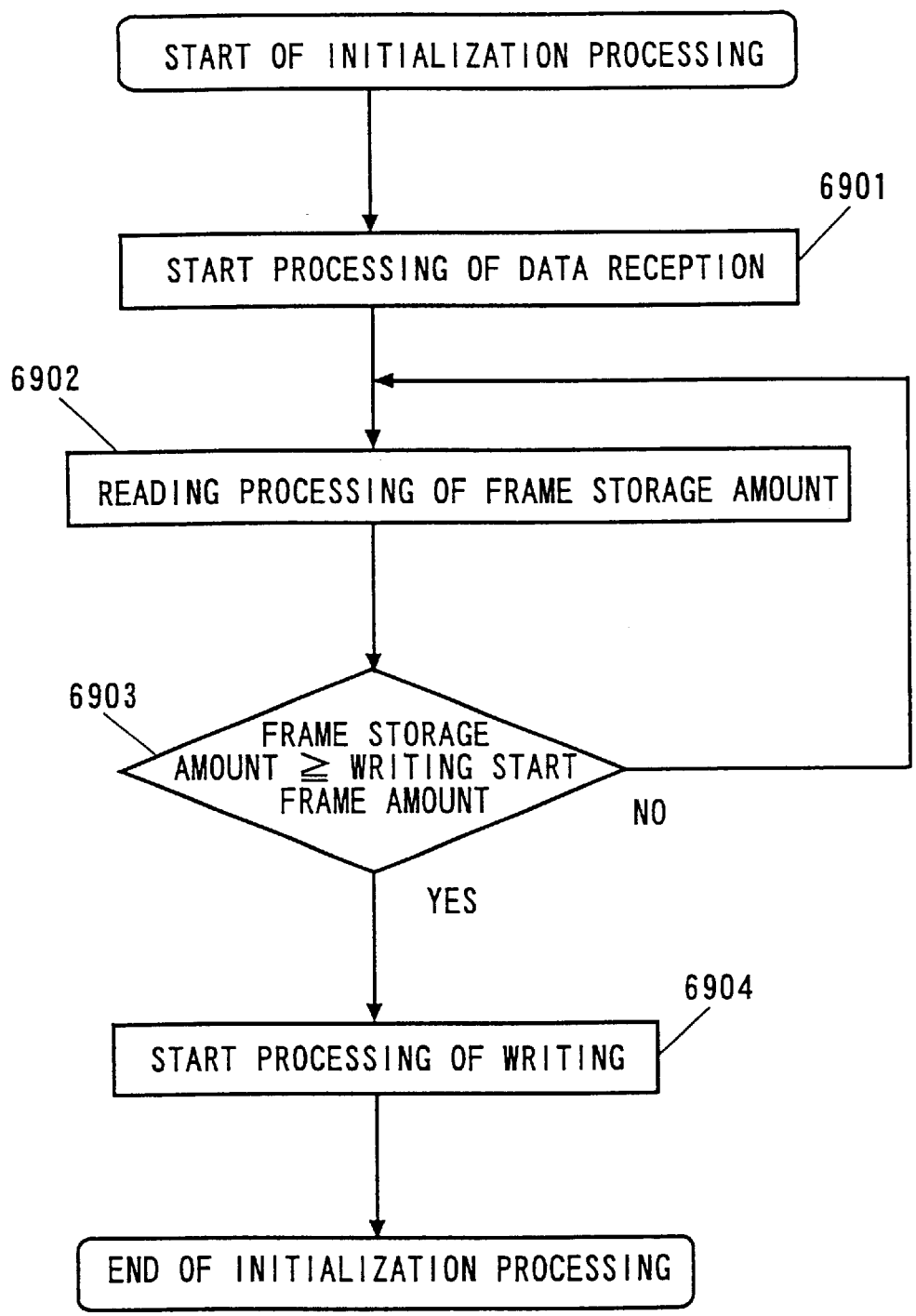
FIG. 21 is a flowchart showing the initialization processing procedure of the magnetic disk apparatus at the time of recording in accordance with Embodiment 1 of the present invention.

Next, the operation of the magnetic disk apparatus of Embodiment 1 corresponding to the record start (REC) command will be described. FIG. 21 is a flowchart showing the initialization processing in the case that the record start (REC) command is received.

At step 6901 of FIG. 21, the CPU 106 controls the external apparatus interface circuit 105, the AV data processing circuit 112 and the buffer memory control circuit 109 shown in the above-mentioned FIG. 1, thereby to carry out the following receiving start processing.

The external apparatus interface circuit 105 starts the handshake of data transfer for an external apparatus in accordance with a receiving start request from the CPU 106. A header portion, such as CIP (Common Isochronous Packet) header added to the data on the IEEE 1394 bus, is removed from the data input from the external apparatus, and only the audiovisual frame data is transferred to the AV data processing circuit 112.

The AV data processing circuit 112 starts receiving data transfer from the external apparatus interface circuit 105 in accordance with the setting from the CPU 106. Audiovisual frame boundaries are detected from input data, and frame detection signals are counted, whereby the amount of data is counted.

When necessary, the AV data processing circuit 112 carries out frame address management and access control. The input data is directly transferred to the buffer memory control circuit 109, and stored in the buffer memory 108.

The buffer memory control circuit 109 starts receiving data from the AV data processing circuit 112, and starts control for access to the buffer memory 108 in accordance with the setting from the CPU 106. Furthermore, to the access address control circuit 209 of the buffer memory control circuit 109, the CPU 106 notifies the head address and the end address in the buffer memory 108 in which audiovisual data should be stored, and sets a ring buffer configuration.

Then, the data from the AV data processing circuit 112 is written in the ring buffer area configured in the buffer memory 108.

When the data is written in the end address, the following data is written in sequence, starting from the head address of the ring buffer area.

Figure 22:
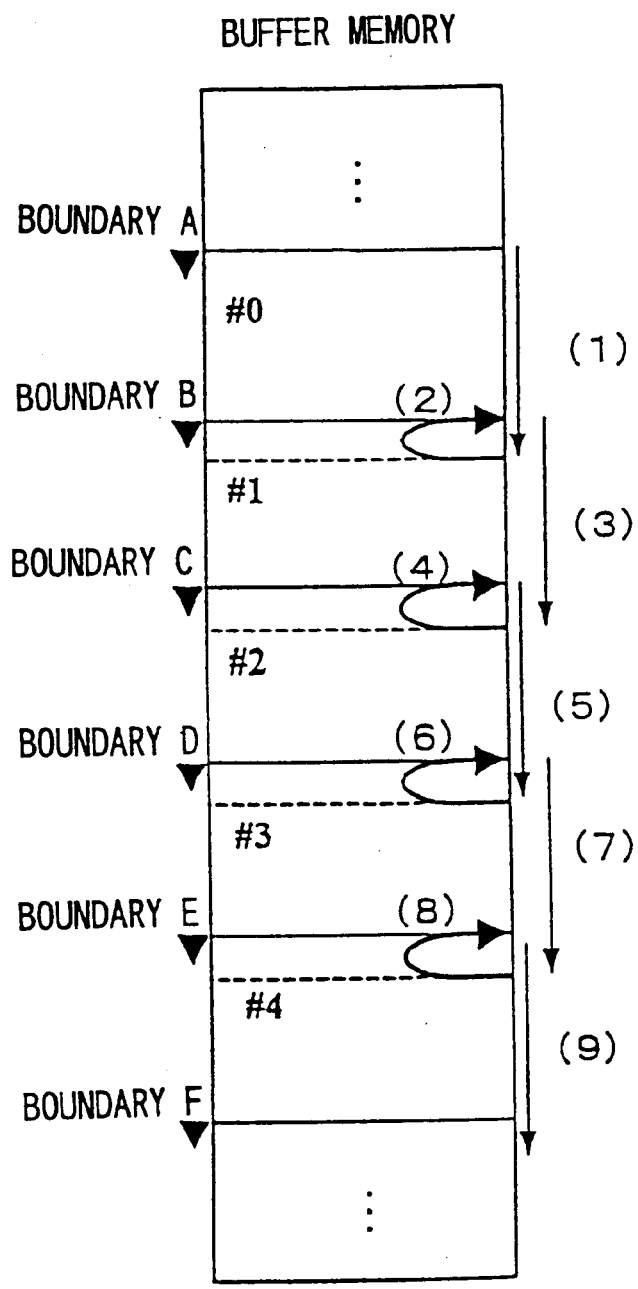
FIG. 22 is an explanatory view showing the reading sequence of the audiovisual frame data stored in the buffer memory at the time of recording in accordance with Embodiment 1 of the present invention.

FIG. 22 shows the placement of the audiovisual frame data stored in the buffer memory 108. The AV data processing circuit 112 notifies the addresses (frame addresses) in the buffer memory 108 corresponding to the detected audiovisual frame boundaries (A, B, C, . . . ) to the CPU 106. The CPU 106 temporarily stores the frame addresses in sequence.

The external apparatus interface circuit 105, the buffer memory control circuit 109 and the AV data processing circuit 112 repeat the above-mentioned processing until a receiving stop request is received from the CPU 106.

At step 6902 of FIG. 21, the CPU 106 confirms the transmitted/received data amount calculated by the transmitted/received data amount calculation circuit 208 (FIG. 2) of the AV data processing circuit 112.

At step 6903 of FIG. 21, the CPU 106 confirms as to whether the frame storage amount for the buffer memory 108 has reached a predetermined amount of writing start frames or not. When the frame storage amount has not reached the predetermined amount of writing start frames, the sequence returns to step 6902, the processing for confirming the frame storage amount is carried out repeatedly.

At step 6903 of FIG. 21, when the frame storage amount has reached the predetermined amount of writing start frames, the processing for writing audiovisual frame data on the magnetic disk 101 starts at step 6904.

[Writing Processing on Magnetic Disk]

Next, writing processing on the magnetic disk 101 will be described.

As shown in FIG. 22, audiovisual frame data is placed in the buffer memory 108.

In the data placement condition shown in FIG. 22, the frame address corresponding to the boundary A used as the read start address from the buffer memory 108 is first notified to the buffer memory control circuit 109.

On the other hand, a request for writing data for 240 sectors on the magnetic disk 101 is issued to the actuator drive circuit 111 and the signal processing circuit 110 shown in FIG. 1.

By the cooperative operation of the actuator drive circuit 111 and the signal processing circuit 110, one-frame data for 240 sectors from the frame address position corresponding to the boundary A in the buffer memory 108 is written on the magnetic disk 101. At this time, the reading pointer in the buffer memory 108 passes the next boundary B and advances to the broken line position shown in the figure.

Next, the frame address corresponding to the boundary B is notified as the next read start address from the buffer memory 108 to the buffer memory control circuit 109. In addition, a request for writing data for 240 sectors to the magnetic disk 101 is issued to the actuator drive circuit 111 and the signal processing circuit 110.

By the cooperative operation of the actuator drive circuit 111 and the signal processing circuit 110, one-frame data for 240 sectors from the frame address position corresponding to the boundary B in the buffer memory 108 is written on the magnetic disk 101. At this time, the reading pointer in the buffer memory 108 passes the next boundary C and advances to the broken line position shown in the figure.

By repeating the above-mentioned processing, the audiovisual data continuously stored in the buffer memory 108 is divided in the audiovisual frame units, each amounting to 122,880 bytes (240 sectors) including stuffing bytes (additional data), i.e., 2,880 bytes, and then written on the magnetic disk 101.

The writing processing in the audiovisual frame units, carried out as described above, is started by using the transfer end notice notified from the buffer memory control circuit 109 to the CPU 106 as a trigger.

The record start position on the magnetic disk 101 is determined by the above-mentioned address pointer 50 (FIG. 19).

After the magnetic disk apparatus of Embodiment 1 is activated, as shown in FIG. 19, the address pointer 50 is aligned with the record start address (point c) of the head audiovisual frame data of the recorded audiovisual data. In this condition, when record start (REC) is commanded, the point c on the magnetic disk 101 is selected as the record start address.

Furthermore, when audiovisual data is further recorded while the audiovisual data having already been recorded on the magnetic disk 101 is stored (additional recording), or when audiovisual data is newly recorded from the record start position (point c) of the audiovisual data after the audiovisual data has been recorded on the magnetic disk 101 (overwriting processing), the FF command (fast forward command) or the REW command (rewind command) is received and processed as described later, before the REC command from the external apparatus is processed.

[Additional Recording]

Figure 23:
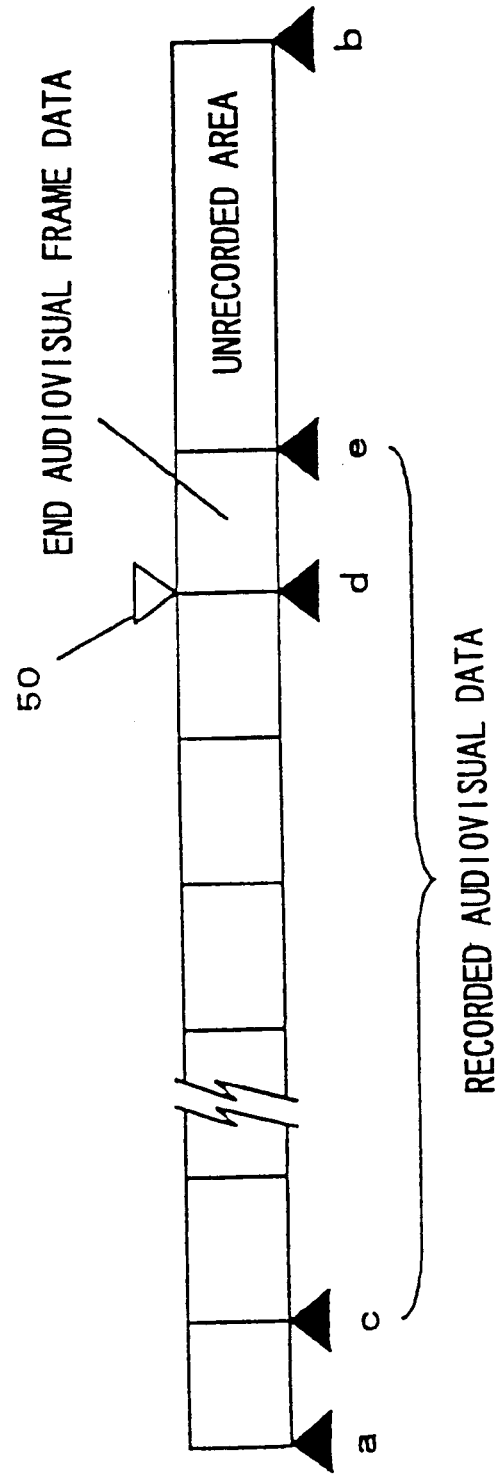
FIG. 23 is an explanatory view showing the address pointer positions at the time of record stop and at the time of FF command reception on a magnetic disk in accordance with Embodiment 1 of the present invention.
Figure 24:
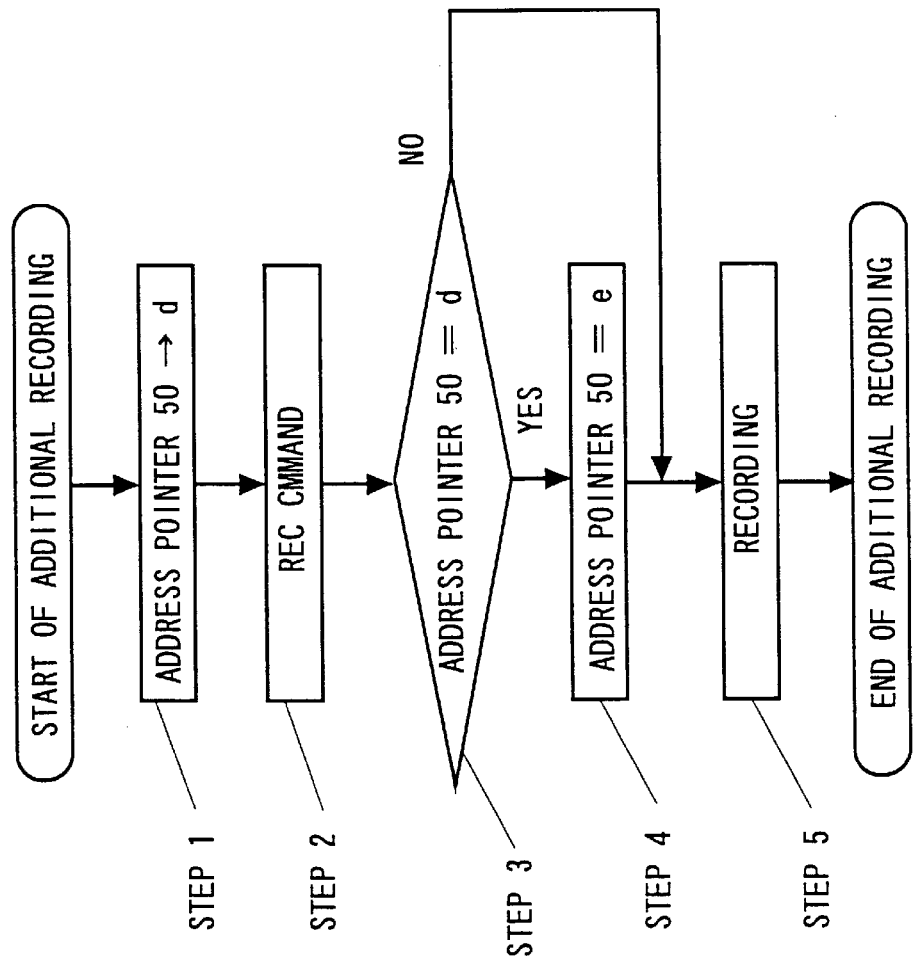
FIG. 24 is a flowchart showing the operation procedure in the case that additional recording is carried out, in accordance with Embodiment 1 of the present invention.
Figure 25:
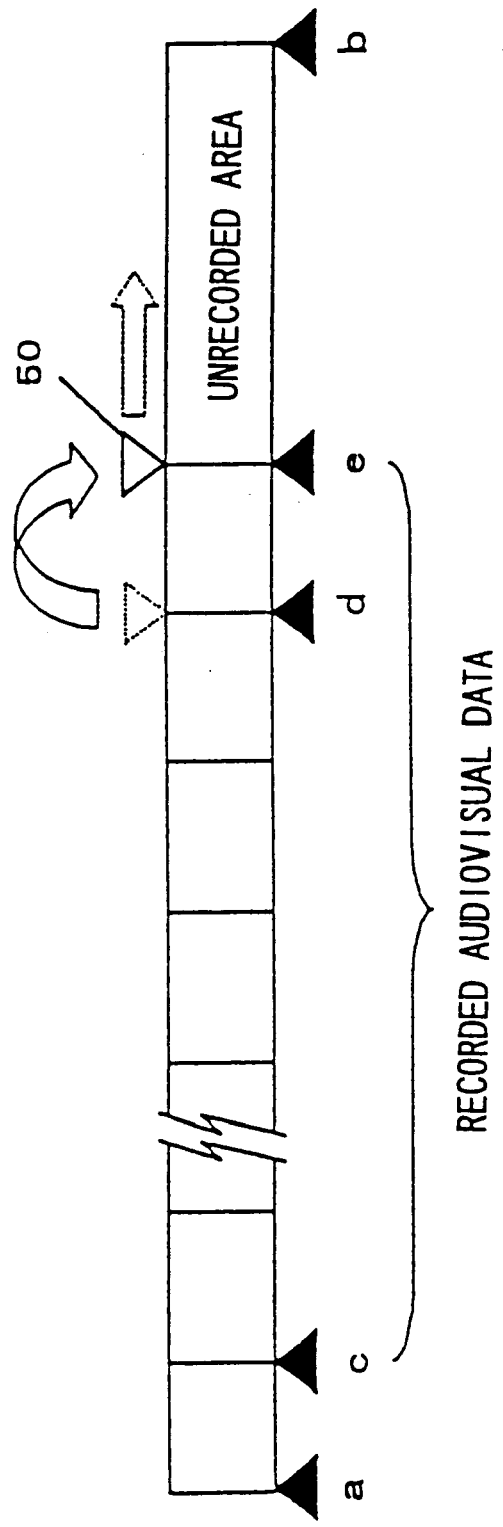
FIG. 25 is an explanatory view showing the address pointer positions at the time of record start in the case that additional recording is carried out in accordance with Embodiment 1 of the present invention.

Additional recording will be described below by using FIGS. 23, 24 and 25. FIG. 23 is a conceptual view showing a data storage condition in the recording area of, the magnetic disk. FIG. 24 is a flowchart showing the additional recording in the magnetic disk apparatus of Embodiment 1. FIG. 25 is a conceptual view showing a data storage condition on the magnetic disk in the case of the additional recording.

In the case when the magnetic disk apparatus of Embodiment 1 carries out the additional recording, at the reception of the FF command (fast forward command), the CPU 106 used as an address management means sets the address pointer 50 at the record start address (point d) of the end audiovisual frame data of the recorded audiovisual data (FIG. 23 and step 1 of FIG. 24).

Next, at the reception of the REC command (at step 2 of FIG. 24), the CPU 106 used as a recording control means makes a confirmation as to whether the current address pointer 50 aligns with the record start address (point d) of the end audiovisual frame data of the recorded audiovisual data (at step 3 of FIG. 24).

When the address pointer 50 has the same value as that of the record start address (point d) of the end audiovisual frame data of the recorded audiovisual data, the CPU 106 sets the value of the address pointer 50 at the same value as that of the head address (point e) of the unrecorded area stored in the built-in RAM (step 4 of FIG. 24).

As described above, the value of the address pointer 50 is set at the same value as that of the head address (point e) of the unrecorded area, and the address pointer 50 is set at the record start position for the additional recording as shown in FIG. 25, and the REC command (write command) is executed.

[Overwriting Processing]

Next, overwriting processing in the magnetic disk apparatus of Embodiment 1 will be described.

When the CPU 106 used as an address management means receives the REW command (rewind command), it sets the address pointer 50 at the value of the record start address (point c in FIG. 23) of the head audiovisual frame data of the recorded audiovisual data.

When recording (REC) is commanded next from the external apparatus, the CPU 106 selects the record start address (point c) of the head audiovisual frame data of the recorded audiovisual data, and starts recording the audiovisual data.

By the above-mentioned processing, overwriting can be carried out starting from a desired position without erasing the audiovisual data having already recorded.

When the additional recording and the overwriting processing are carried out by the magnetic disk apparatus of Embodiment 1, the additional recording and the overwriting processing can be attained easily by carrying out record processing by using the area information and address information of the audiovisual data on the magnetic disk.

The command for setting the address pointer 50 at the value of the record start address of the head/end audiovisual frame data of the recorded audiovisual data is not limited to FF (fast forward) or REW (rewind); by preparing a new command, the command may be used for attainment.

[Division Recording Method]

Next, a method for dividing audiovisual data continuously input to the buffer memory 108 and for recording the data on the magnetic disk 101 will be described.

As shown in FIG. 22, DV format audiovisual frame data is stored and placed in the buffer memory 108.

As described above, the CPU 106 sequentially designates frame addresses as read start addresses from the buffer memory 108. The designated audiovisual frame data is divided sequentially in audiovisual frame units and written on the magnetic disk 101.

[Record Continuation Processing]

Figure 26:
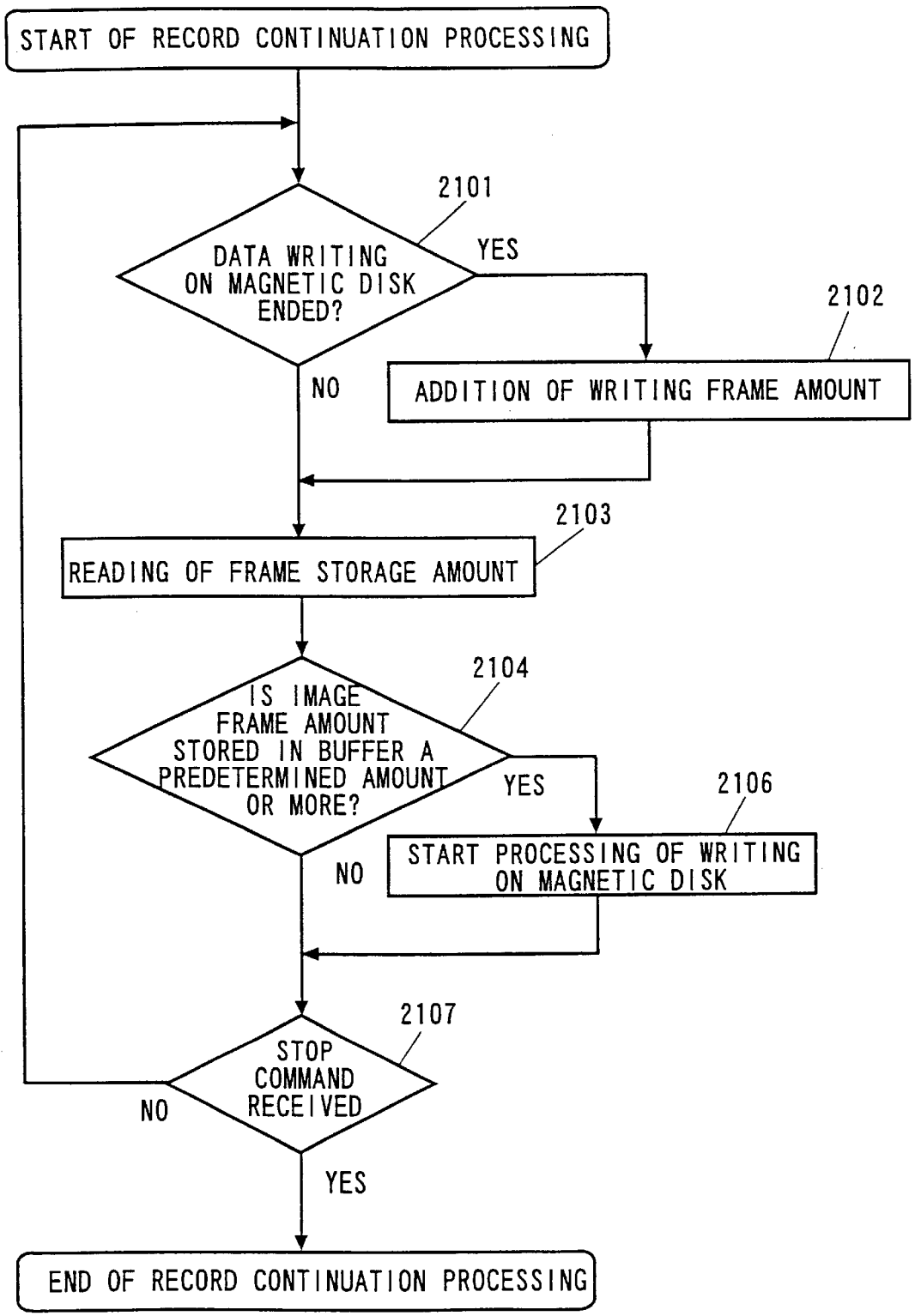
FIG. 26 is a flowchart showing the procedure for record continuation processing in accordance with Embodiment 1 of the present invention.

Next, the record continuation processing for the magnetic disk 101 in the magnetic disk apparatus of Embodiment 1 will be described by using FIG. 26. FIG. 26 is a flowchart showing the record continuation processing of Embodiment 1.

At judgment step 2101, a confirmation is made as to whether the writing processing for the magnetic disk 101 has ended or not. When the writing has ended, the amount of writing frames is updated (one frame is added) at processing step 2102.

At processing step 2103, the AV data processing circuit 112 (FIG. 2) confirms the amount of stored frames, i.e., the amount of transmitted/received data calculated by the transmitted/received data amount calculation circuit 208.

At the judgment step 2104, the amount of unwritten frames in the buffer memory 108 is calculated by subtracting the amount of written frames from the amount of frames stored in the buffer memory 108. Then, a confirmation is made as to whether the calculated amount of unwritten frames is a predetermined amount of write start frames or more.

When the amount of unwritten frames is the amount of write start frames or more, the write start processing for the head frame in the unwritten frames is carried out at processing step 2106.

At judgment step 2107, a confirmation is made as to whether the stop (STOP) command or record standby (REC PAUSE) command is received or not; when not received, the sequence returns to the judgment step 2101, and the above-mentioned record continuation processing is repeated. When the Stop or record standby command is received at the judgment step 2107, record stop processing described later is carried out.

[Record Stop Processing]

Figure 27:
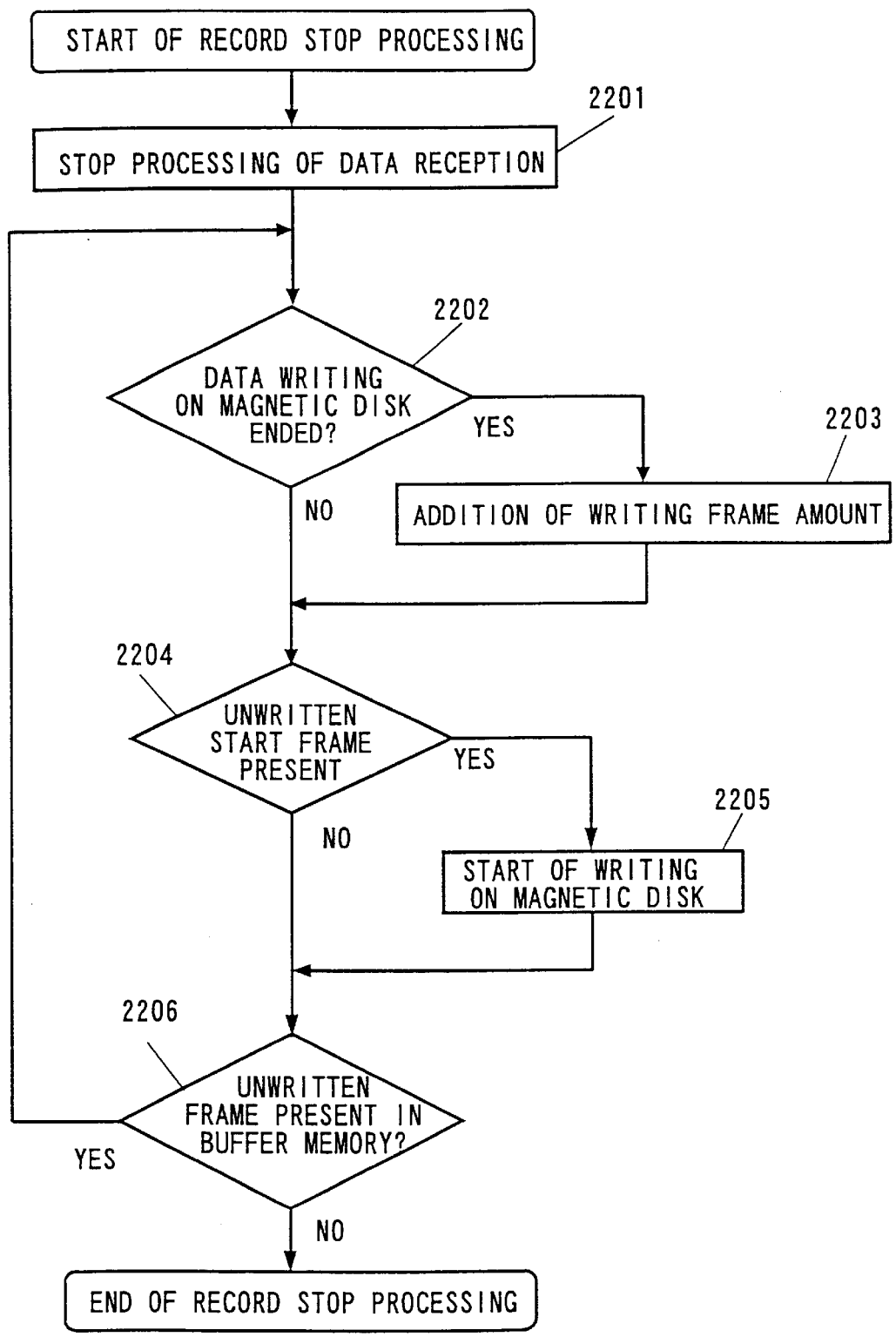
FIG. 27 is a flowchart showing the processing procedure in the case that the STOP command is received while the REC command is processed for the magnetic disk apparatus in accordance with Embodiment 1 of the present invention.

FIG. 27 is a flowchart showing the record stop processing in the magnetic disk apparatus. The record stop processing of Embodiment 1 will be described below by using FIG. 27.

At processing step 2201, the data reception processing is stopped at the external apparatus interface circuit 105 (FIG. 2) and the AV data processing circuit 112.

At judgment step 2202, a confirmation is made as to whether the writing processing for the magnetic disk 101 has ended or not. When the writing has ended, the amount of written frames is updated (one frame is added) at processing step 2203.

At judgment step 2205, a confirmation is made as to whether unwritten start frames not started to be written on the magnetic disk 101 are present in the buffer memory 108 or not. When unwritten start frames are present, the write start processing for the magnetic disk 101 is carried out at processing step 2205.

At judgment step 2206, a confirmation is made as to whether audiovisual frames having not been written are stored in the buffer memory 108 or not. When audiovisual frames having not been written are stored in the buffer memory 108, the sequence returns to judgment step 2202, and the above-mentioned stop processing is carried out repeatedly.

When the stop (STOP) or record standby (REC PAUSE) command is issued, and when the above-mentioned record stop processing for the magnetic disk 101 is ended, the CPU 106 carries out the following processing.

For example, in the audiovisual data storage condition shown in FIG. 18, when the audiovisual frame data of the end audiovisual data remaining in the buffer memory 108 is recorded from the point d, the CPU 106 updates the pointer address 50 stored in the built-in RAM to the same value as that of the record start address (point d) of the end audiovisual frame data of the recorded audiovisual data.

When the audiovisual data has been recorded on the magnetic disk 101, the CPU 106 used as a recording area management means updates the area information of the above-mentioned recorded audiovisual data stored in the built-in RAM.

Furthermore, the updated area information of the recorded audiovisual data in the built-in RAM is recorded on the magnetic disk 101. When the updated area information of the recorded audiovisual data has been written on the magnetic disk 101, record stop or record standby processing has been completed.

In Embodiment 1, the area information size of the recorded audiovisual data is made constant. Therefore, the record start address of the head frame data of the recorded audiovisual data becomes the point c at all times. On the other hand, the record start address of the end audiovisual frame data of the recorded audiovisual data and the head address of the unrecorded area are changed depending on the amount of the audiovisual data recorded on the disk 11 (101 sic).

Figure 28:
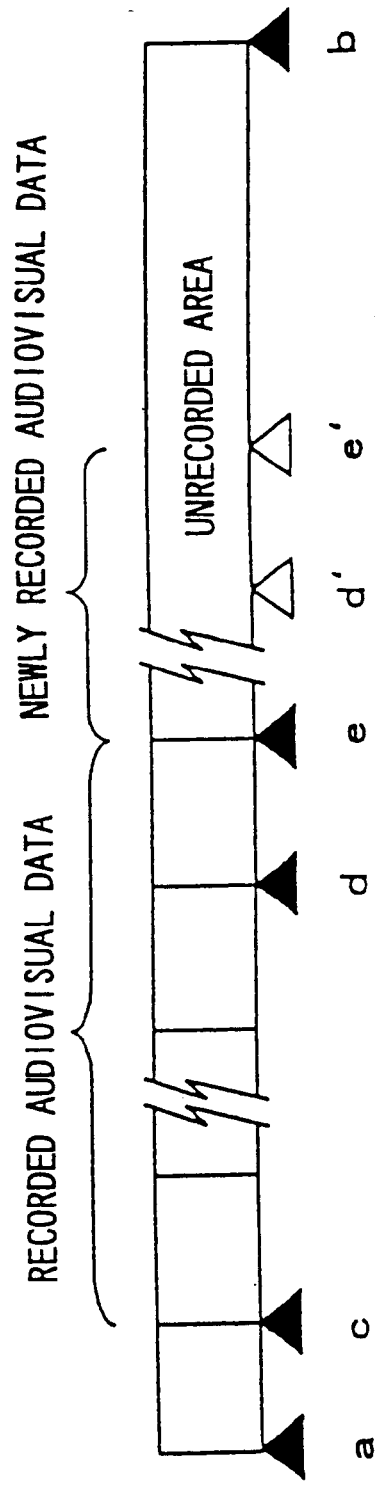
FIG. 28 is an explanatory view showing the address information at the time of additional recording in accordance with Embodiment 1 of the present invention.

FIG. 28 is an explanatory view showing a case wherein audiovisual data is newly recorded in the recording area having the recorded audiovisual data. As shown in FIG. 28, for example, in the condition where audiovisual data has been recorded up to the address immediately before the head address (point e) of the unrecorded area, where new audiovisual data is recorded up to the address immediately before point e' (additional recording), the area information of the recorded audiovisual data is updated as described below.

[Renewal Processing for Area Information]

Figure 29:
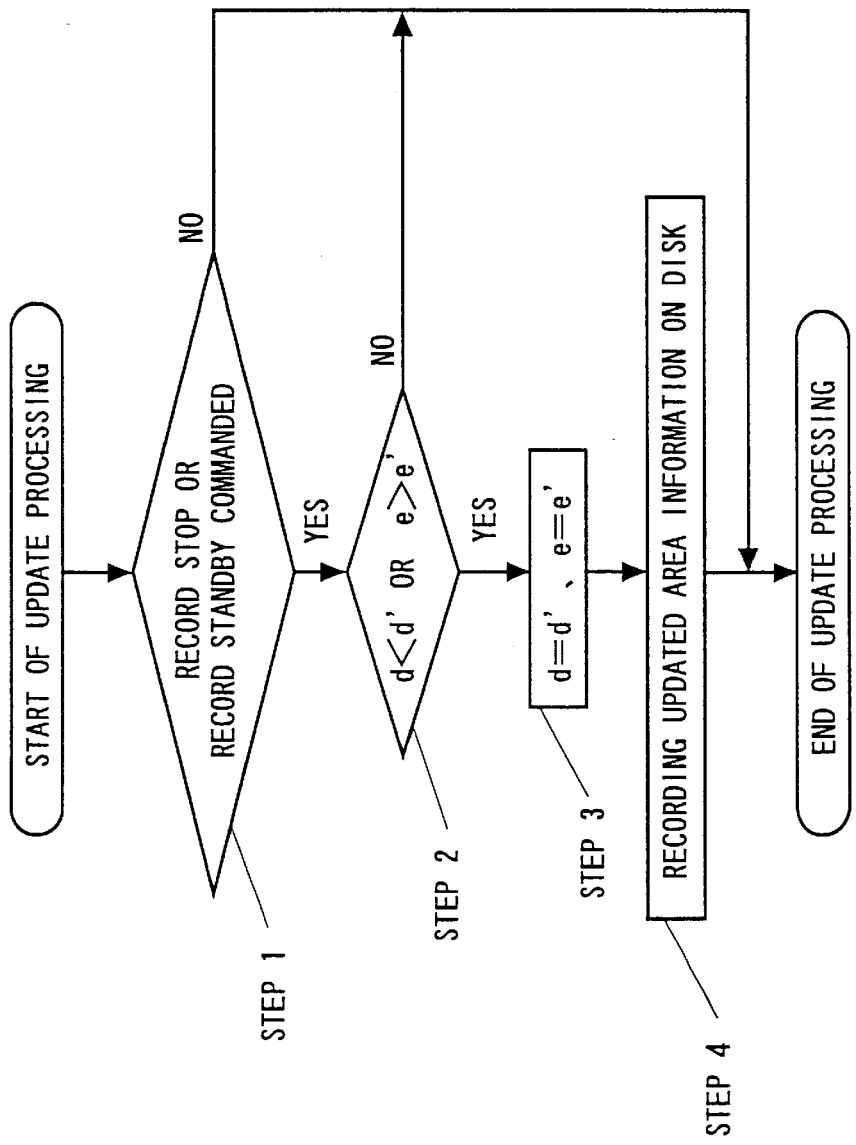
FIG. 29 is a flowchart showing the operation procedure at the time of address information update after additional recording in accordance with Embodiment 1 of the present invention.

FIG. 29 is a flowchart explaining an example of update processing for the area information of recorded audiovisual data.

When record stop or record standby is commanded, it is assumed that audiovisual data has been recorded up to the address immediately before the point e' of the recording area on the magnetic disk 101, for example (at step 1 of FIG. 29).

Next, the CPU 106 used as a recording area management means compares the record start address (point d) of the end audiovisual frame data of the recorded audiovisual data stored in the built-in RAM with the record start address (point d') of the end audiovisual frame data of the newly recorded audiovisual data (step 2).

When the position of the point d' used as the record start address of the end audiovisual frame data of the newly recorded audiovisual data is larger than the position of the point d as the result of the comparison (when the position of the point d' is located at the right of the position of the point d), the area information of the recorded audiovisual data is updated.

More specifically, the record start address of the end audiovisual frame data of the recorded audiovisual data is updated from the point d to the point d', and the head address of the unrecorded area is updated from the point e to the point e' (at step 3). Furthermore, the updated area information of the recorded audiovisual data is recorded on the magnetic disk 101 (at step 4).

Figure 30:
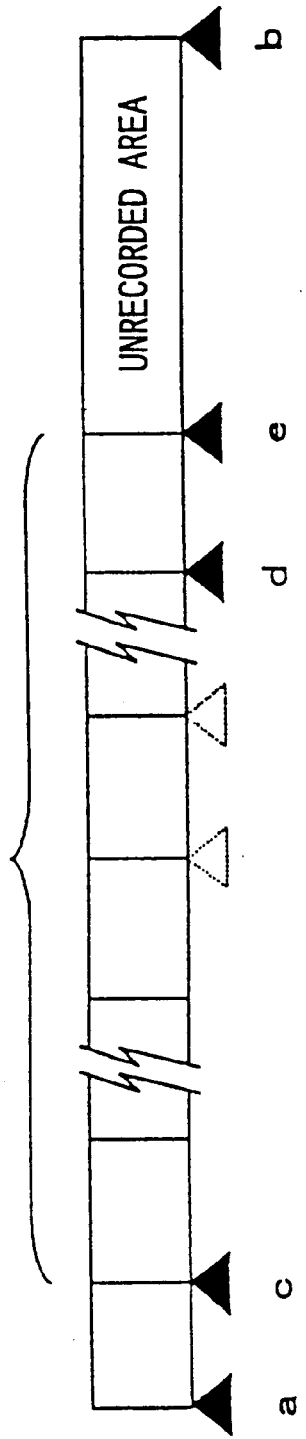
FIG. 30 is an explanatory view showing the address information updated by additional recording in accordance with Embodiment 1 of the present invention.

As the result of the above-mentioned update processing, in the area information of the recorded audiovisual data, the positions of the points a, b, c and d located in the condition shown in FIG. 28 are respectively recorded as shown in FIG. 30.

Figure 31:
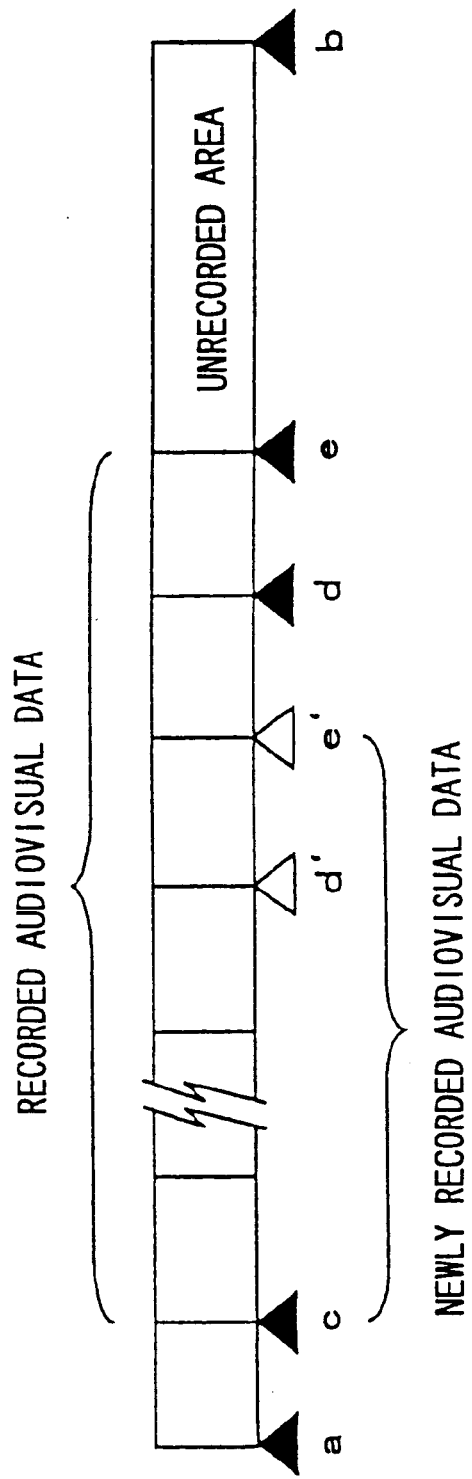
FIG. 31 is an explanatory view in the case that the address information is not updated at the end of recording in accordance with Embodiment 1 of the present invention.

On the other hand, in the condition where the audiovisual data has already been recorded up to the address immediately before the head address (point e) of the unrecorded area as shown in FIG. 31, when audiovisual data is newly recorded from the point c to the address immediately before the point e' (overwriting), the area information of the recorded audiovisual data is not updated. In other words, in the area information, the record start address of the end frame data of the recorded audiovisual data remains at the point d, and the head address of the unrecorded area remains at the point e.

In Embodiment 1, the record start address of the end frame data of the recorded audiovisual data having already been stored is compared with the record start address of the end frame data of the new audiovisual data, and the update processing of the recorded audiovisual data is carried out on the basis of the result of the comparison.

However, the present invention is not limited to Embodiment 1; it may be possible to update two pieces of address information, i. e., the record start address of the end frame data of the recorded audiovisual data and the head address of the unrecorded area at the time of each record stop, for example, without carrying out the above-mentioned comparison.

In this case, the area information only for the audiovisual data recorded most recently can be stored, regardless of recording time. The update method for the recording area information in the present invention may be configured so as to be selectable depending on its purpose, and is not limited to the above-mentioned configuration of Embodiment 1.

[Playback Start (PLAY) Command]

Figure 32:
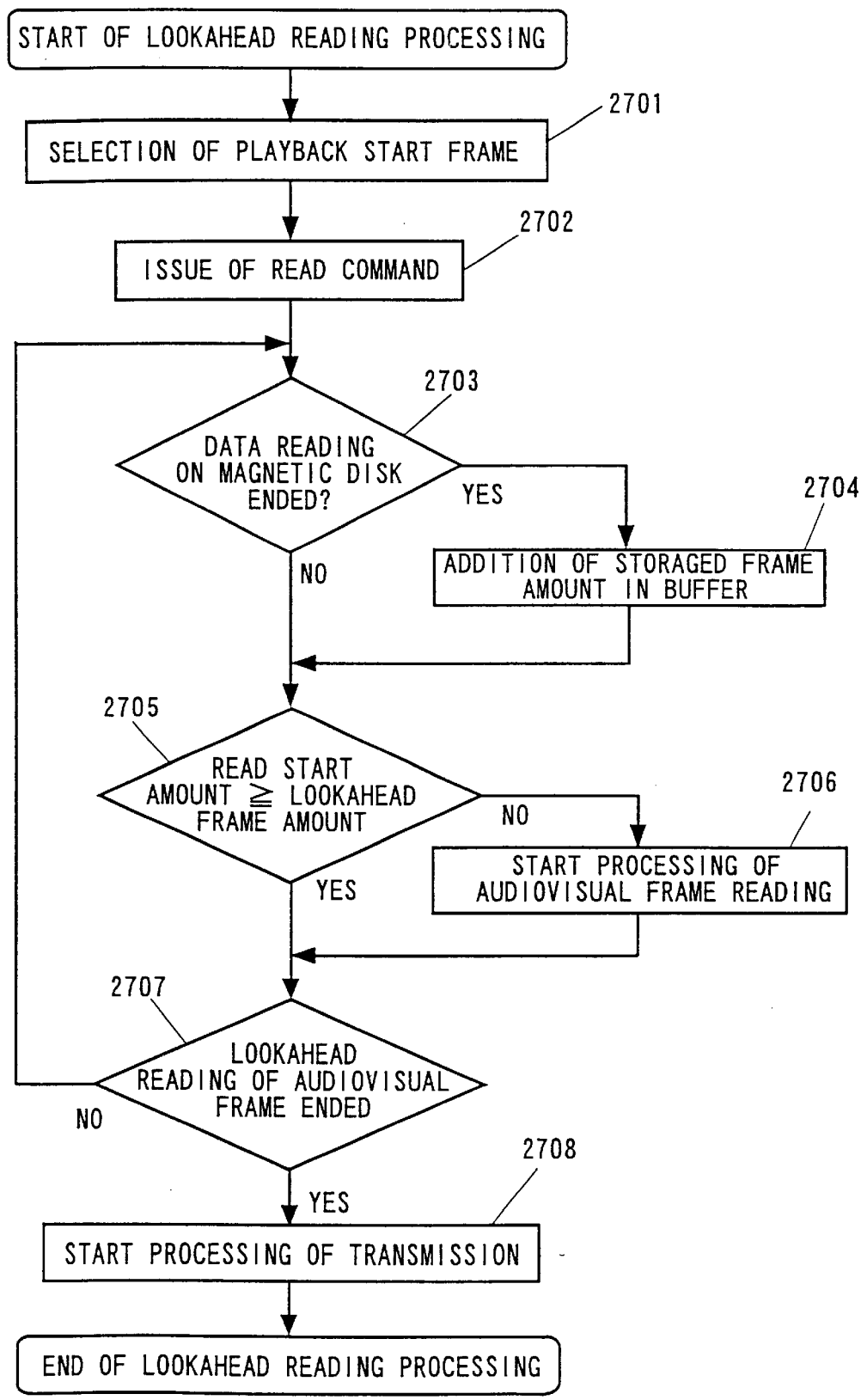
FIG. 32 is a flowchart showing the look-ahead reading procedure corresponding to the PLAY command of the magnetic disk apparatus in accordance with Embodiment 1 of the present invention.

Next, the operation of the disk apparatus corresponding to the playback start (PLAY) command will be described below. FIG. 32 is a flowchart showing look-ahead processing at the time when the playback start (PLAY) command is received.

First, when the magnetic disk apparatus of Embodiment 1 has received the playback start (PLAY) command, the look-ahead processing shown in FIG. 32 is carried out.

At processing step 2701 of FIG. 32, the CPU 106 selects the address corresponding to the position of the address pointer 50 as the playback start position on the magnetic disk 101, just as in the case of the above-mentioned record start position.

After the activation of the magnetic disk apparatus, the address pointer 50 is set at the same value as that of the record start address (point c) of the head audiovisual frame data of the recorded audiovisual data by the CPU 106 used as an address management means. Therefore, the point c is selected as the playback start position as shown in FIG. 19.

As described later, when the fast forward (FF) command is received before the playback start (PLAY) command is received, the CPU 106 used as an address management means aligns the address pointer 50 with the record start address (point d) of the end audiovisual frame data of the recorded audiovisual data as shown in FIG. 23, whereby the head address of the end audiovisual frame data of the recorded audiovisual data becomes the playback start position.

In the condition wherein the address pointer 50 is located at the point d (FIG. 23), when reverse playback is commanded, reverse playback can be performed in sequence, starting from the end audiovisual frame data of the recorded audiovisual data.

Next, at processing step 2702 of FIG. 32, the CPU 106 issues a data read command, and each circuit carries out the following processing.

First, by the cooperative operation of the actuator drive circuit 111 and the signal processing circuit 110, the audiovisual data read from the magnetic disk 101 is stored in the buffer memory 108. When a predetermined amount of audiovisual data is stored in the buffer memory 108, the buffer memory control circuit 109 notifies to the CPU 106 that the reading is ended.

Figure 33:
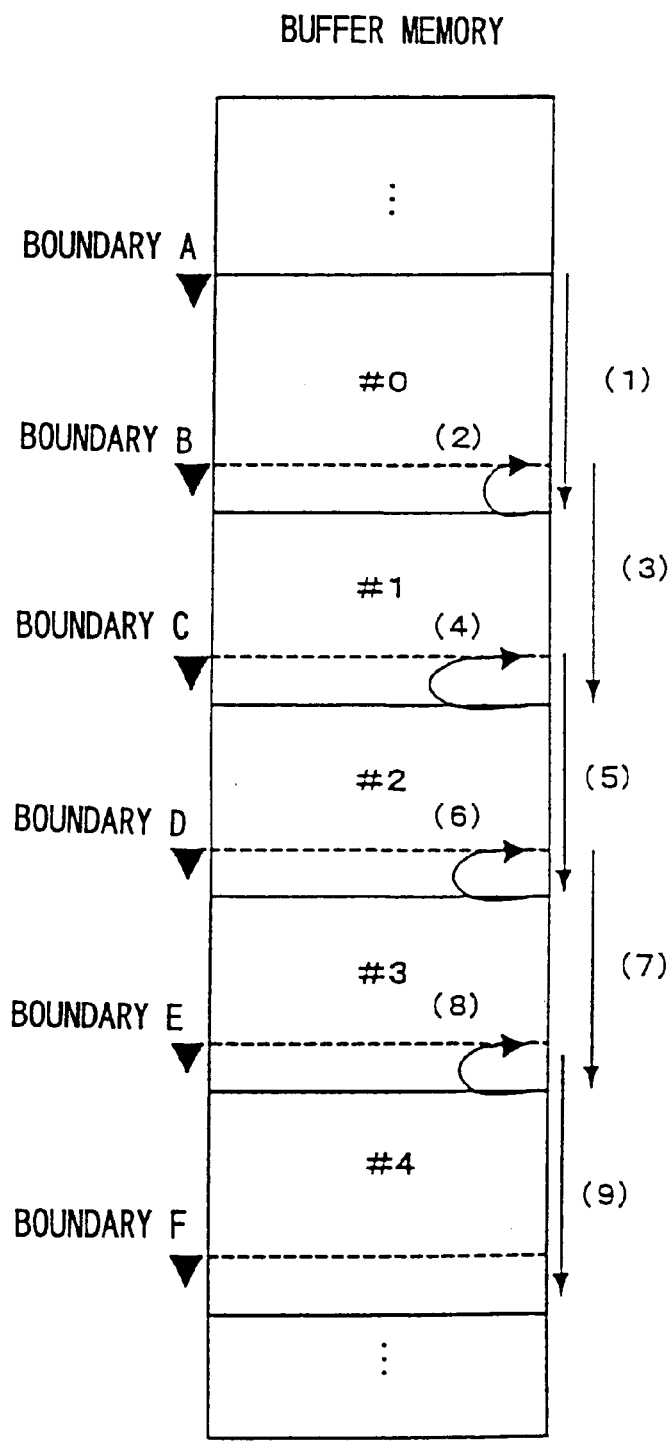
FIG. 33 is an explanatory view showing the procedure for storing data read from the magnetic disk into the buffer memory in accordance with Embodiment 1 of the present invention.

At this time, the CPU 106 commands the buffer memory control circuit 109 (FIG. 1) to store the data read from the address at the boundary A in the buffer memory 108 shown in FIG. 33. FIG. 33 is a view showing the storage condition of the audiovisual data in the buffer memory 108, and the numbered arrows (1) to (9) in FIG. 33 indicate the sequence of reading and the directions thereof.

The buffer memory control circuit 109 sequentially stores the audiovisual data received from the signal processing circuit 110 into the buffer memory 108, starting from the address of the boundary A, in the direction of the numbered arrow (1) of FIG. 33.

At judgment step 2703 (FIG. 32), the CPU 106 makes a confirmation as to whether a reading processing end notice has been generated or not from the buffer memory control circuit 109. When the reading processing end notice is present, the frame storage amount is updated (one frame is added) and stored at processing step 2704.

On the other hand, when no reading processing notice is present, the CPU 106 makes a confirmation as to whether predetermined look-ahead frame amount reading processing has started or not at judgment step 2705 of FIG. 32. When the reading processing is insufficient for the predetermined look-ahead frame amount, the start of the reading processing for the next audiovisual data frame is requested to each circuit at processing step 2706.

At this time, the CPU 109 commands the buffer memory control circuit 109 to store the read data from the address of the boundary B of the buffer memory 108. The address of the boundary B is the address corresponding to the head data of the additional data (for example, stuffing bytes: 2880 bytes) added at the time of recording.

When the read data is stored starting from the address of the boundary B of the buffer memory 108, the buffer memory control circuit 109 returns the write pointer of the buffer memory 108 to the boundary B (the arrow (2) of FIG. 33) in accordance with the command from the CPU 106, and stores the audiovisual data received from the signal processing circuit 110, starting from the address of the boundary B (the arrow (3) of FIG. 33) as shown in FIG. 33.

Hereinafter, in the same way, the write pointer is executed for each audiovisual frame in the directions of the arrows (4), (6) and (8). Therefore, the audiovisual data is sequentially recorded by the REC command in the buffer memory 108 in the condition just as received from the external apparatus.

At judgment step 2707 of FIG. 32, when the frame storage amount becomes the predetermined look-ahead frame amount or more, the CPU 106 judges that the look-ahead processing has ended. When the look-ahead processing has not ended, the sequence returns to judgment step 2703, and the look-ahead processing continues.

At processing step 2708, the buffer memory control circuit 109 and the external apparatus interface circuit 105 are controlled to start the following processing for transmitting the audiovisual data stored in the buffer memory 108 to the external apparatus.

The transmission processing is carried out as described below.

The audiovisual data stored in the buffer memory 108 is transmitted to the audiovisual frame detection circuit 205. The audiovisual frame detection circuit 205 starts the audiovisual frame boundary detection processing as described above. The frame detection signal of the audiovisual frame detection circuit 205 is transmitted to the data output timing control circuit 211 together with the audiovisual data.

The data output timing control circuit 211 adjusts the timing of data output to the external apparatus interface circuit 105 in synchronization with the frame detection signal. The data output timing control circuit 211 synchronizes the output timing of the audiovisual frame data with the frame boundary detection timing.

Each circuit in the magnetic disk apparatus continues transmission processing until a transmission stop request is generated from the CPU 106.

Figure 34:
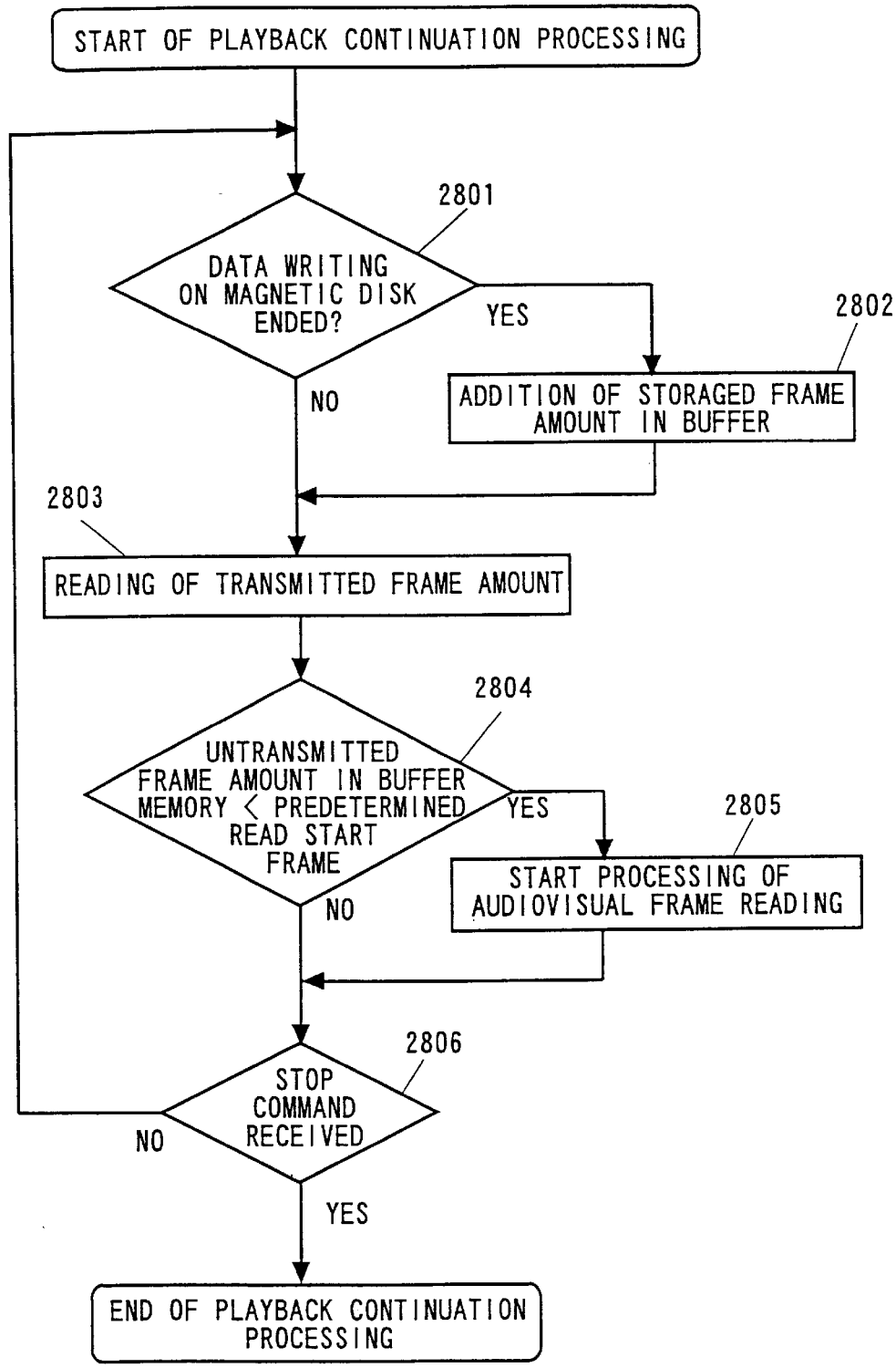
FIG. 34 is a flowchart showing the playback continuation processing procedure corresponding to the PLAY command of the magnetic disk apparatus in accordance with Embodiment 1 of the present invention.

Next, the playback continuation processing after the end of the look-ahead processing shown in FIG. 32 will be described by using FIG. 34. FIG. 34 is a flowchart showing the playback continuation processing in Embodiment 1.

At judgment step 2801 of FIG. 34, the CPU 106 judges as to whether the audiovisual frame reading processing from the magnetic disk 101 has ended. When the reading processing has ended, the read frame amount is updated (one frame is added) and stored at processing step 2802.

On the other hand, when the reading processing continues, the amount of transmitted/received data calculated by the transmitted/received data amount calculation circuit 208 of the AV data processing circuit 112 is read at processing step 2803 of FIG. 34.

At judgment step 2804 of FIG. 34, the amount of transmitted frames is subtracted from the amount of read frames in the buffer memory 108 to calculate the amount of untransmitted frames in the buffer memory 108. When the amount of the untransmitted frames is less than the predetermined amount of read start frames, reading processing for the next audiovisual frame starts (at processing step 2805).

At judgment step 2806, a judgment is made as to whether the stop (STOP) command is received or not. When the stop (STOP) command is not received, the sequence returns to judgment step 2801, and the playback continuation processing continues.

Figure 35:
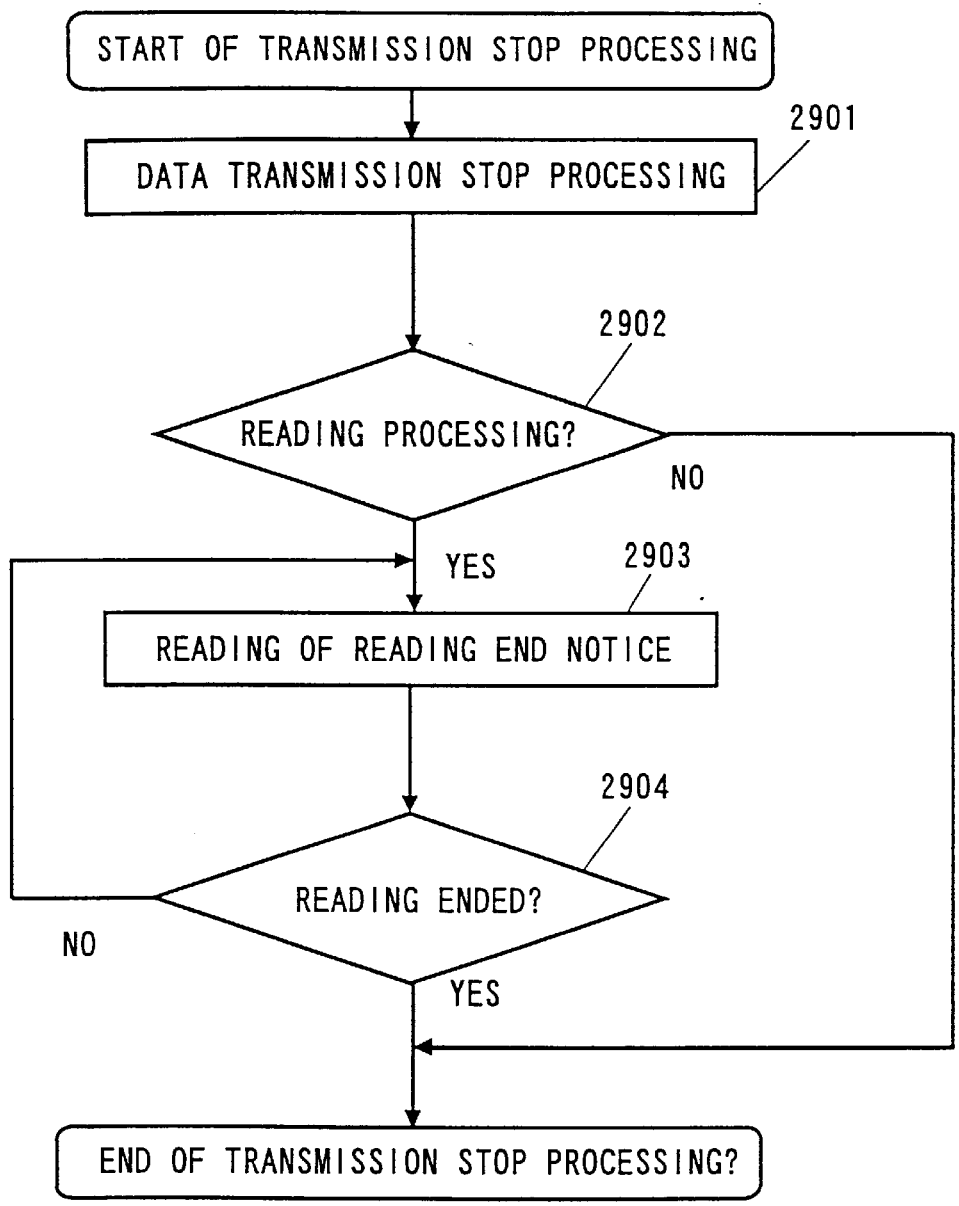
FIG. 35 is a flowchart showing the transmission stop processing procedure corresponding to the STOP command received during the playback processing of the magnetic disk apparatus in accordance with Embodiment 1 of the present invention.

For the transmission stop operation in the case that the stop (STOP) command is received, the transmission stop processing shown in FIG. 35 is carried out.

At processing step 2901 of FIG. 35, the external apparatus interface circuit 105, the AV data processing circuit 112 and the buffer memory 108 are controlled to carry out the transmission stop processing.

At judgment step 2902 of FIG. 35, a judgment is made as to whether reading processing is being carried out by the magnetic disk 101 or not. When reading processing is being carried out, a read end notice is read at processing step 2903.

At judgment step 2904, a confirmation is made as to whether the reading processing has ended or not; when the reading processing has not ended, the sequence returns to processing step 2903, the read end notice is read repeatedly, and the end of reading is confirmed.

In Embodiment 1, audiovisual frame data (frame number: #0) corresponding to a virtual magnetic head position is first selected as playback data. The magnetic disk apparatus, i. e., a hard disk apparatus, in Embodiment 1 receives additional information, such as playback direction and playback speed information, corresponding to the PLAY command from the external apparatus. The playback data selection method corresponding to the additional information will be described below.

The audiovisual frame data selected corresponding to the playback direction and playback speed information is stored in the buffer memory in units of record frame data (122,880 bytes) including additional data.

Figure 36:
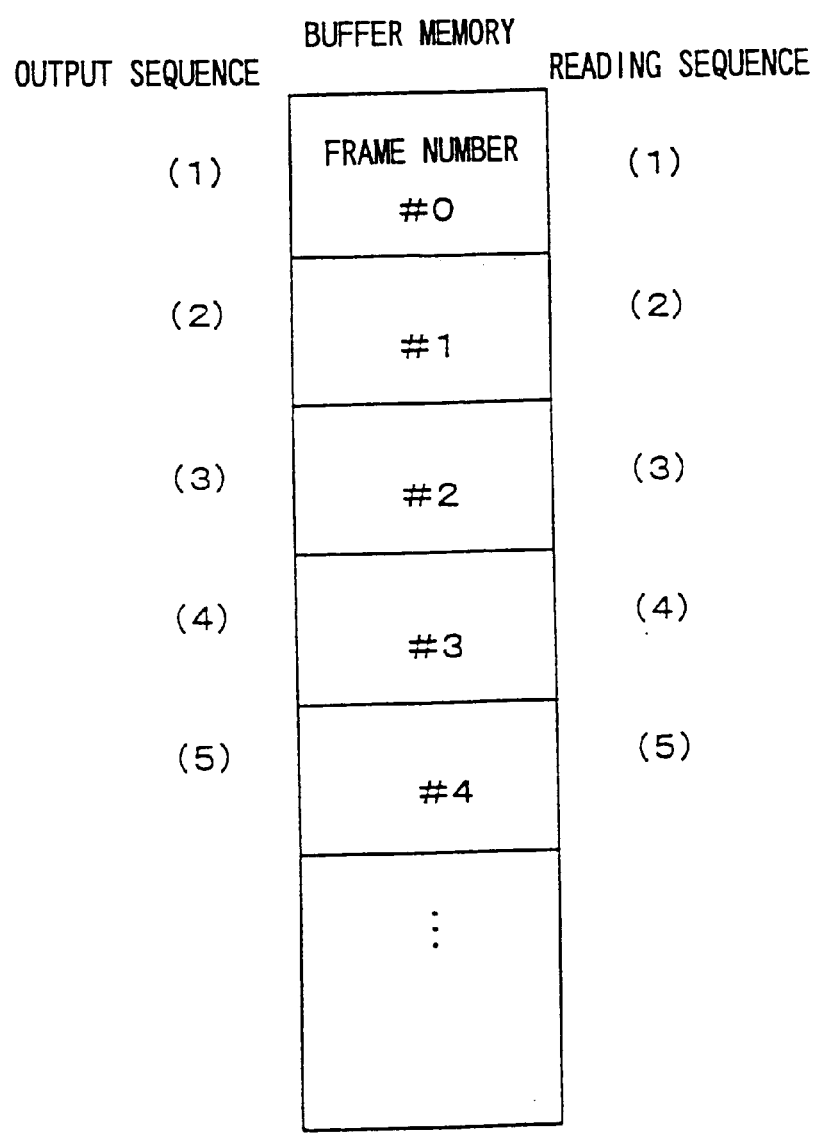
FIG. 36 is an explanatory view showing the playback processing at the time of forward direction/normal-speed playback in accordance with Embodiment 1 of the present invention.

A) In the case of forward direction/normal-speed playback:

In the case of forward direction/normal-speed playback in the magnetic disk apparatus of Embodiment 1, audiovisual frame data is sequentially selected in the sequence (#1, #2, . . . ) of recording. The audiovisual frame data read from the magnetic disk 101 is sequentially placed in a continuous area in the buffer memory 108 and stored as shown in FIG. 36.

The audiovisual frame data in the buffer memory 108 is sequentially output from the magnetic disk 101 to the AV data processing circuit 112 in the sequence (#0, #1, #2, . . . ) of reading, and transmitted to the external apparatus as stream data.

Figure 37:
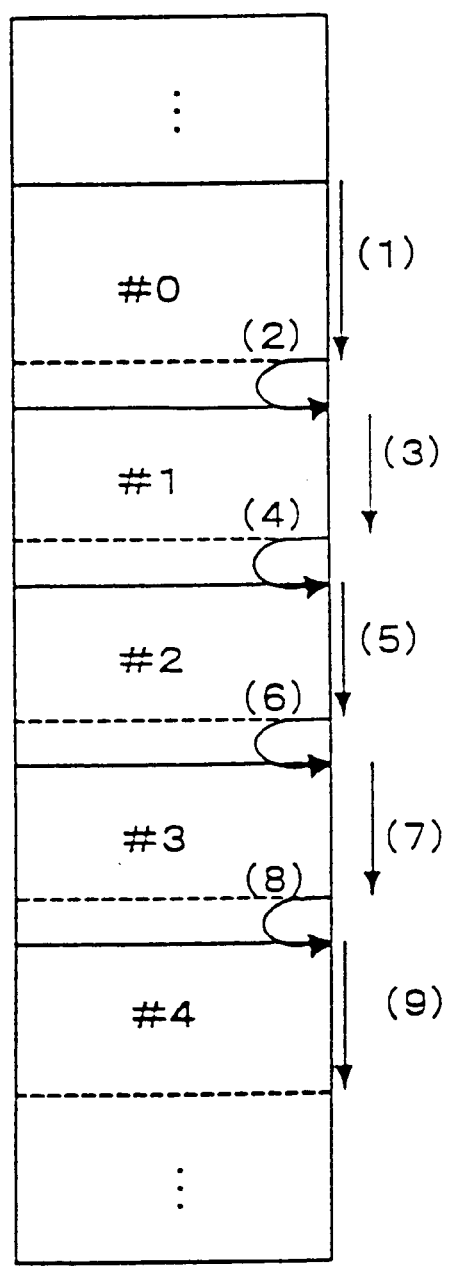
FIG. 37 is an explanatory view showing the reading sequence for the audiovisual frame data stored in the buffer memory at the time of playback in accordance with Embodiment 1 of the present invention.

FIG. 37 is a view explaining the sequence of data output from the buffer memory 108.

First, the buffer memory 108 reads in the direction of the arrow (1) of FIG. 37, and outputs data of 120,000 bytes, starting from the head of the audiovisual frame data #0.

Immediately after that, the read pointer is moved in the direction of the arrow (2) of FIG. 37, and the position of the read pointer from the buffer memory 108 is moved by the amount of the additional data (stuffing bytes: 2,880 bytes) added at the time of recording.

Next, data output starts from the head of the audiovisual frame data #1. After the data of 120,000 bytes is output (the arrow (3) of FIG. 37), the read pointer is moved again by the amount of the additional data (the arrow (4) of FIG. 37).

By repeating the above-mentioned processing, transmission data obtained by removing the stuffing bytes from the frame data read from the magnetic disk 101 is extracted.

In this way, the magnetic disk apparatus of Embodiment 1 continuously transfers the extracted audiovisual data to the external apparatus interface circuit 105 via the AV data processing circuit 112.

The external apparatus interface circuit 105 transmits the audiovisual data input from the AV data processing circuit 112 to the external apparatus as continuous stream data.

B) In the case of forward direction/high-speed (m-times speed) playback:

As a method for attaining high-speed playback, a method is available wherein the frame data in the buffer memory 108 is transmitted to the external apparatus while being thinned out.

In the high-speed playback method in the magnetic disk apparatus of Embodiment 1, audiovisual frame data is first read sequentially from the magnetic disk 101 in the sequence of frame numbers (#0, #1, #2, . . . ), and stored in the buffer memory 108.

Then, the data stored in the buffer memory 108 is transmitted to the external apparatus while being thinned out in frame units.

Figure 38:
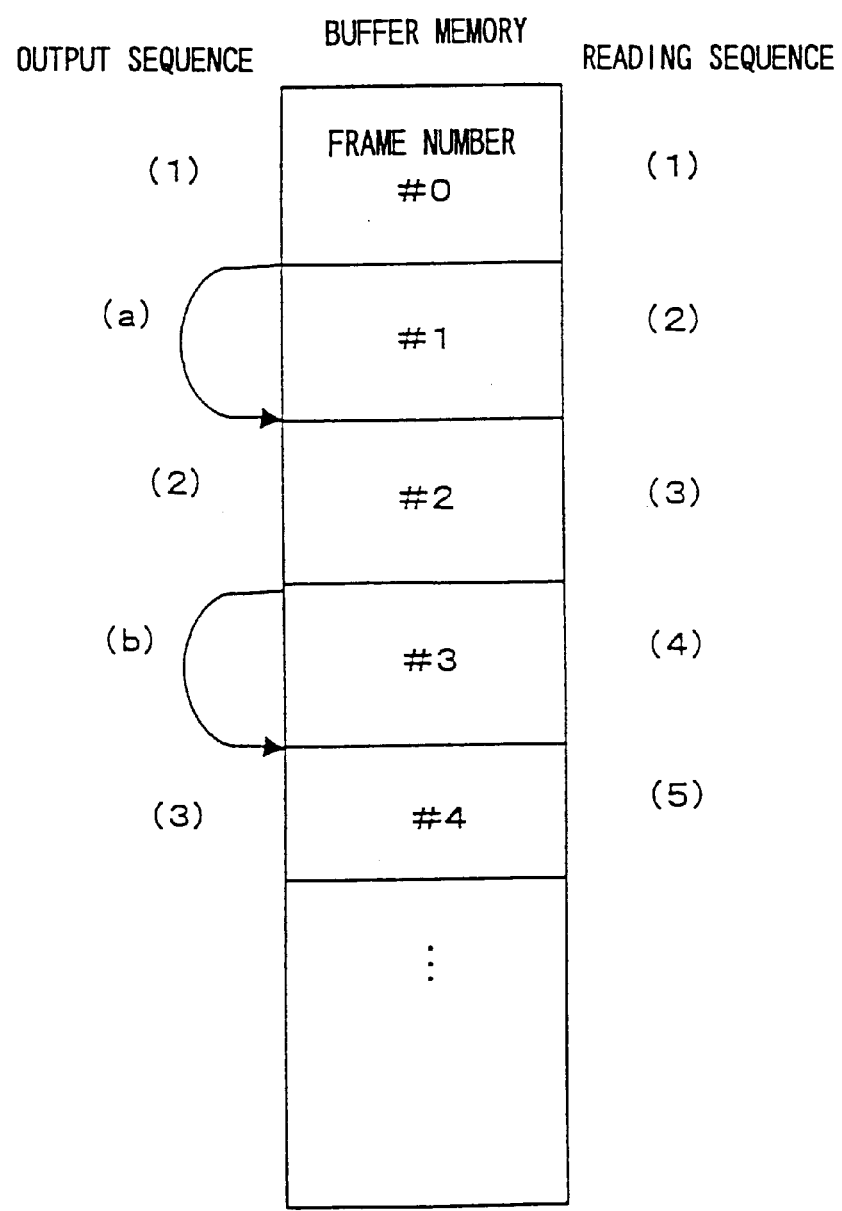
FIG. 38 is an explanatory view showing the placement of audiovisual frame data in the buffer memory at the time of high-speed playback in accordance with Embodiment 1 of the present invention.

FIG. 38 shows the storage condition of the audiovisual frame data in the buffer memory 108, and is an explanatory view showing a high-speed playback method in the forward direction. As shown in FIG. 38, in Embodiment 1, double-speed playback is attained by jumping read addresses from the buffer memory 108 in one-frame units.

As indicated by the arrows (a) and (b) of FIG. 38, the read addresses from the buffer memory 108 are jumped in one-frame units, thereby to perform double-speed playback.

In the above-mentioned high-speed playback method, by increasing the data size for address jumping in units of frames (1 frame, 2 frames, . . . ), the playback speed can be increased (double-speed, triple-speed, . . . ).

To perform m-times high-speed playback by the above-mentioned high-speed playback method, it is necessary to read data from the magnetic disk 101 at the m-times speed of the transfer speed of data transmitted to the external apparatus. When the DV stream of standard images is played back at double speed for example, it is necessary to read data from the magnetic disk at a transfer speed of 50 Mbps or more. However, the effective transfer speed of the hard disk apparatuses widely available these days is about 40 Mbps at most.

On the other hand, when audiovisual frame data is read from the magnetic disk 101 while being thinned out, the audiovisual data recorded at discontinuous areas must be read continuously. Therefore, it is necessary to secure a mechanical access operation time (the sum of the movement time and rotation wait time of the magnetic head) for each frame.

Thus, in Embodiment 1, when the read speed of the magnetic disk 101 is low, the following high-speed playback processing is carried out in the magnetic disk apparatus of Embodiment 1.

Figure 84:
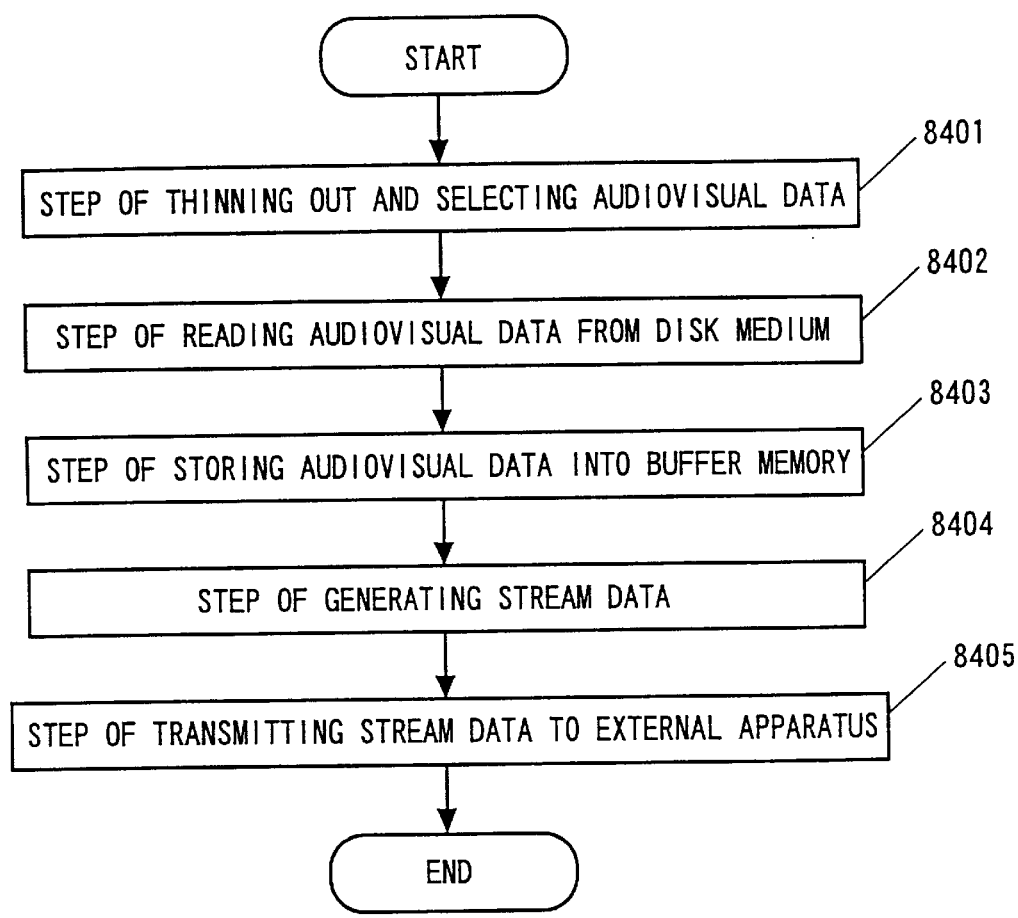
FIG. 84 is a flowchart showing a high-speed playback processing procedure in accordance with Embodiment 1 of the present invention.

The high-speed playback processing in Embodiment 1 will be described by using the flowchart shown in FIG. 84.

First, at step 8401, from among the audiovisual data recorded on the magnetic disk 101, the audiovisual data to be transmitted externally is selected in audiovisual frame units. At this time, the audiovisual data is selected from among the audiovisual data on the magnetic disk 101 while being thinned out.

Next, at step 8402, the selected audiovisual data is read from the magnetic disk 101.

Then, at step 8403, the read audiovisual data is stored in the buffer memory.

Next, at step 8404, the audiovisual data stored in the buffer memory is sequentially read plural times in audiovisual frame units to generate continuous stream data.

Next, stream data is transmitted externally at step 8205.

Figure 39:
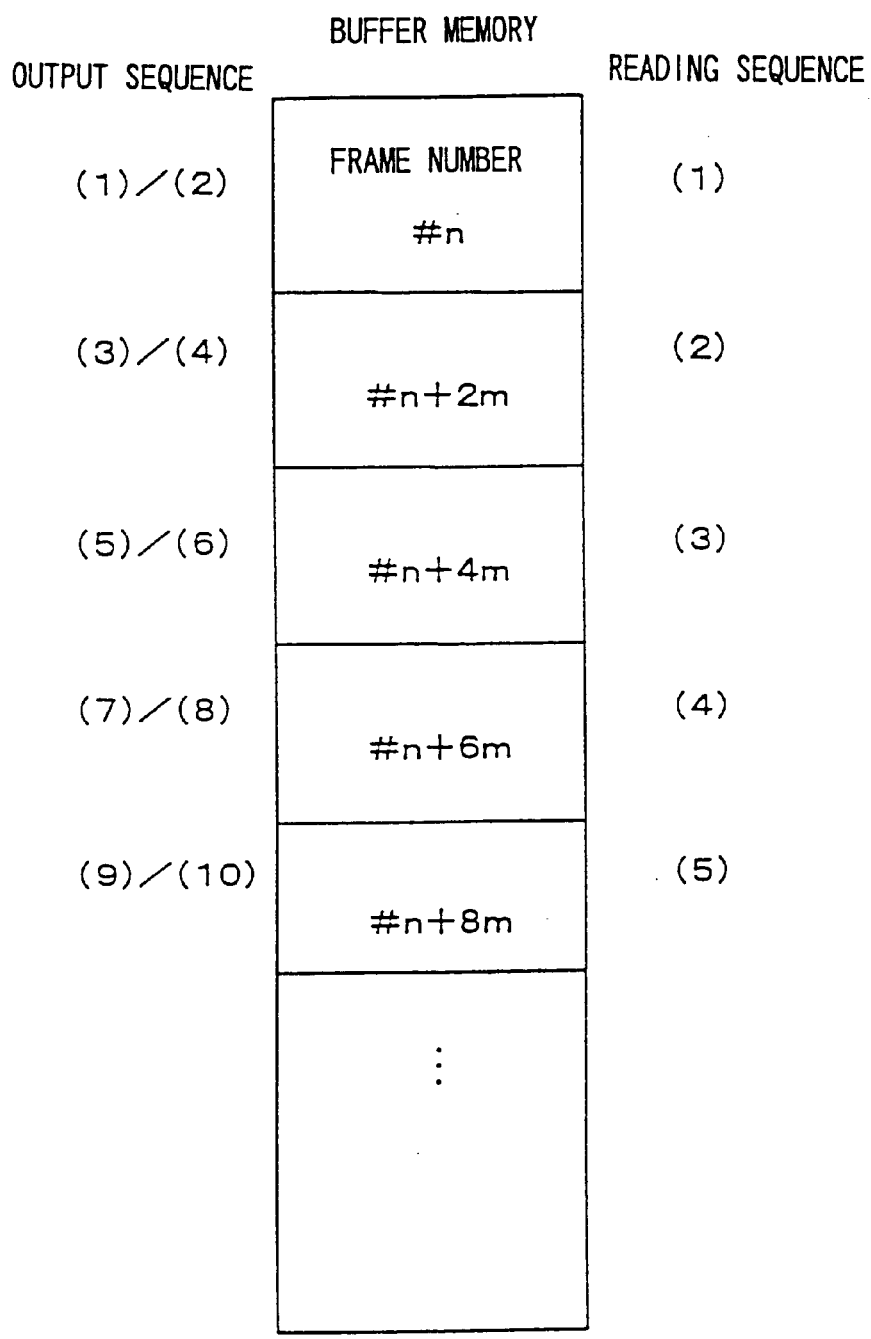
FIG. 39 is an explanatory view showing the playback processing at the time of forward direction/high-speed playback in accordance with Embodiment 1 of the present invention.

FIG. 39 shows a frame data storage condition in the buffer memory 108, and discrete audiovisual frames at predetermined frame data intervals, i.e, frame number #n, #n+2m, #n+4m, #n+6m, . . . (m: integer), are stored in the buffer memory 108.

On the magnetic disk 101, the magnetic disk apparatus of Embodiment 1 sequentially selects audiovisual frames to be played back at every 2×m (m: integer) audiovisual frames (#n, #n+2m, #n+4m, #n+6m, . . . ).

As shown in FIG. 39, discrete audiovisual frames at the predetermined frame intervals, read from the magnetic disk 101, are sequentially placed in a continuous area, and stored.

The frame data stored in the buffer memory 108 is output to the AV data processing circuit 112 in accordance with the sequence (#n, #n+2m, #n+4m, #n+6m, . . . ) read from the magnetic disk 101, twice for each piece of frame data, and transmitted to the external apparatus as stream data.

Because of the above-mentioned configuration, in the magnetic disk apparatus of Embodiment 1, its mechanical access operation ends within the transmission time for one frame of DV stream; therefore, DV stream can be played back without interruption by retransmitting (second transmission) each piece of frame data.

In the case of an apparatus having a longer mechanical access operation time at the time of reading from the magnetic disk, high-speed playback is made possible by appropriately selecting the audiovisual frame selection interval and the amount of retransmissions for each piece of frame data.

C) In the case of forward direction/slow-speed playback (1/m speed):

In the case of forward direction/slow-speed playback (1/m speed) in the magnetic disk apparatus of Embodiment 1, just as in the case of the above-mentioned forward direction/normal-speed playback (A), audiovisual frames are selected, and sequentially placed in the buffer memory 108 as shown in FIG. 36 and stored.

The audiovisual frames in the buffer memory 108 are output to the AV data processing circuit 112 in accordance with the sequence of reading from the magnetic disk 101, m times for each piece of frame data, and sequentially transmitted to the external apparatus as stream data.

D) In the case of reverse direction/normal-speed playback:

In the case of reverse direction/normal-speed playback in the magnetic disk apparatus of Embodiment 1, the following audiovisual frames ahead of one piece of frame data (#n−1, #n−2, #n−3, . . . ) are selected sequentially from the magnetic disk 101.

Furthermore, the selected audiovisual frames are sequentially put together into plural frames, and selected as frame blocks (frames #n−1, #n−2 and #n−3 are put together into one frame block, for example). Reading from the magnetic disk 101 is carried out in frame block units, and the sequence of reading data in the frame block is aligned with the sequence of recording.

Figure 40:
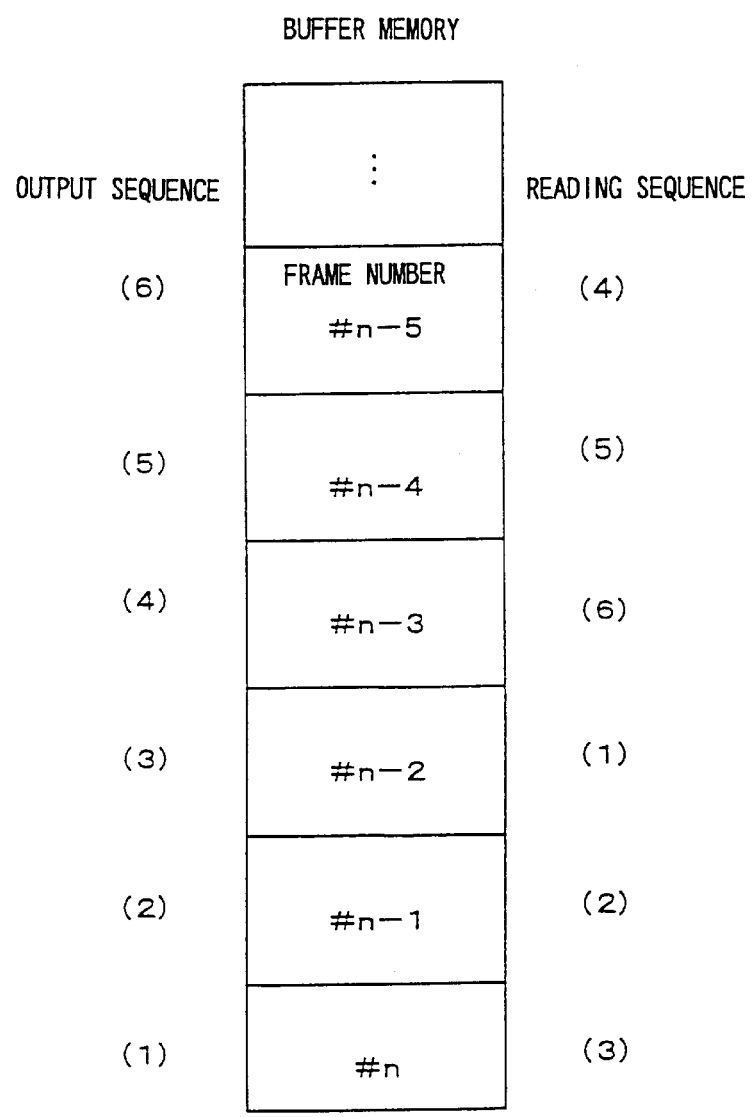
FIG. 40 is an explanatory view showing the playback processing at the time of reverse direction/normal-speed playback in accordance with Embodiment 1 of the present invention.

The audiovisual frames read from the magnetic disk 101 are sequentially placed in a continuous area in the buffer memory 108 as shown in FIG. 40 and stored. The frame data in the buffer memory 108 is sequentially output to the AV data processing circuit 112 in the reverse sequence of recording, and transmitted to the external apparatus as stream data.

In the case of the reverse direction/normal-speed playback in Embodiment 1, the audiovisual frame data in the frame block is read in the sequence of recording (in the sequence of placement on the magnetic disk 101); therefore, the audiovisual data in the frame block can be read continuously at high speed.

When the data reading speed from the magnetic disk 101 is at the minimum value of 50 Mbps, for example, the reading time for one frame (122,880 bytes) becomes about 19.7 msec. The transmission time of audiovisual data is about 33.3 msec for one frame (in the case of digital VCR format).

Therefore, when data of n frames in one frame block is read continuously, a spare time of about 13.6×n (msec) is generated for one frame block. By setting the amount of frames in the frame block so that the mechanical access operation of the magnetic head 102, occurring at each frame block, is completed within the spare time, the reverse direction/normal-speed playback can be carried out continuously without causing frame dropping.

E) In the case of reverse direction/high-speed (m-times speed) playback:

In the case of reverse direction/high-speed (m-times speed) playback in the magnetic disk apparatus of Embodiment 1, audiovisual frames on the magnetic disk 101 to be played back are selected at every (−2×m) audiovisual frames (#n−2m, #n−4m, #n−6m, . . . ).

Figure 41:
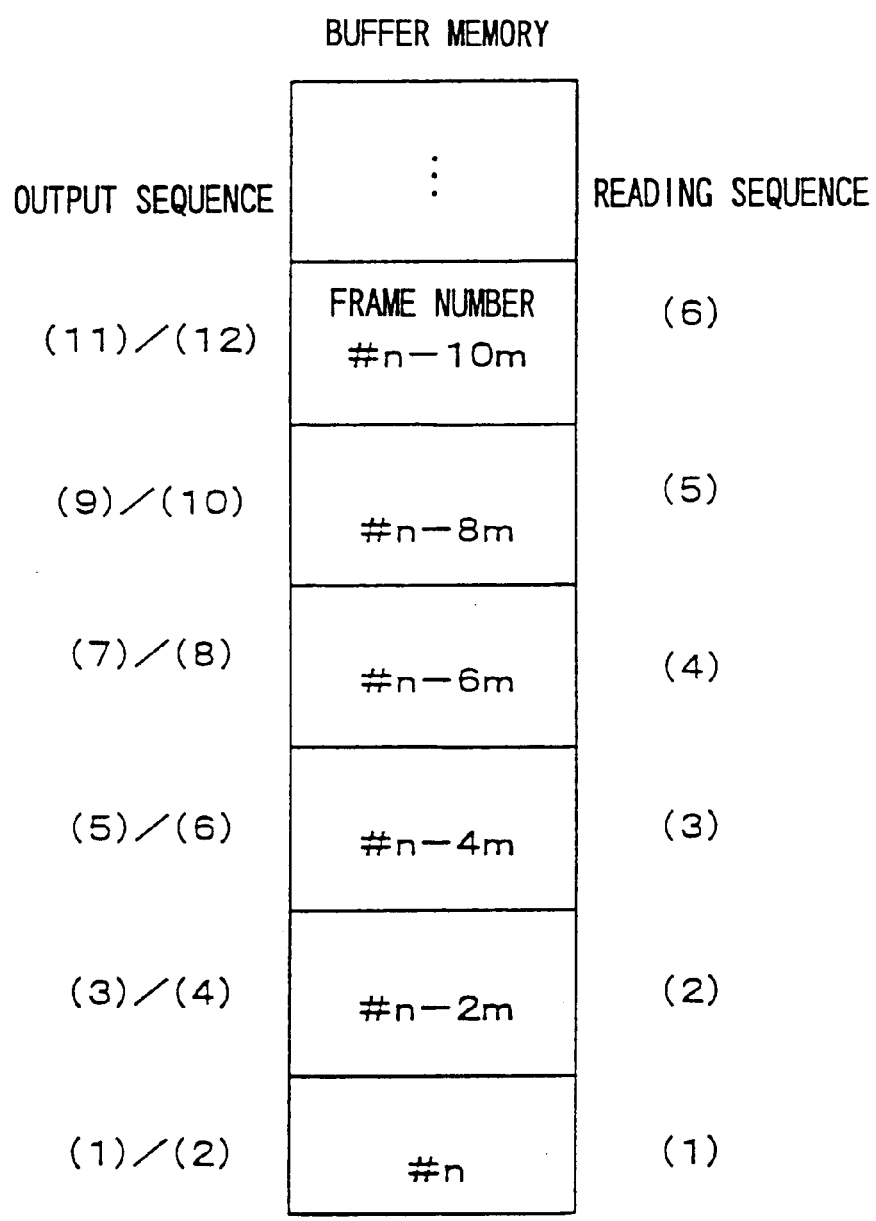
FIG. 41 is an explanatory view showing the playback processing at the time of reverse direction/high-speed playback in accordance with Embodiment 1 of the present invention.

The audiovisual frames read from the magnetic disk 101 are sequentially placed in a continuous area of the buffer memory 108 as shown in FIG. 41 and stored. The frame data in the buffer memory 108 is output to the AV data processing circuit 112, twice for each, in accordance with the sequence of reading from the magnetic disk 101, and transmitted to the external apparatus as stream data.

F) In the case of reverse direction/slow-speed playback (1/m speed):

In the case of reverse direction/slow-speed playback (1/m speed) in the magnetic disk apparatus of Embodiment 1, just as in the case of the above-mentioned forward direction/normal-speed playback (D), audiovisual frames and frame blocks are selected, and sequentially stored in the buffer memory 108 as shown in FIG. 40.

The frame data in the buffer memory 108 is output to the AV data processing circuit 112 in accordance with the sequence of reading from the magnetic disk apparatus 101, m times for each piece of frame data, and sequentially transmitted to the external apparatus as stream data.

When the magnetic disk apparatus of Embodiment 1 receives the play start (PLAY) command, and continues playback processing in the forward direction, the end audiovisual frame data of the recorded audiovisual data is reached eventually. In the opposite case of continuous reverse playback from a predetermined position, the head audiovisual frame data of the recorded audiovisual data is reached eventually.

At the end of a reading area, the magnetic disk apparatus of Embodiment 1 implements two processing methods, i.e., playback standby (PLAY PAUSE) processing and endless playback (ENDLESS PLAY) processing, and these processing methods are made selectable by external commands.

Figure 42:
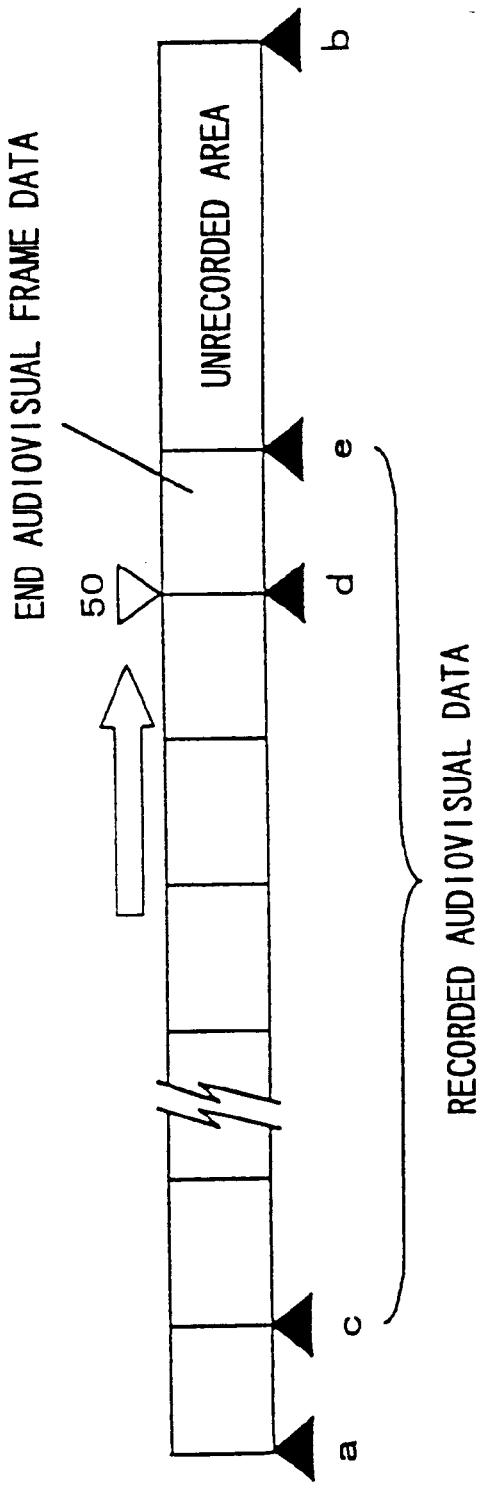
FIG. 42 is an explanatory view showing that an address pointer has reached the end of a recording area in accordance with Embodiment 1 of the present invention.
Figure 43:
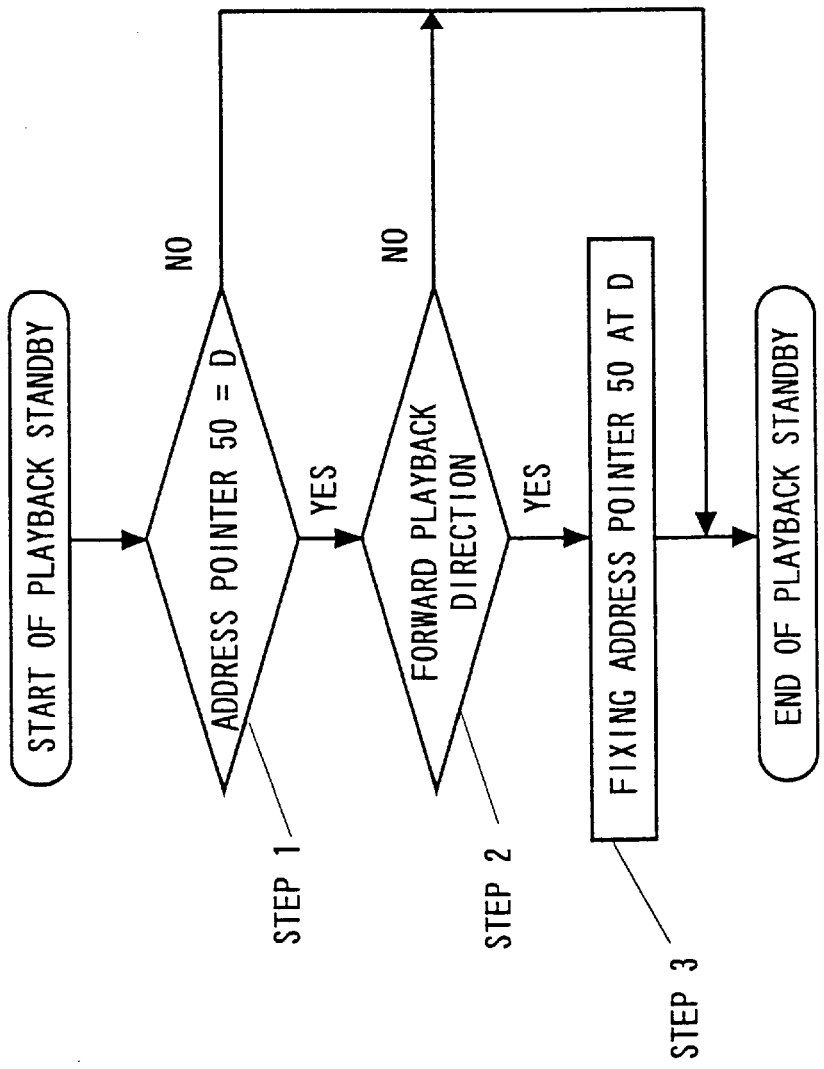
FIG. 43 is a flowchart showing the operation procedure in the case that the address pointer has reached the end of the recording area in accordance with Embodiment 1 of the present invention.

The playback standby (PLAY PAUSE) processing method used as the first processing method of Embodiment 1 will be described first. FIG. 42 is an explanatory view showing the storage condition of audiovisual data in the recording area of the magnetic disk 101. FIG. 43 is a flowchart showing the playback standby processing method of Embodiment 1.

When the address pointer 50 coincides with the record start address (point d) of the end audiovisual frame data of the recorded audiovisual data (step 1 of FIG. 43) as shown in FIG. 42, the CPU 106 makes a detection as to whether the current playback condition is the forward direction or reverse direction (step 2 of FIG. 43).

When the playback direction is the forward direction at step 2 of FIG. 43, the CPU 106 used as a playback control means keeps storing the position of the address pointer 50 until a new command is received.

Figure 44:
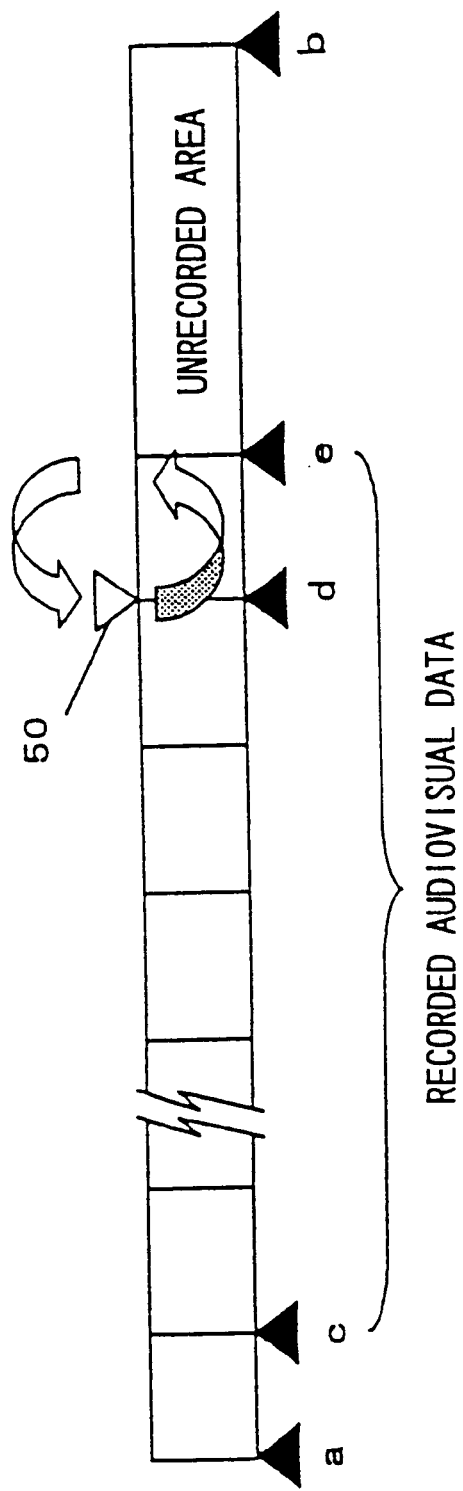
FIG. 44 is an explanatory view showing that the address pointer is fixed in accordance with Embodiment 1 of the present invention.

FIG. 44 is an explanatory view showing an audiovisual data playback condition in the recording area in the case that the address pointer 50 is located at the record start address (point d) and that the playback direction is the forward direction. As shown in FIG. 44, the end audiovisual frame data of the recorded audiovisual data is read continuously from the magnetic disk 101, and this appears externally as if the playback standby (PLAY PAUSE) condition has occurred.

The case when the address pointer 50 coincides with the record start address (point d) of the end audiovisual frame data of the recorded audiovisual data during playback is explained as described above; however, the same processing is also performed in the case that the address pointer 50 coincides with the record start address (point c) of the head audiovisual frame data of the recorded audiovisual data during reverse playback.

By this processing, the head audiovisual frame data of the recorded audiovisual data is read continuously from the magnetic disk 101, and this appears externally as if the playback standby (PLAY PAUSE) condition has occurred.

Figure 45:
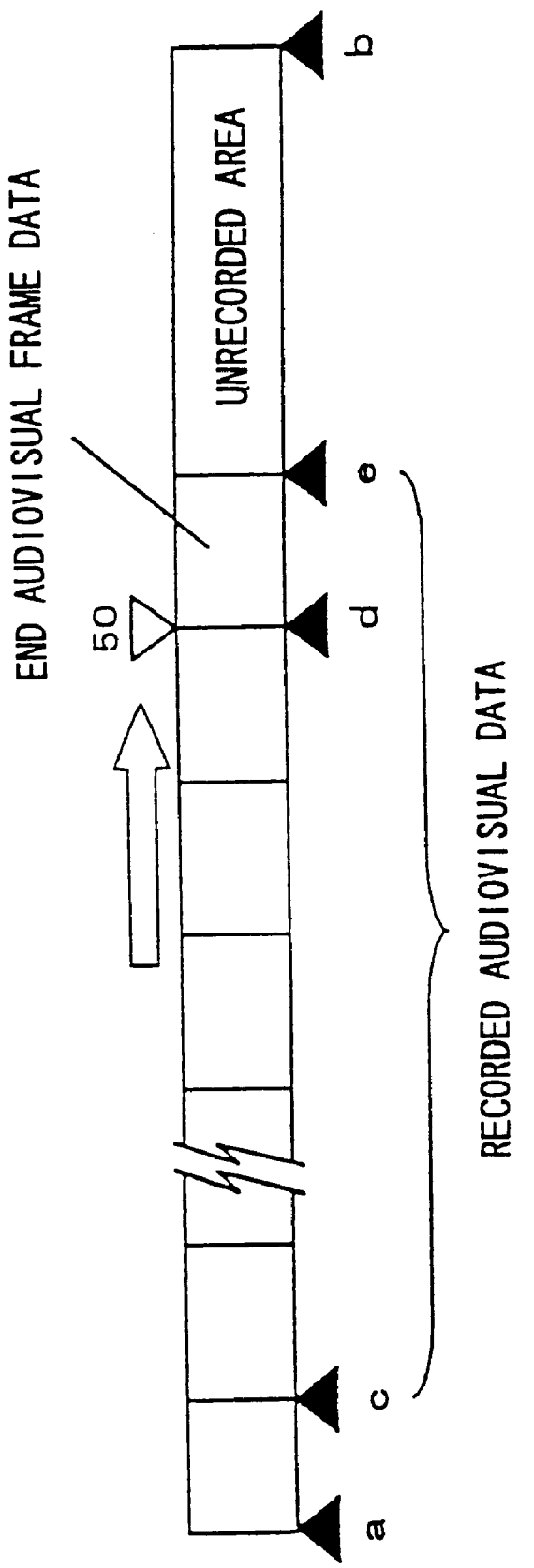
FIG. 45 is an explanatory view showing that the address pointer has reached the end of the recording area in accordance with Embodiment 1 of the present invention.
Figure 46:
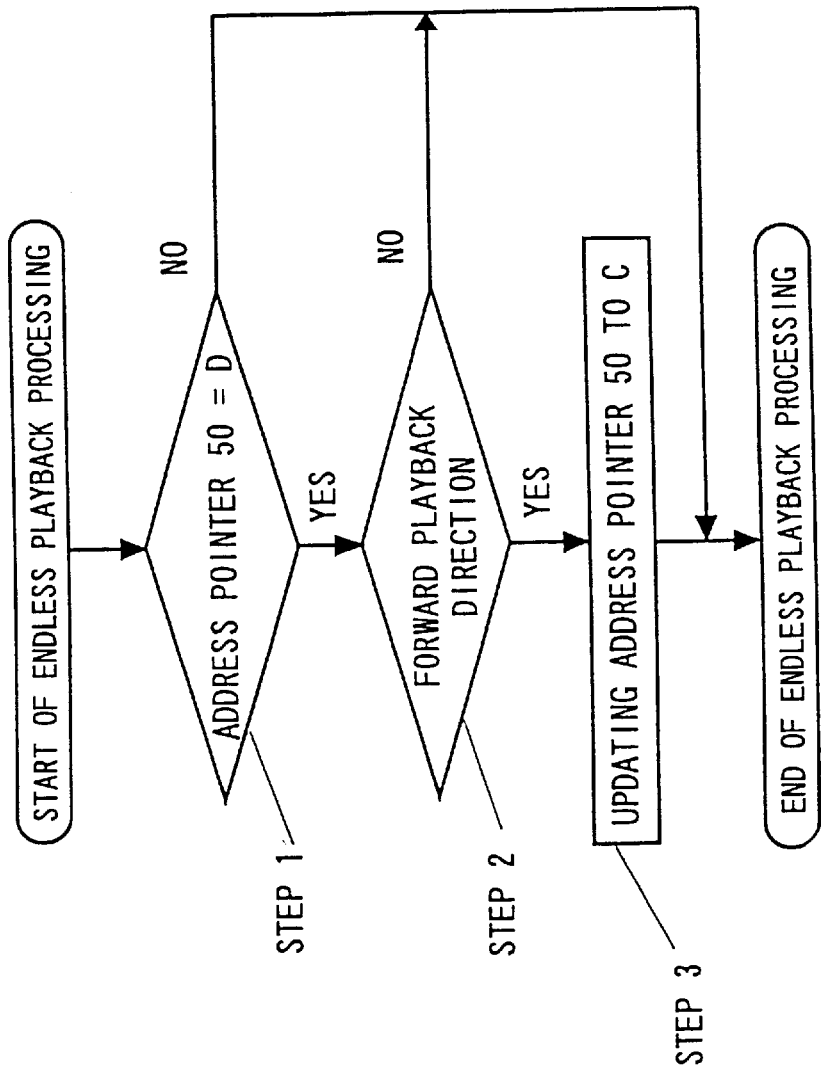
FIG. 46 is a flowchart showing the operation procedure in the case that the address pointer has reached the end of the recording area in accordance with Embodiment 1 of the present invention.

Next, the endless playback (ENDLESS PLAY) processing used as the second processing method of Embodiment 1 will be described. FIG. 45 is an explanatory view showing the storage condition of audiovisual data in the recording area of the magnetic disk 101. FIG. 46 is a flowchart showing the endless playback processing method of Embodiment 1.

When the address pointer 50 coincides with the record start address (point d) of the end audiovisual frame data of the recorded audiovisual data during playback of audiovisual data as shown in FIG. 45 (step 1 of FIG. 46), the CPU 106 makes a detection as to whether the current playback condition is the forward direction or reverse direction (step 2 of FIG. 46).

When the playback direction is the forward direction, the CPU 106 used as a playback control means aligns the address pointer 50 with the record start address (point c) of the head audiovisual frame data of the recorded audiovisual data (step 3 of FIG. 46).

After this, each time audiovisual data on the magnetic disk 101 is read, the CPU 106 updates the position of the address pointer 50.

Figure 47:
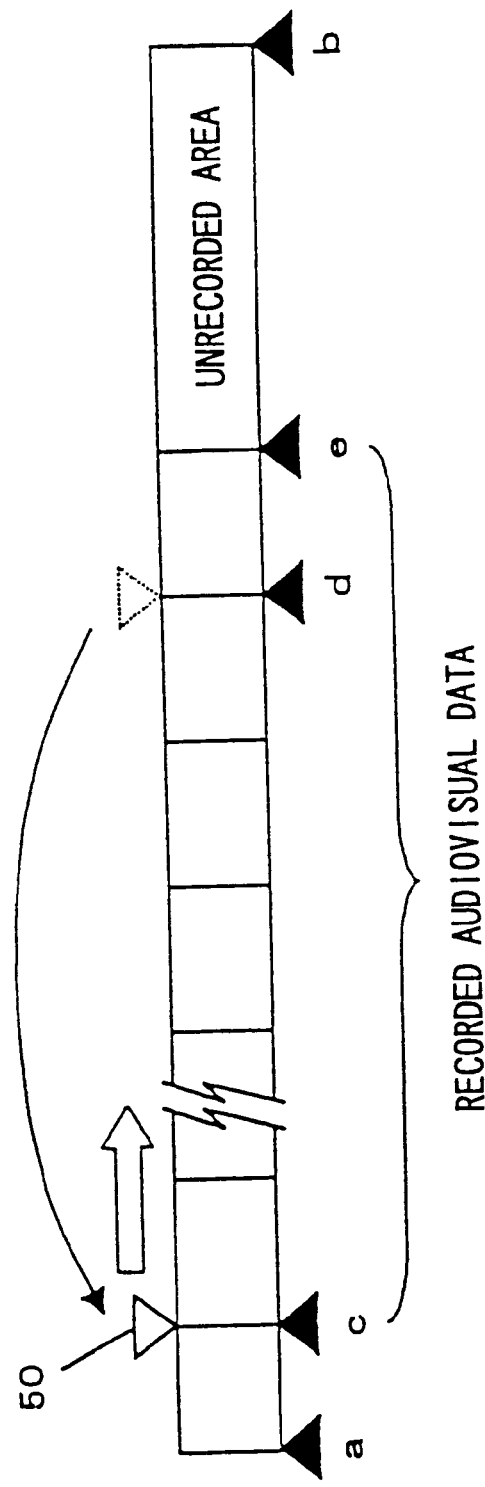
FIG. 47 is an explanatory view showing the case when the address pointer is updated at the time of reaching the end of the recording area in accordance with Embodiment 1 of the present invention.

As a result, as shown in FIG. 47, after the end audiovisual frame data of the recorded audiovisual data is read from the magnetic disk 101, the audiovisual frame data is sequentially read from the head audiovisual frame data of the recorded audiovisual data, and this appears externally as if the endless playback (ENDLESS PLAY) condition has occurred.

The case that the address pointer 50 coincides with the record start address (point d) of the end audiovisual frame data of the recorded audiovisual data during playback is explained in FIG. 45; however, the same processing is also performed when the address pointer 50 coincides with the record start address (point c) of the head audiovisual frame data of the recorded audiovisual data during reverse playback.

By the processing, after the head audiovisual frame data of the recorded audiovisual data is read from the magnetic disk 101, the audiovisual frame data is read in the reverse sequence, starting from the end audiovisual frame data of the recorded audiovisual data, and this appears externally as if the endless reverse playback (sic ENDLESS PLAY) condition has occurred.

By carrying out playback control on the basis of the recording area information and the address information in this way, the above-mentioned end processing can be attained easily.

The above-mentioned processing at the recording area end of the audiovisual data is not related to the playback speed; even when the recording area end is reached during high-speed playback or slow-speed playback, for example, the same processing as the above-mentioned processing is carried out.

[REW Command and FF Command]

The magnetic disk apparatus of Embodiment 1 is provided with means for carrying out fast forward (FF) and rewind (REW).

The processing, performed in the case that fast forward (FF) or rewind (REW) is commanded externally while recording operation is not performed, will be described by using FIGS. 48, 49 and 50.

Figure 48:
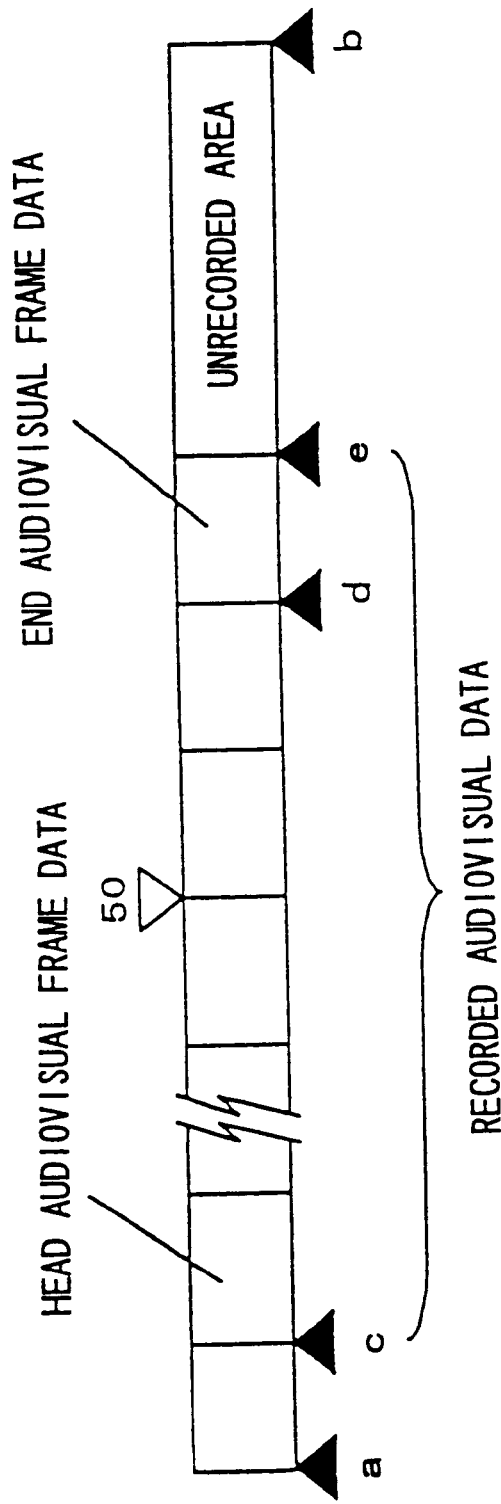
FIG. 48 is an explanatory view showing that the position of the address pointer in accordance with Embodiment 1 of the present invention.
Figure 49:
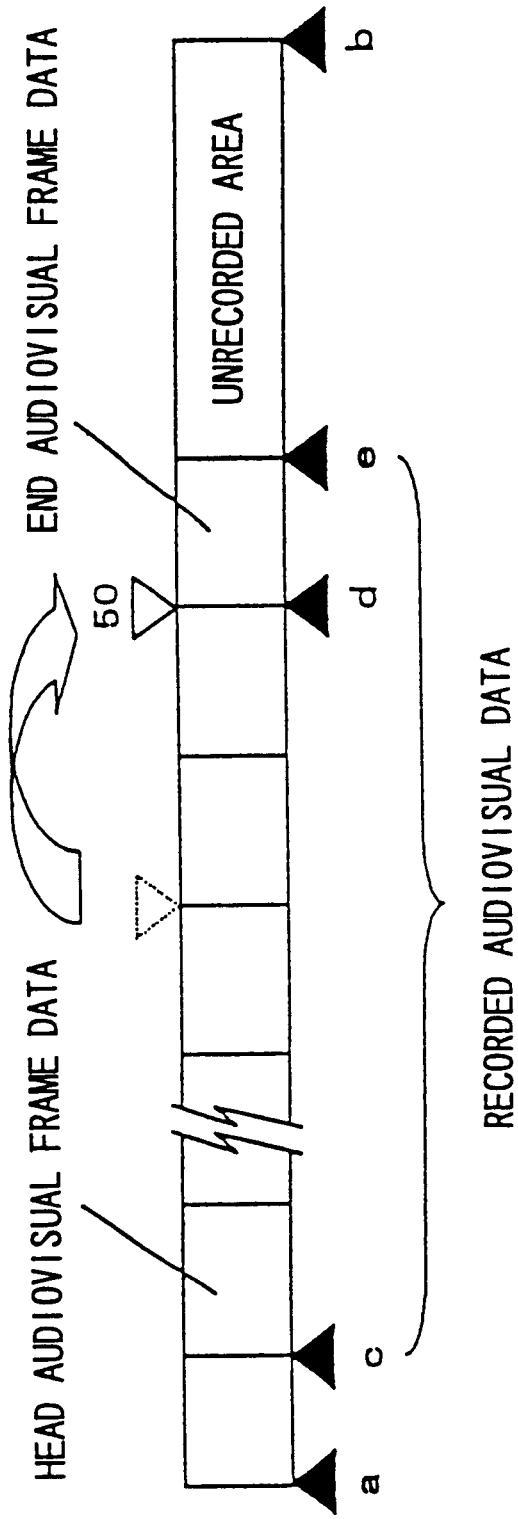
FIG. 49 is an explanatory view showing the case when FF is commanded and the address pointer is updated in accordance with Embodiment 1 of the present invention.
Figure 50:
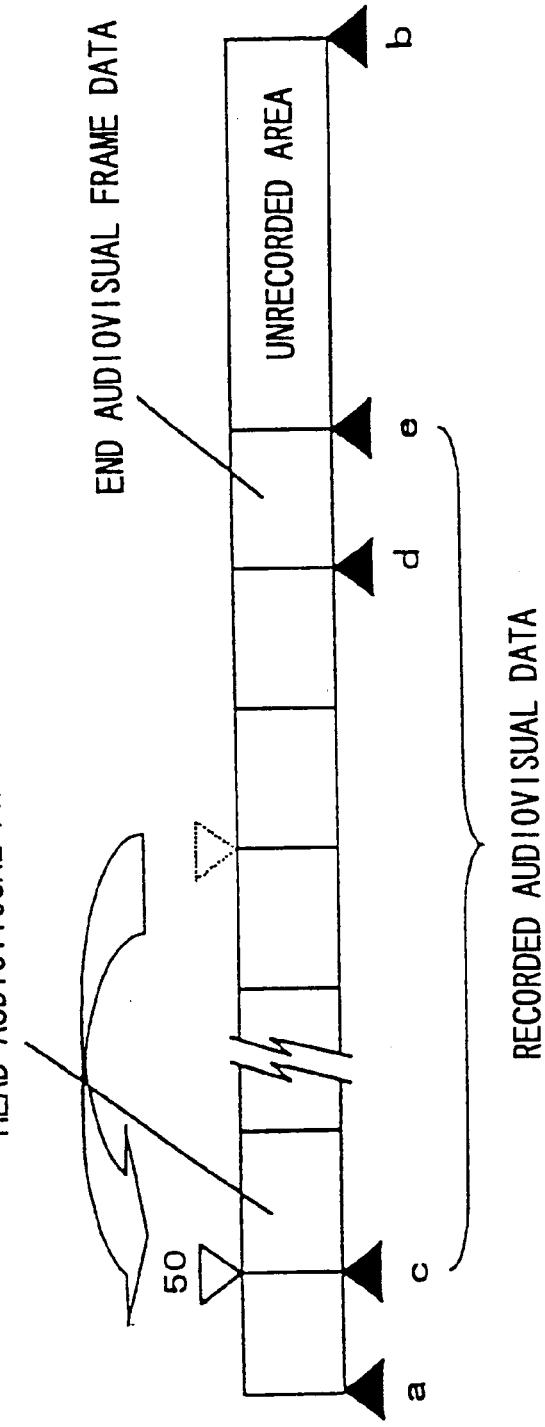
FIG. 50 is an explanatory view showing the case when REW is commanded and the address pointer is updated in accordance with Embodiment 1 of the present invention.

FIGS. 48, 49 and 50 are explanatory views showing the storage conditions of audiovisual data in the recording area on the magnetic disk 101. When the fast forward (FF) or rewind (REW) command is received during recording, the CPU 106 notifies the external apparatus that execution is impossible.

If fast forward (FF) is commanded when the address pointer 50 is located at the position shown in FIG. 48, the CPU 106 used as an address management means sets the value of the address pointer 50 at the same value as the record start address (point d) of the end audiovisual frame data of the recorded audiovisual data also stored in the built-in RAM (FIG. 49).

In the same way, when rewind (REW) is commanded, the CPU 106 sets the value of the address pointer 50 stored in the built-in RAM at the same value as the value of the record start address (=the record start position of the audiovisual data on the magnetic disk 101, the point c) of the head audiovisual frame data of the recorded audiovisual data also stored in the built-in RAM as shown in FIG. 50.

[ERASE Command]

The magnetic disk apparatus of Embodiment 1 is provided with a means for erasing recorded audiovisual data.

Processing in the case that the total erasure of recorded audiovisual data is commanded externally will be described by using FIGS. 51, 52 and 53.

Figure 53:
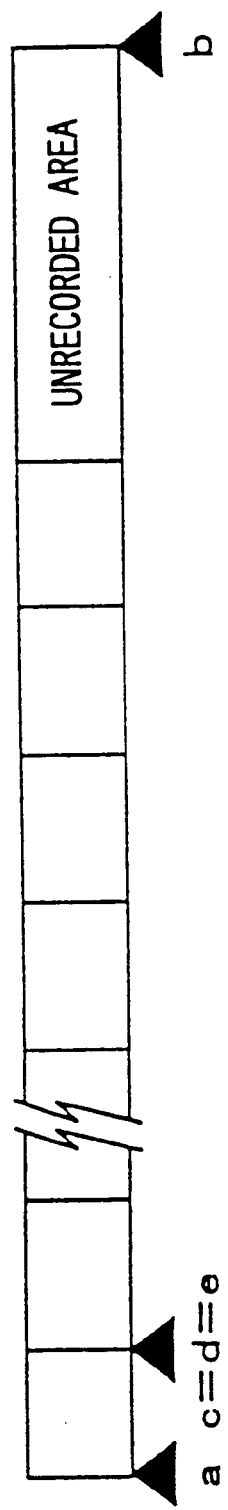
FIG. 53 is an explanatory view showing the address information at the time after erasure is carried out in accordance with Embodiment 1 of the present invention.

FIGS. 51 and 53 are explanatory views showing the storage conditions of audiovisual data in the recording area of the magnetic disk 101. FIG. 52 is a flowchart showing the erasure processing method of Embodiment 1.

As shown in FIG. 51, in the condition wherein audiovisual data is recorded on the magnetic disk 101, when the erasure of the recorded audiovisual data is commanded externally to the magnetic disk apparatus (at step 1 of FIG. 52), the CPU 106 used as a recording area management means aligns the record start address (the point d of FIG. 51) of the end audiovisual frame data of the recorded audiovisual data stored in the built-in RAM and the head address (the point e of FIG. 51) of the unrecorded area with the record start address (the point c of FIG. 51) of the end audiovisual frame data of the recorded audiovisual data (at step 2 of FIG. 52). Next, the above-mentioned updated area information is recorded on the magnetic disk 101 (at step 3 of FIG. 52).

FIG. 53 shows a condition wherein the audiovisual data in the recording area of the magnetic disk 101 is erased. In the condition shown in FIG. 53, even when playback is commanded externally, the CPU 106 used as a recording area management means makes a judgment in accordance with the above-mentioned area information stored in the built-in RAM, and does not carry out the reading processing and external output processing of the audiovisual data on the magnetic disk 101.

The magnetic disk apparatus of Embodiment 1 can be configured so as to be provided with not only the above-mentioned audiovisual data erasure means but also a recoverable erasure means that is used when the above-mentioned erasure of audiovisual data is carried out by mistake.

Figure 54:
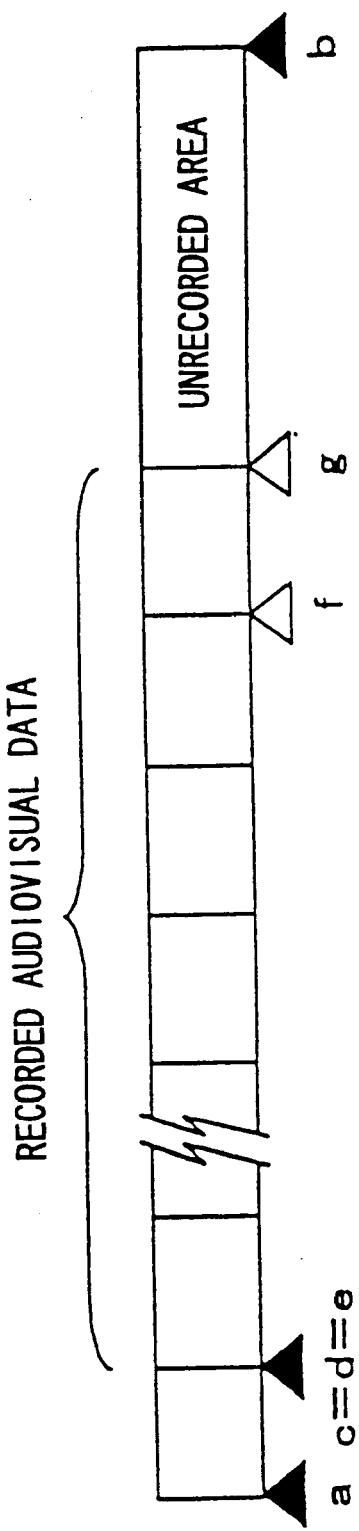
FIG. 54 is an explanatory view showing the address information to be recorded in the case that erasure is commanded in accordance with Embodiment 1 of the present invention.
Figure 55:
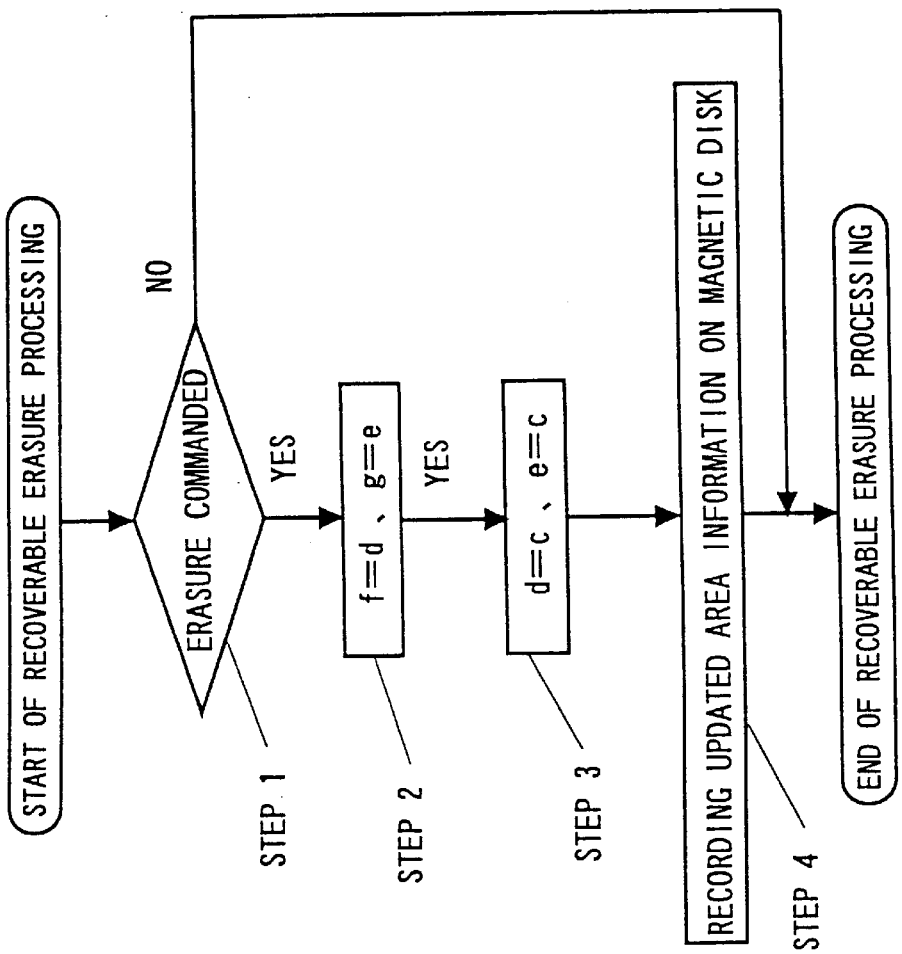
FIG. 55 is a flowchart showing the operation procedure in the case that erasure is commanded in accordance with Embodiment 1 of the present invention.

The recoverable erasure means will be described below. FIG. 54 is an explanatory view showing the storage condition of the audiovisual data in the recording area of the magnetic disk 101. FIG. 55 is a flowchart showing the recoverable erasure processing method of Embodiment 1.

In the condition wherein audiovisual data is recorded on the magnetic disk 101 as shown in FIG. 51, when the erasure of the audiovisual data recorded in the magnetic disk apparatus is commanded (at step 1 of FIG. 55), the CPU 106 stores the record start address of the end audiovisual frame data of the recorded audiovisual data stored in the built-in RAM as the record start address (the point f of FIG. 54) of the pre-erasure end audiovisual frame data.

Furthermore, the CPU 106 stores the head address of the unrecorded area of the recorded audiovisual data stored in the built-in RAM as the head address (the point g of FIG. 54) of the pre-erasure unrecorded area (at step 2 of FIG. 55).

Then, the record start address (point d) of the end audiovisual frame data of the recorded audiovisual data and the head address (point e) of the unrecorded area are aligned with the record start address (the point c of FIG. 54) of the end audiovisual frame data of the recorded audiovisual data (at step 3 of FIG. 55).

Next, the CPU 106 records the area information of the audiovisual data stored in the built-in RAM on the magnetic disk 101 (at step 4 of FIG. 55).

Figure 56:
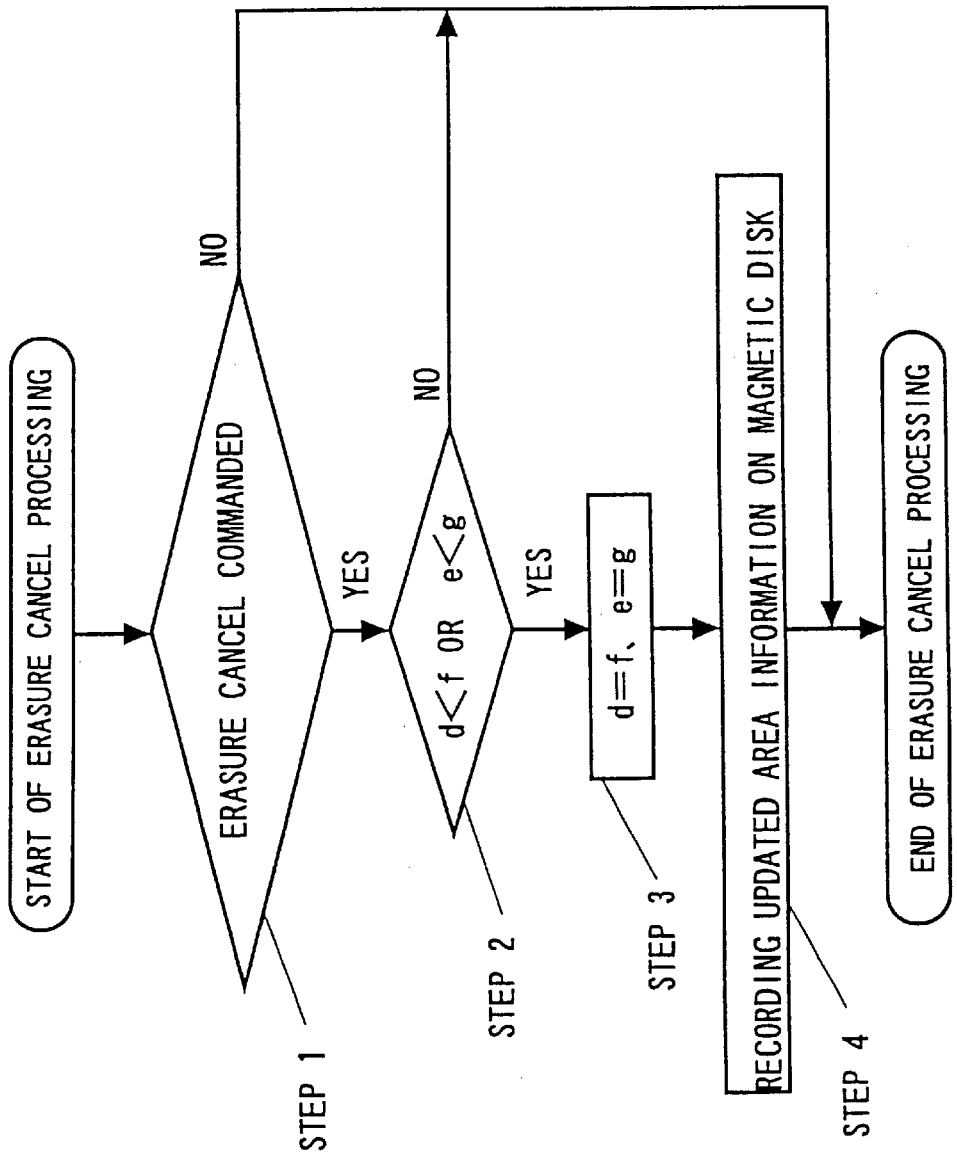
FIG. 56 is a flowchart showing the operation procedure in the case that erasure cancel is commanded in accordance with Embodiment 1 of the present invention.
Figure 57:
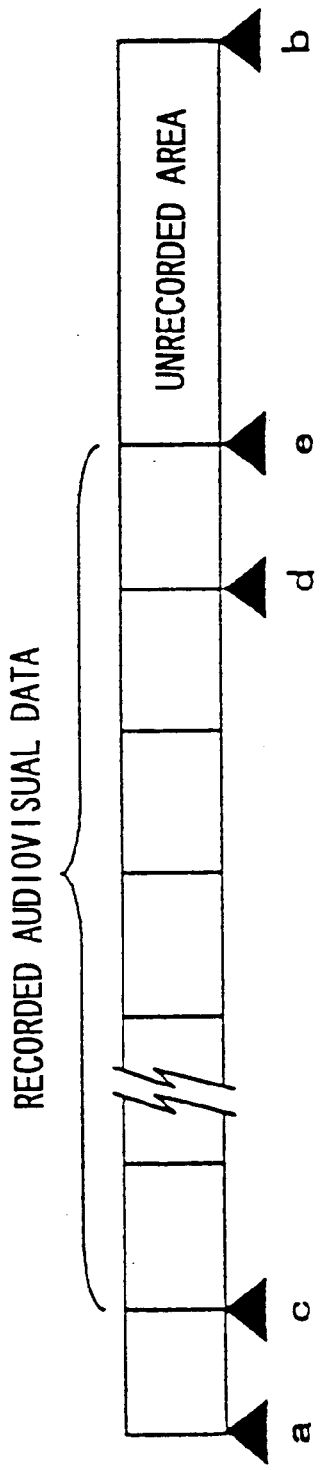
FIG. 57 is an explanatory view showing the address information at the time after erasure cancel is carried out in accordance with Embodiment 1 of the present invention.

The following will describe the case wherein after the audiovisual data erasure condition is recorded in the area information as described above, a command for canceling the erasure is issued. FIG. 56 is a flowchart showing the erasure cancel processing method of Embodiment 1. FIG. 57 is an explanatory view showing the storage condition of the audiovisual data after the erasure cancel processing in the recording area of the magnetic disk 101.

After the erasure of the audiovisual data is externally commanded, when the cancel of the erasure is commanded (at step 1 of FIG. 56), the CPU 106 compares the record start address (the point d of FIG. 54) of the end audiovisual frame data of the recorded audiovisual data stored in the built in RAM with the record start address (the point f of FIG. 54) of the pre-erasure end audiovisual frame data.

Alternatively, the head address (the point e of FIG. 54) of the unrecorded area is compared with the head address (the point g of FIG. 54) of the pre-erasure unrecorded area (at step 2 of FIG. 56).

At step 2 of FIG. 56, if the record start address (the point f of FIG. 54) of the pre-erasure end audiovisual frame data is larger (located in the right direction in FIG. 54) as the result of the comparison, the CPU 106 used as a recording area management means aligns the record start address (the point d of FIG. 54) of the end audiovisual frame data with the record start address (the point f of FIG. 54) of the pre-erasure end audiovisual frame data (at step 3 of FIG. 56).

Alternatively, if the head address (the point g of FIG. 54) of the pre-erasure unrecorded area is larger (located in the right direction in FIG. 54), the head address (the point e of FIG. 54) of the unrecorded area is aligned with the head address (the point g of FIG. 54) of the pre-erasure unrecorded area (at step 3 of FIG. 56).

The area information updated as described above will be recorded on the magnetic disk 101 (step 4 of FIG. 55).

As the result of the above-mentioned recovery processing, the same information as the area information of the audiovisual data recorded on the disk 101 before the erasure is stored in the built-in RAM as shown in FIG. 57. Therefore, the audiovisual data recorded on the magnetic disk 101 before the erasure can be played back.

It may be configured that the record start address (the point f of FIG. 54) of the pre-erasure end audiovisual frame data and the head address (the point g of FIG. 54) of the pre-erasure unrecorded area may be recorded not only in the built-in RAM but also on the magnetic disk 101. By this configuration, even when the power of the magnetic disk apparatus is turned off by mistake after the execution of the erasure, the pre-erasure address information can be obtained when the power is turned on again.

[Data Search (ATN) Command]

The magnetic disk apparatus of Embodiment 1 is provided with an absolute track number search and time code search means.

The magnetic disk apparatus of Embodiment 1 deals with audiovisual data, the size of which is constant as described above.

In addition, the magnetic disk apparatus records audiovisual data in the sequence of addresses on the magnetic disk. Therefore, if the record start position of the audiovisual data on the magnetic disk 101 is clarified, it is possible to carry out search, such as time code search, in audiovisual frame units. Furthermore, the absolute track number search can be carried out by using the format of audiovisual data recorded on the magnetic disk apparatus.

Figure 58:
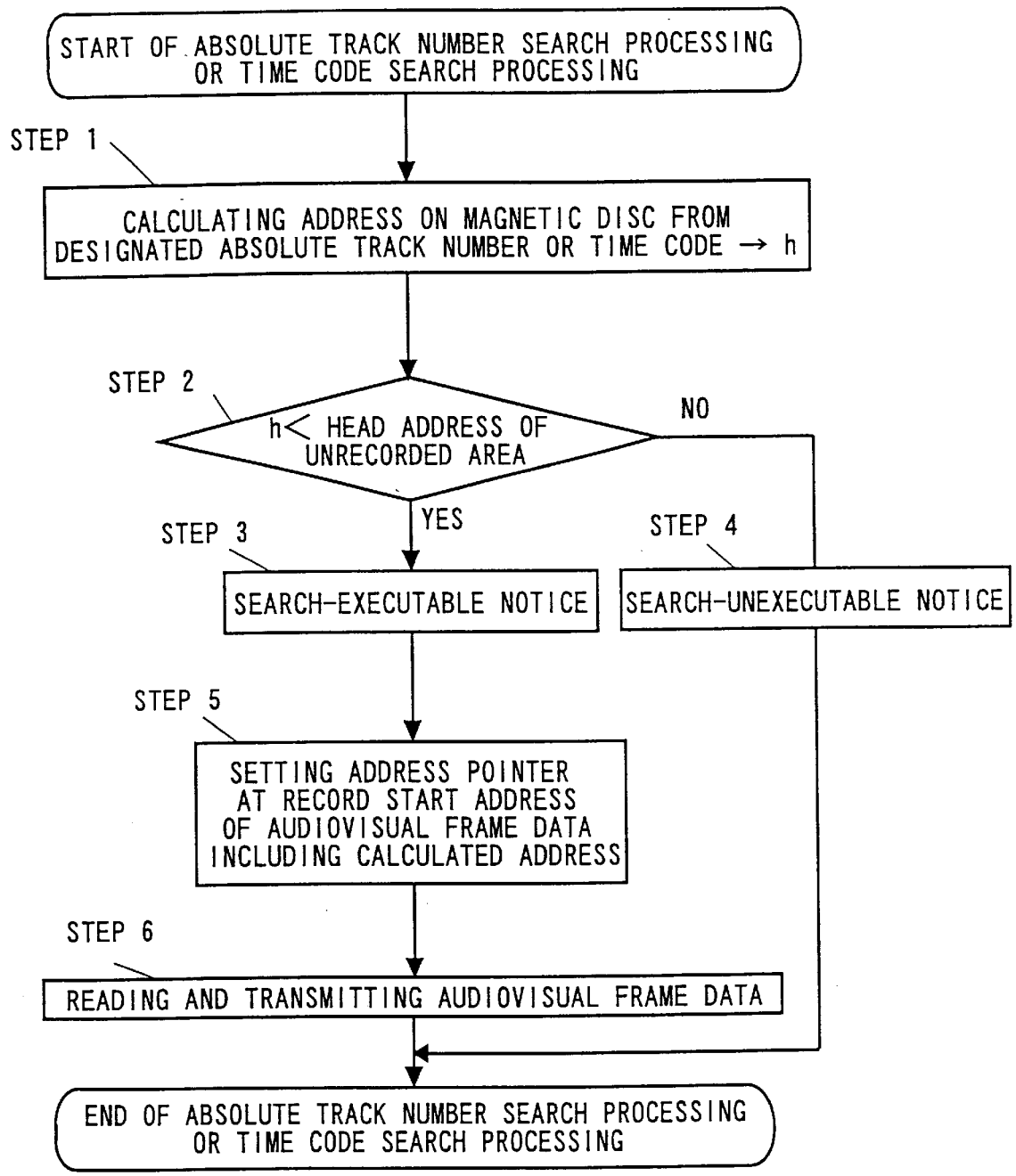
FIG. 58 is a flowchart showing the operation procedure in the case that absolute track number search or time code search is commanded in accordance with Embodiment 1 of the present invention.

The processing in the case that the absolute track number search or the time code search is commanded externally will be described by using FIG. 58. FIG. 58 is a flowchart showing the absolute track number search processing or the time code search processing.

When search by using an absolute track number or time code is commanded externally, the CPU 106 used as a search means calculates address h on the magnetic disk 101 from the designated track number or time code (at step 1 of FIG. 58).

Next, the CPU 106 compares the calculated address h and the head address of the unrecorded area stored in the built-in RAM (at step 2 of FIG. 58). If the calculated address h is smaller than the head address of the unrecorded area, a notice meaning that search can be carried out is given to the external apparatus that transmitted the command (step 3 of FIG. 58).

On the other hand, if the calculated address h is larger than the head address of the unrecorded area, a notice meaning that search cannot be carried out is given to the external apparatus that transmitted the command (step 4 of FIG. 58).

When the notice meaning that search can be carried out is given at step 3 of FIG. 58, the CPU 106 sets the address pointer 50 at the record start address of the audiovisual frame data in which the calculated address h is included (at step 5 of FIG. 58).

Next, audiovisual frame data is read from the position indicated by the pointer address 50 on the magnetic disk 101 (at step 6 of FIG. 58).

When search is commanded, a static image output (PLAY PAUSE) condition wherein audiovisual frame data including the designated search position is transmitted continuously is obtained, unlike the case of the ordinary playback (PLAY) condition.

Figure 59:
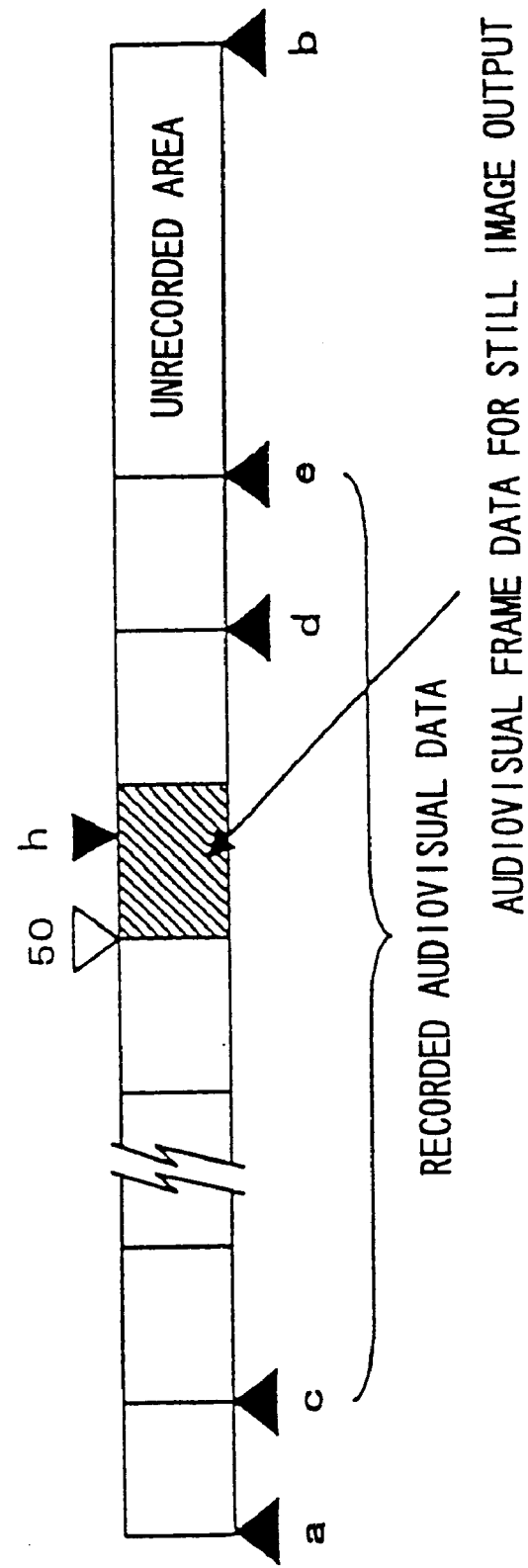
FIG. 59 is an explanatory view showing the address of the designated search position in accordance with Embodiment 1 of the present invention.

When the address of the search position designated by the absolute track number is the point h of FIG. 59, the CPU 106 sets the address pointer 50 at the record start address of the audiovisual frame data including the address h shown in FIG. 59. Then, the magnetic disk apparatus reads the audiovisual frame data at the positions indicated by the oblique lines in FIG. 59 from the magnetic disk 101, and outputs continuously.

As described above, the magnetic disk apparatus of Embodiment 1 is characterized in that it is superior to record/playback apparatuses using tape media in random access performance.

With this characteristic and the search and address pointer management on the basis of the recording area information, it is possible to attain functions, such as immediate access to recorded audiovisual data, which cannot be attained by the record/playback apparatuses using tape media.

The following will describe the management of the audiovisual data position information provided for the magnetic disk of Embodiment 1 and a method of receiving and transmitting the position information from and to the external apparatus.

[Mark Information Automatic Detection Command]

Figure 60:
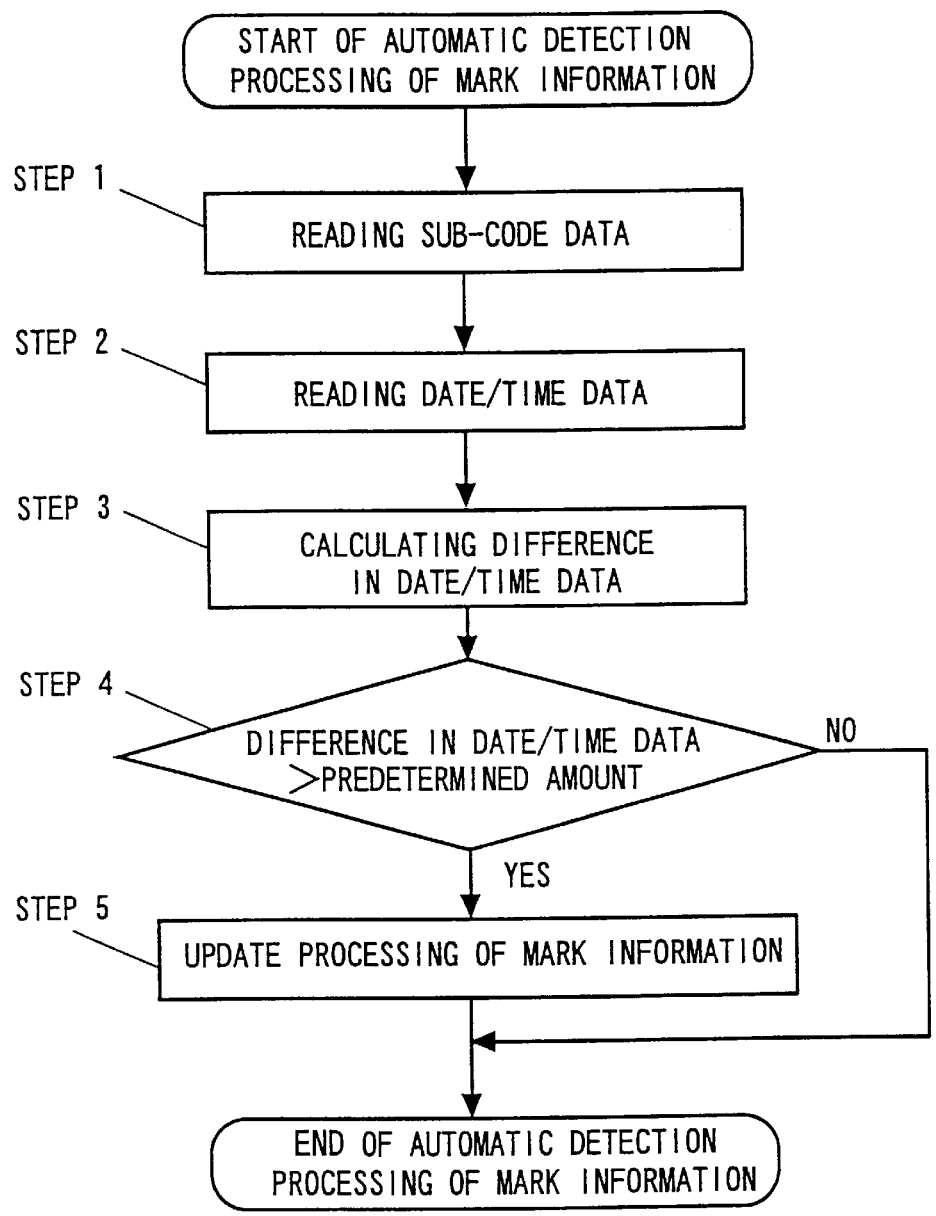
FIG. 60 is a flowchart showing the operation procedure for discontinuous point detection of audiovisual data in accordance with Embodiment 1 of the present invention.

A method of detecting plural discontinuous points in recorded audiovisual data, a function provided for the magnetic disk apparatus of Embodiment 1, will be described below by using FIG. 60. FIG. 60 is a flowchart showing the mark information automatic detection processing of the magnetic disk apparatus of Embodiment 1.

The stream data of the audiovisual data recorded by the magnetic disk apparatus of Embodiment 1 includes not only audiovisual data but also date/time data indicating the date/time when the audiovisual data is created, time code information, absolute track number information and the like. These kinds of information are generally referred to as sub-code data.

The CPU 106 used as a mark information management means extracts the above-mentioned sub-code data included in the audiovisual frame data at the time of recording audiovisual data (step 1 of FIG. 60).

At step 2 of FIG. 60, the date/time data, time code data and absolute track number information included in the sub-code data are extracted and stored in the built-in RAM.

At step 3 of FIG. 60, the CPU 106 compares the date/time data, time code data and absolute track number data of audiovisual frame data recorded previously with these pieces of data in the audiovisual data being recorded currently, and calculates the difference therebetween. Next, at step 4, analysis is carried out as to whether the difference is a predetermined value or more (the detection of a discontinuous point).

When the difference is the predetermined value or more, at step 5, the date/time data information and time code information or absolute track number information included in the audiovisual data are stored in the built-in RAM as mark information together with the record start address information on the magnetic disk 101 for recording the audiovisual frame data.

In the case when plural discontinuous points, each detected as described above, are detected during the recording of audiovisual data, the information on the plural pieces of discontinuous points is stored in the built-in RAM. FIG. 61 is a table showing the information on the plural discontinuous points stored in the built-in RAM.

After the record stop command is received externally, the discontinuous point information stored in the built-in RAM and shown in FIG. 61 is recorded on the magnetic disk 101.

In the magnetic disk apparatus of Embodiment 1, the mark information is recorded in the area information recording portion located between the head address on the disk 101 and the record start address of the head audiovisual frame data (=the record start address of the audiovisual data).

On the other hand, the mark information stored in the built-in RAM is lost when the power of the magnetic disk apparatus is turned off; therefore, after the end of the activation processing of the magnetic disk apparatus, a series of mark information is read from the magnetic disk 101 and stored in the built-in RAM.

Furthermore, in the magnetic disk apparatus of. Embodiment 1, when the audiovisual frame data differs from the previous audiovisual frame data by one second or more with respect to date/time data, or 30 frames or more with respect to time code data, or 300 tracks or more with respect to absolute track number, this is detected as a discontinuous point. However, these differences are not limited to the above-mentioned values, but may be changeable in accordance with designation from the external apparatus.

When record start is newly commanded, the date/time data, time code data and absolute track number data of the previous audiovisual frame data may sometimes not be stored in the built-in RAM. The CPU 106 is set to detect all of such cases as discontinuous points.

In the magnetic disk apparatus of Embodiment 1, when audiovisual frame data is newly recorded by overwriting or the like at the record start address of the audiovisual data stored in the built-in RAM as mark information in the mark information update processing at step 5 of FIG. 60, the series of mark information (date/time data information and time code information or absolute track number information included in the audiovisual data) regarding the record start address is erased.

By the above-mentioned configuration, even in the case of not only the discontinuous point in the audiovisual data to be recorded but also additional recording, overwriting in the middle or the like, the start position thereof can be stored as mark information.

As described above, in the magnetic disk apparatus of Embodiment 1, by detecting and recording the discontinuous points included in the stream data of the audiovisual data, it is possible to store the head portion information or the like of audiovisual data having different photographing date/time; and when a command for gaining access to the head of the audiovisual data is issued externally, search can be performed on the basis of such information, whereby it is possible to immediately gain access to the head of the desired audiovisual data.

[Mark Addition Command]

Figure 62:
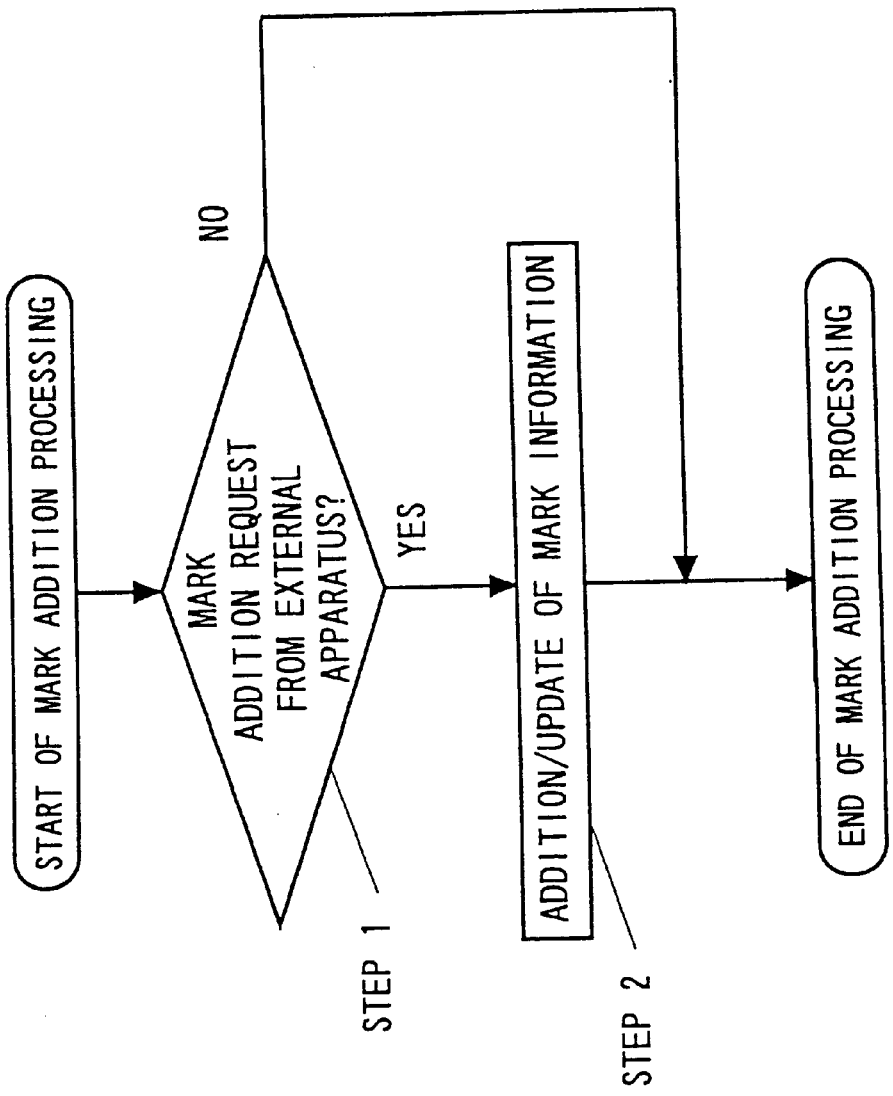
FIG. 62 is a flowchart showing the operation procedure in the case that mark addition is commanded in accordance with Embodiment 1 of the present invention.

Next, a mark information creation means different from the above-mentioned discontinuous point automatic detection means for audiovisual data will be described by using FIG. 62. FIG. 62 is a flowchart showing a mark addition processing.

If a mark addition request is issued externally for audiovisual data while the magnetic disk apparatus of Embodiment 1 records or plays back the audiovisual data (step 1 of FIG. 62), the CPU 106 used as a mark command receiving means stores the record start address on the magnetic disk 101 wherein the audiovisual frame data, being recorded or played back when the mark addition request is received, is recorded, and the time code data information or absolute track number information included in the audiovisual data in the built-in RAM as mark information (step 2 of FIG. 62).

In addition, in the magnetic disk apparatus of Embodiment 1, the mark information created by the mark addition request and the mark information obtained by the above-mentioned discontinuous point detection are managed on the same table.

Figure 63:
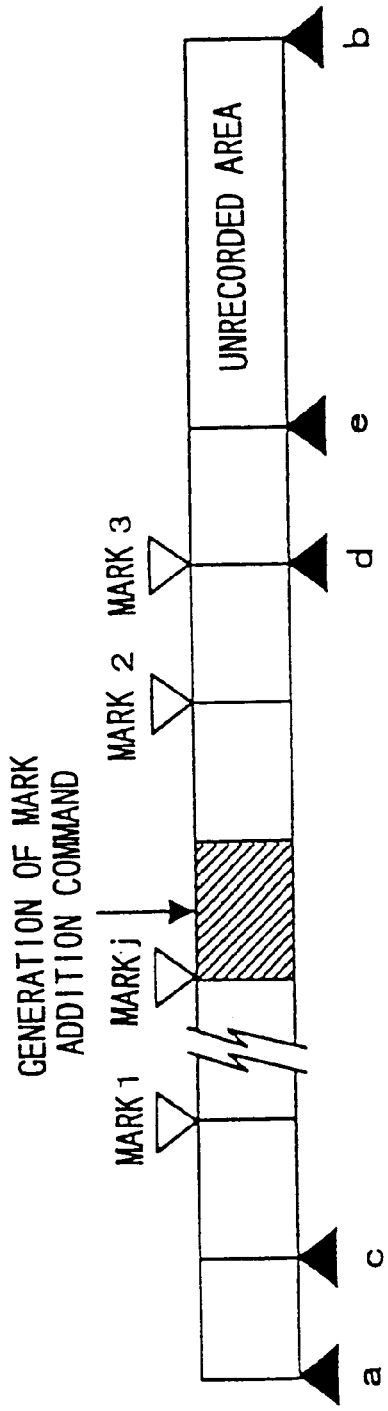
FIG. 63 is an explanatory view showing addresses at the time when mark addition is commanded in accordance with Embodiment 1 of the present invention.

FIG. 63 is an explanatory view showing a storage condition on the magnetic disk 101 in the case that plural pieces of mark information are present. When plural mark points 1, 2 and 3 are present in the recording area as shown in FIG. 63, for example, when plural pieces of mark information have already been present by the discontinuous point detection, or when plural mark addition requests are present, plural marks are stored in the built-in RAM.

Figure 64:
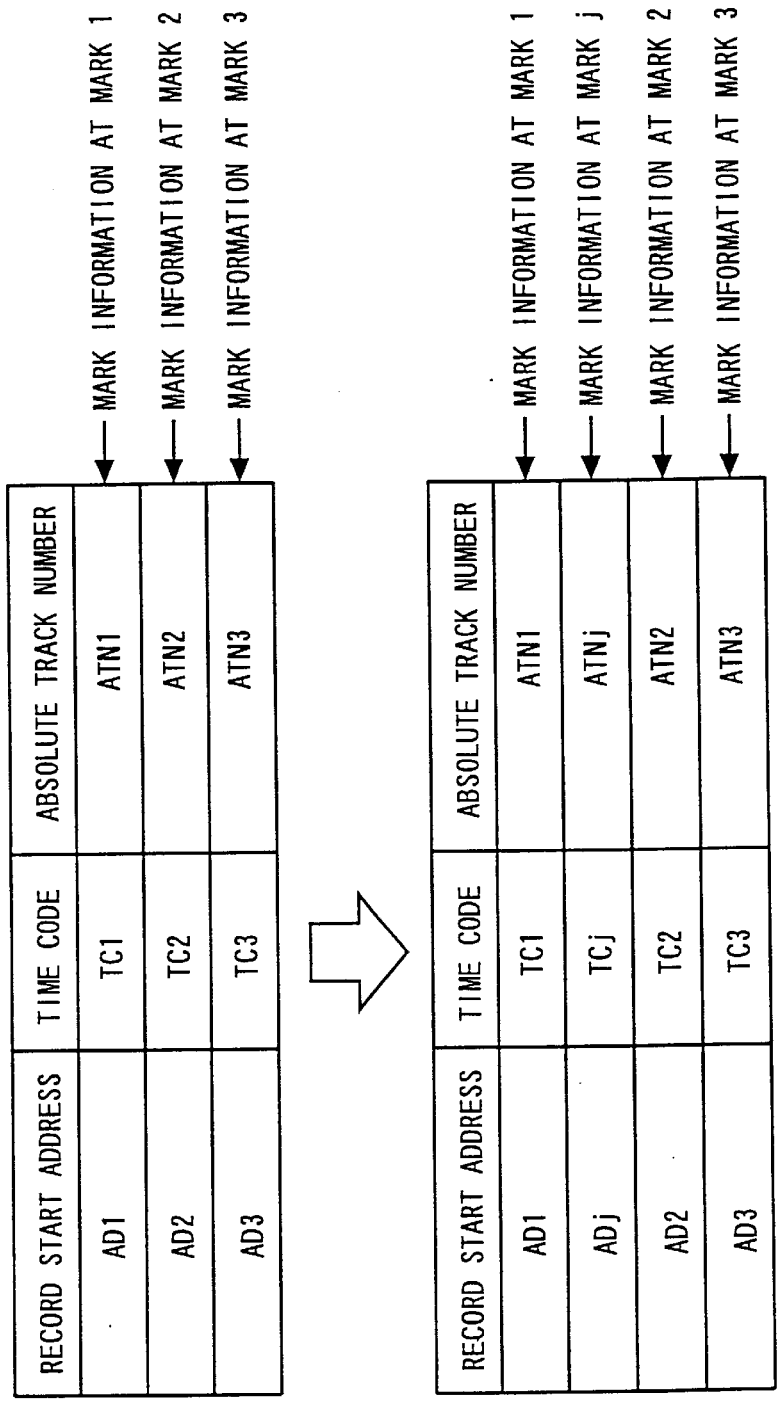
FIG. 64 is an explanatory view showing sorting at the time of mark information update in accordance with Embodiment 1 of the present invention.

Then, when a command for record stop or playback stop is received externally, mark information is sorted in the sequence of the record start addresses on the magnetic disk 101 as shown in FIG. 64, and the series of mark information is recorded on the magnetic disk 101.

FIG. 64 is a view showing a table regarding mark information at the record start addresses, time codes and absolute track numbers. FIG. 64 shows a table rewriting condition in the case that a mark addition command (mark point j) is generated between mark point 1 and mark point 2.

In the magnetic disk apparatus of Embodiment 1, the mark information is recorded between the head address on the disk 101 and the record start address of the head audiovisual frame data (=the record start address of the audiovisual data).

The mark information stored in the built-in RAM is lost when the power of the magnetic disk apparatus is turned off, just as in the above-mentioned case; therefore, it is configured that at the end of the activation processing of the magnetic disk apparatus, a series of mark information is read from the magnetic disk 101 and stored in the built-in RAM.

When audiovisual frame data is newly recorded by overwriting or the like at the record start address of the audiovisual frame data stored in the built-in RAM as mark information in the mark information addition/update processing at step 5 of FIG. 62, just as in the above-mentioned case, a series of mark information regarding the record start address (the date/time information and time code information or absolute track number information included in the audiovisual data) is erased.

The mark addition request may be received as a command from the external apparatus via the external apparatus interface circuit 105, or may be directly commanded to the CPU 106 via a hardware switch (not shown) provided in the magnetic disk apparatus.

Since the magnetic disk apparatus of Embodiment 1 is provided with the mark command receiving means and a mark information management means as described above, mark points can be added to any positions of the series of audiovisual data, whereby on the basis of the mark information, it is possible to immediately search and output desired audiovisual frame data.

[Mark Information Transmission/reception Command]

The magnetic disk apparatus of Embodiment 1 can transmit a series of mark information created by the above-mentioned method to the external apparatus, or receive a series of mark information created by the external apparatus.

Figure 65:
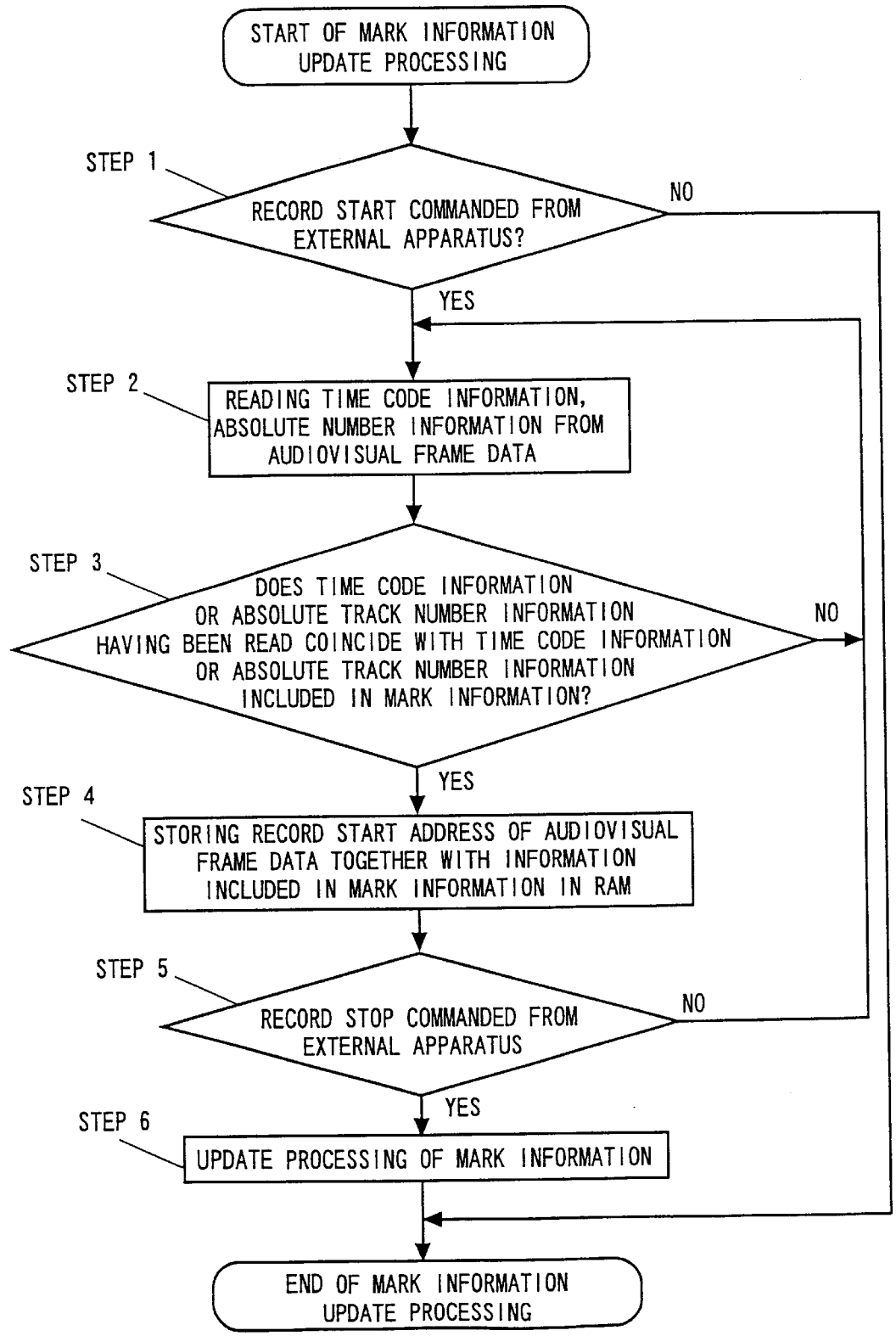
FIG. 65 is a flowchart showing the operation procedure in the case that mark information is received from an external apparatus in accordance with Embodiment 1 of the present invention.

Next, mark information transmission/reception in the magnetic disk apparatus of Embodiment 1 will be described by using FIGS. 65 to 68. FIG. 65 is a flowchart showing the mark information update processing.

Figure 67:
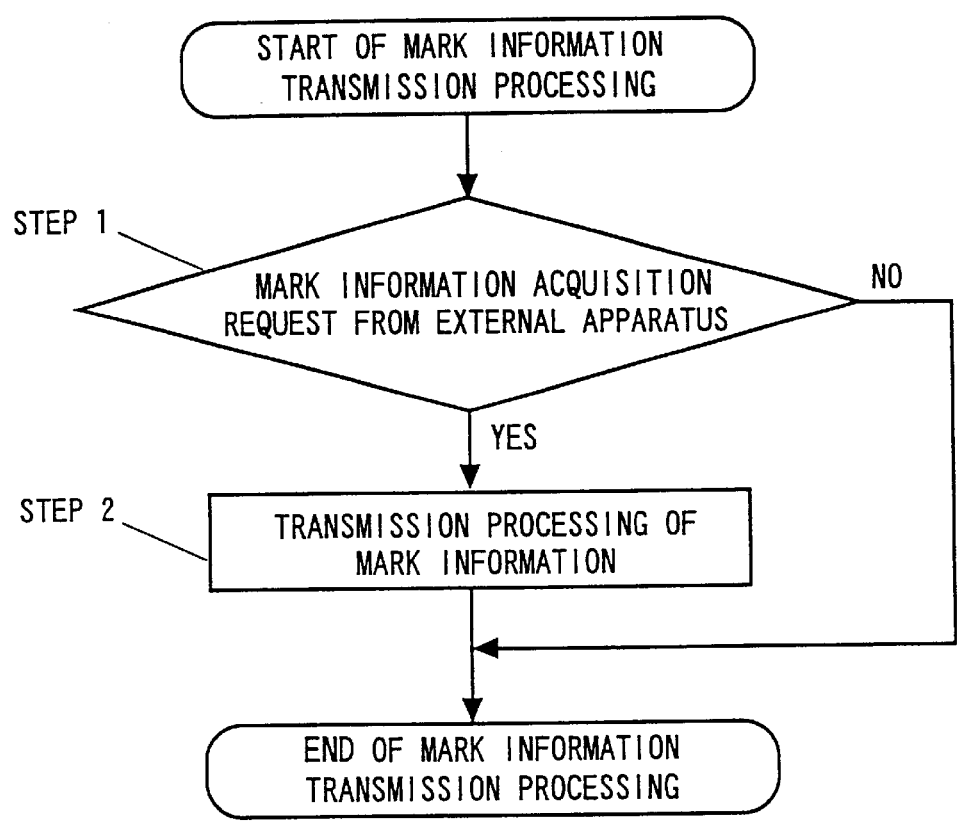
FIG. 67 is a flowchart showing the operation procedure in the case that mark information acquisition request is commanded in accordance with Embodiment 1 of the present invention.

FIG. 66 is a view showing the tables of mark information recorded in the magnetic disk apparatus. FIG. 67 is a flowchart showing mark information transmission processing. FIG. 68 is a view showing the transmission format of the mark information.

When a series of mark information regarding audiovisual data to be recorded is transmitted from the external apparatus to the magnetic disk apparatus, the CPU 106 used as a mark information receiving means stores the time code information, absolute track number information or the like included in the series of the mark information in the built-in RAM.

Then, as shown in the flowchart of FIG. 65, when the record start of the audiovisual data is commanded externally (at step 1), the CPU 106 used as a mark information management means extracts the time code information and absolute track number information included in the audiovisual frame data to be recorded (step 2).

Furthermore, the CPU 106 makes a confirmation as to whether the time code information or absolute track number information having been extracted coincides with the time code information or absolute track number information having been transmitted as mark information from the external apparatus and stored in the built-in RAM or not (step 3).

At step 3 of FIG. 65, the CPU 106 detects the audiovisual frame data including information that coincides with the mark information stored in the built-in RAM. Then, the CPU 106 stores the record start address of the magnetic disk 101 for recording the detected audiovisual frame data in the built-in RAM together with the time code information or absolute track number information stored as mark information (step 4).

At step 5 of FIG. 65, after the series of the audiovisual data is recorded on the magnetic disk 101, the record stop command from the external apparatus is detected. When the record stop command is detected, sorting is carried out in the sequence of the record start addresses together with the mark information having been stored in the built-in RAM by the magnetic disk apparatus, and the mark information updated by the sorting is recorded on the magnetic disk 101 (step 6).

As shown in FIG. 66, in the magnetic disk apparatus, the record start address information, time code information and absolute track number information are recorded in the sequence of numbers assigned thereto.

In the case when audiovisual frame data is newly recorded by overwriting or the like at the record start address of the audiovisual data stored in the built-in RAM as mark information in the mark information update processing at step 6 of FIG. 65, just as in the above-mentioned case, the series of the mark information (date/time data information and time code information or absolute track number information included in the audiovisual data) regarding the record start address is erased.

In the case of FIG. 66, since audiovisual data is newly recorded on record start address AD4 as mark information stored on the magnetic disk, the series of mark information regarding the record start address AD4 (the record start address AD4, time code TC4 and absolute track number ATN4) is erased as the result of the mark information update processing.

In the above-mentioned condition, when a mark information acquisition request is issued from the external apparatus as shown in FIG. 67 (step 1), the CPU 106 used as a mark information notification means transmits the time code data information or absolute track number information obtained by eliminating the record start address to the magnetic disk 101 from the series of the mark information stored in the built-in RAM to the external apparatus via the external apparatus interface circuit 105 in accordance with the format shown in FIG. 68 (step 2 of FIG. 67).

The amount of the mark information and the absolute track numbers are described in the transmission format of the mark information shown in FIG. 68. In Embodiment 1, the mark information notification means and the mark management means are operated by application software at the CPU 106.

Since the magnetic disk apparatus of Embodiment 1 is provided with the mark information receiving means and the mark information notification means as described above, the series of mark information can be shared with the external apparatus.

The format for notifying the series of the mark information in the disk apparatus of the present invention to the external apparatus is not limited to that shown in FIG. 68, but the format may be configured by the time code information instead of the absolute track number information of FIG. 68, for example, or may also be configured by the absolute track numbers and time code information.

Furthermore, in Embodiment 1, the record start address of audiovisual frame data and the time code data information or the absolute track number information included in the audiovisual data are stored as mark information; however, the present invention is not limited to these.

For example, the record start address of the audiovisual frame data and the time code information or the absolute track number information of the magnetic disk 101 corresponding to the record start address of the audiovisual data may also be used. When a series of mark information is received and then recorded, the audiovisual frame data including information being coincident with the mark information is detected.

Then, when the record start address to the magnetic disk 101 for recording the detected audiovisual frame data is determined, the time code information or the absolute track numbers included in the mark information received externally are updated with the time code information or the absolute track number information of the magnetic disk 101 corresponding to the record start address of the audiovisual frame data, and then stored.

Embodiment 2

Figure 69:
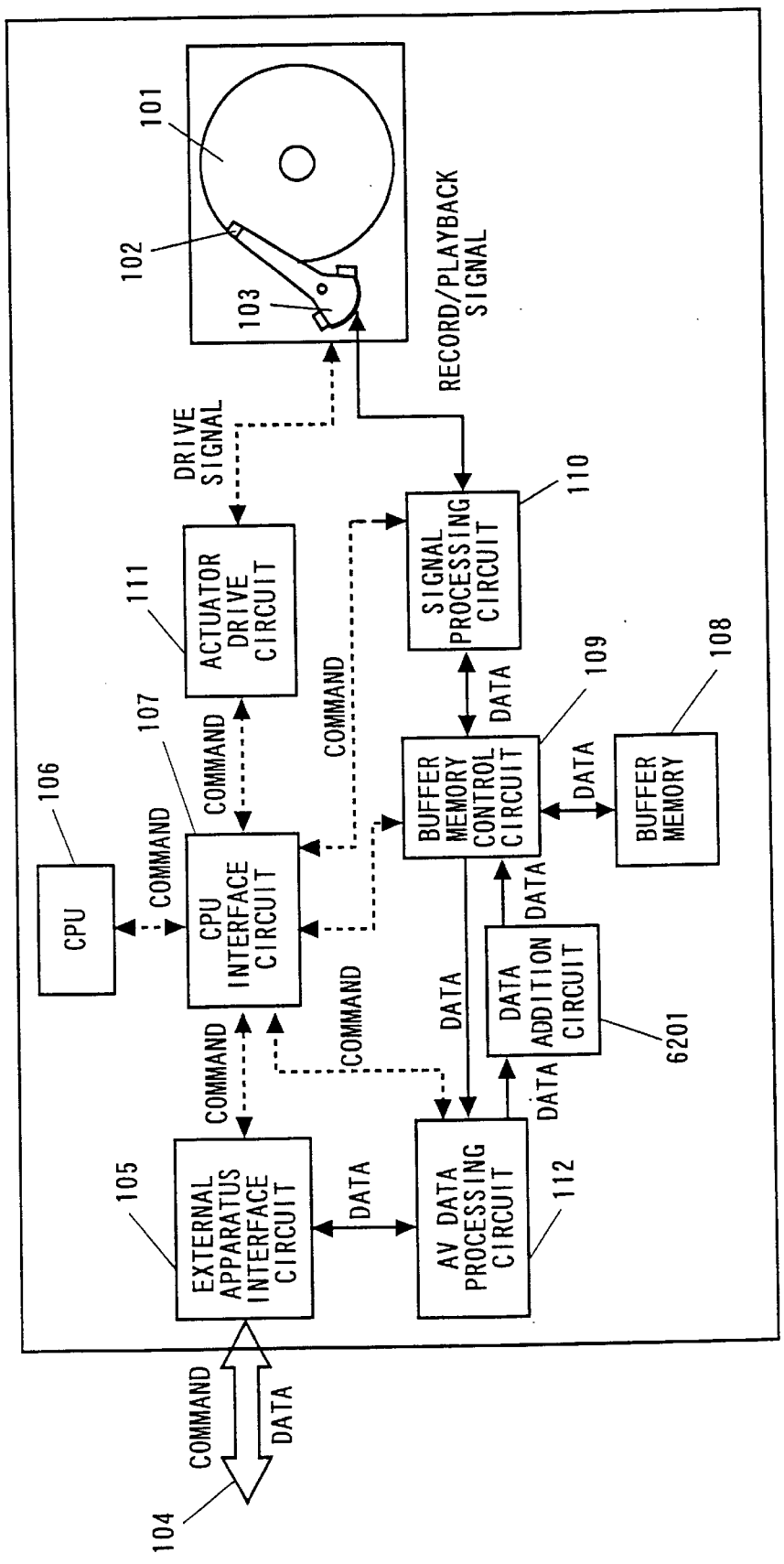
FIG. 69 is a block diagram showing the configuration of a magnetic disk apparatus in accordance with Embodiment 2 of the present invention.

Next, a magnetic disk apparatus in accordance with Embodiment 2 of the present invention will be described. FIG. 69 is a block diagram showing the configuration of the magnetic disk apparatus of Embodiment 2.

In FIG. 69, the magnetic disk apparatus of Embodiment 2 has a CPU 106, a CPU interface circuit 107 for transmitting and receiving commands and data to and from the CPU 106, a buffer memory 108 used as a temporary storage circuit, and a buffer memory control circuit 109 for controlling data input/output to the buffer memory 108.

In addition, the magnetic disk apparatus is provided with a signal processing circuit 110 for controlling data input/output to a magnetic disk 101 used as a disk-shaped disk medium, an actuator drive circuit 111 for carrying out the positional control of a magnetic head 102 by applying a drive signal to the positioning mechanism 103, and an AV data processing circuit 112 for carrying out predetermined processing in accordance with audiovisual data received via an external apparatus interface circuit 105.

It is configured that commands and data from an external apparatus are transmitted via an input/output bus 104, and the external apparatus interface circuit 105 carries out transmission and reception of commands, data and parameters between the circuit and the external apparatus via the input/output bus 104. The configurations and functions of these circuits are the same as those of the circuits of the above-mentioned Embodiment 1, and the same reference numbers are assigned to these circuits and the explanations of them are omitted.

The magnetic disk apparatus of Embodiment 2 differs from that of the above-mentioned Embodiment 1 in that a data addition circuit 6201 is provided between the AV data processing circuit 112 and the buffer memory control circuit 109 as a data addition means. In addition, the signal processing circuit 110 of Embodiment 2, used as a data extraction means, has a function of extracting only the data to be transmitted to the external apparatus from among the audiovisual data read from the magnetic disk 101.

Figure 81:
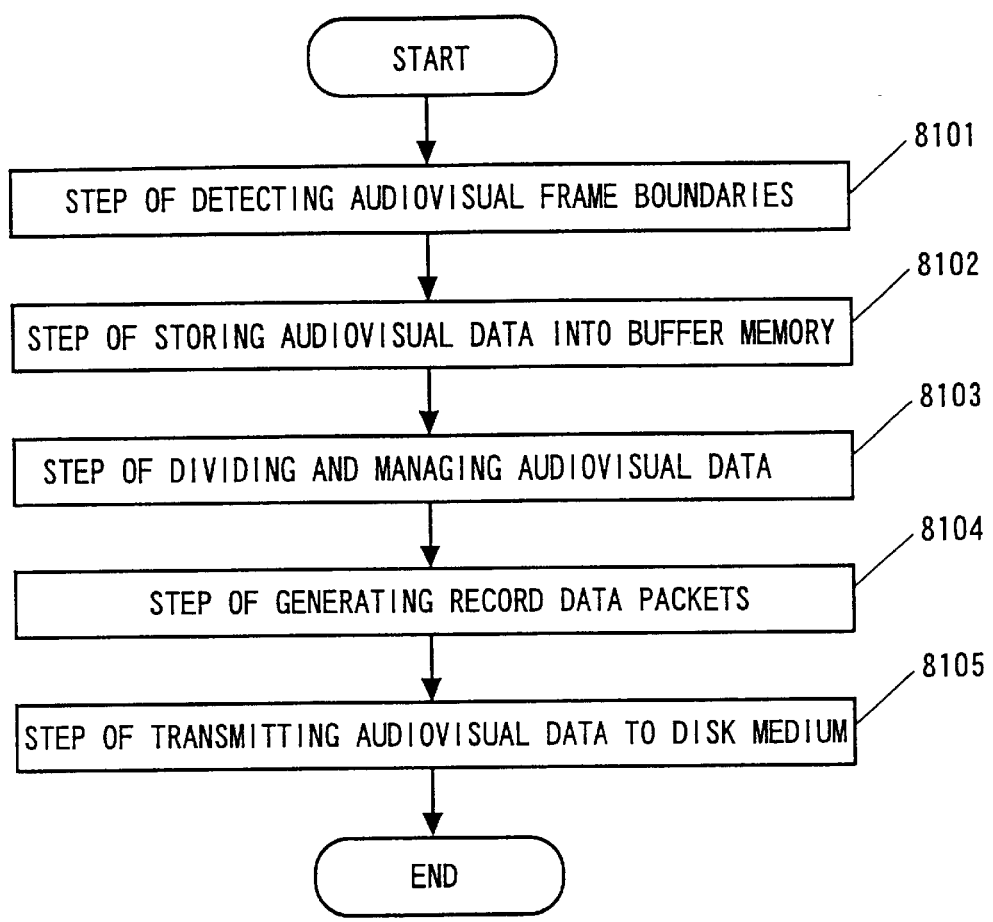
FIG. 81 is a flowchart showing the record processing procedure for a hard disk apparatus in accordance with Embodiment 2 of the present invention.

The record processing procedure of the hard disk apparatus of Embodiment 2 will be described by using the flowchart shown in FIG. 81.

First, at step 8101, audiovisual frame boundaries are detected from the audiovisual data input externally.

Next, as step 8102, the audiovisual data is stored in the buffer memory.

Then, at step 8103, the storage addresses in the buffer memory corresponding to the audiovisual frame boundaries of the audiovisual data are managed, and the audiovisual data in the buffer memory is divided and managed in audiovisual frame units.

Next, at step 8104, predetermined data is added to each audiovisual frame of the audiovisual data, thereby to generate record data packets.

Then, at step 8105, the audiovisual data is transmitted to the magnetic disk 101 in record data packet units.

Next, the playback processing procedure of the hard disk apparatus of Embodiment 2 will be described by using the flowchart shown in FIG. 83.

First, the audiovisual data to be transmitted externally is selected from among the audiovisual data recorded in the magnetic disk 101 in audiovisual frame units.

Next, at step 8302, the selected audiovisual data is read from the magnetic disk 101. At this time, the audiovisual data to be read is read in the record data packet units described in FIG. 81.

Then, at step 8303, audiovisual data to be transmitted externally is extracted from among the audiovisual data read in the record data packet units.

Next, at step 8304, the extracted audiovisual data is stored in the buffer memory.

Next, at step 8305, the audiovisual data stored in the buffer memory is read sequentially to generate continuous stream data.

Then, at step 8306, the stream data is transmitted externally.

The function block operation of the magnetic disk apparatus of Embodiment 2, different from that of the above-mentioned Embodiment 1, will be described below.

Figure 70:
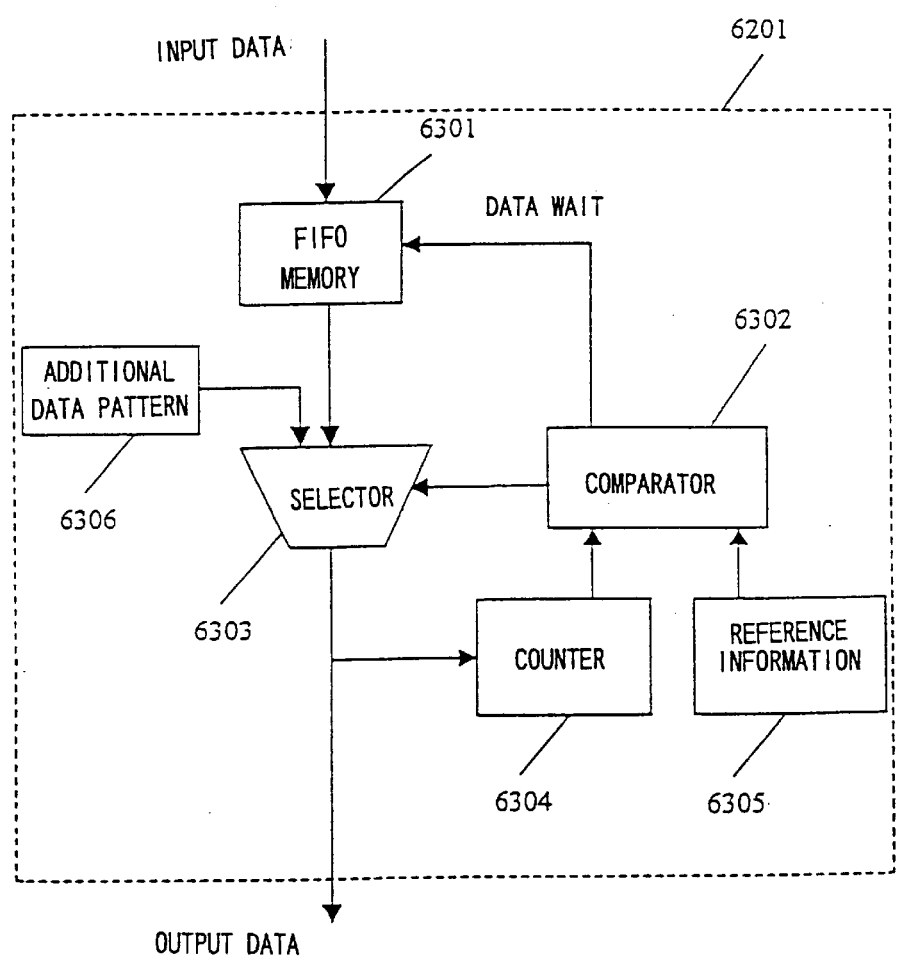
FIG. 70 is a logic circuit diagram showing a data addition circuit in accordance with Embodiment 2 of the present invention.
Figure 71:
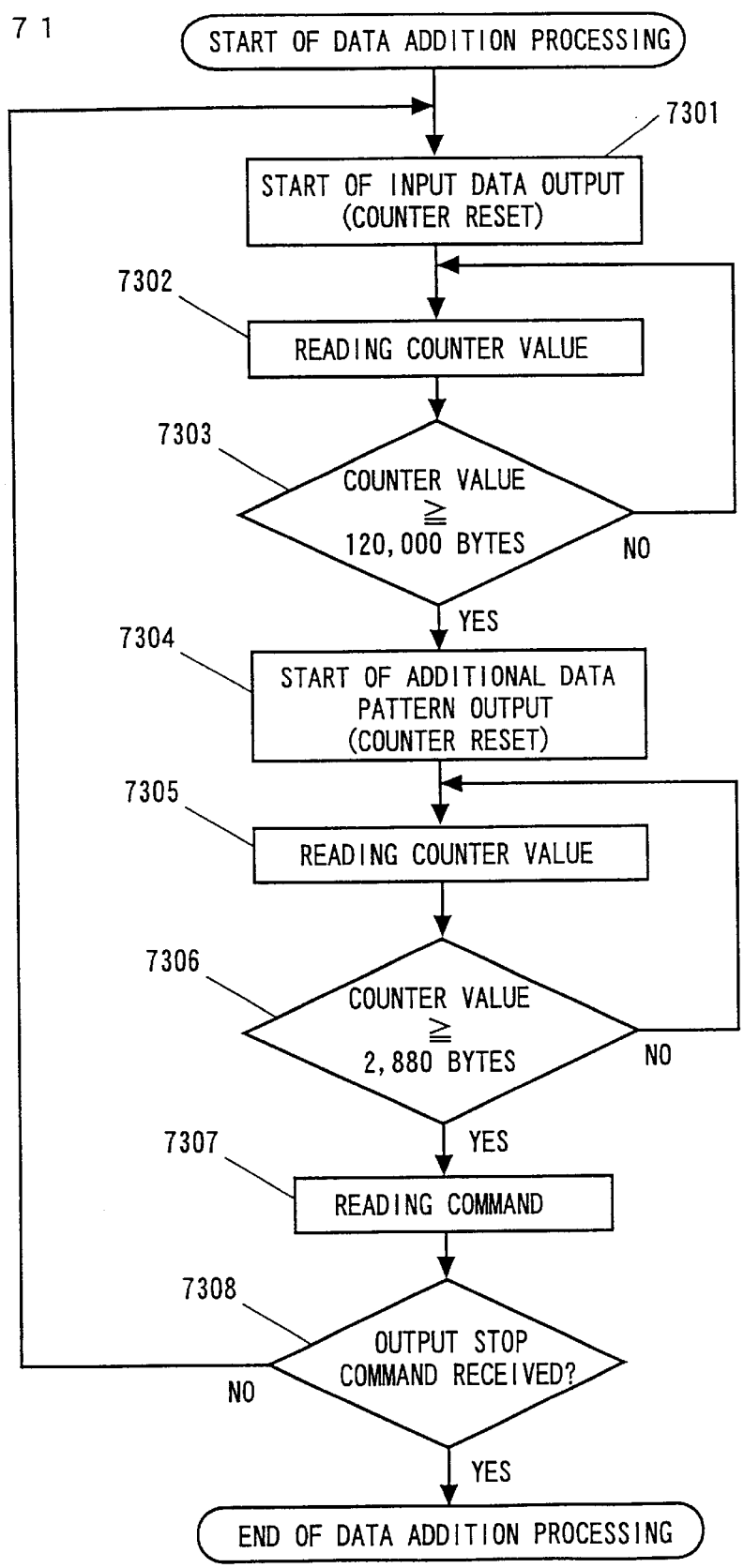
FIG. 71 is a flowchart explaining the operation of the data addition circuit in accordance with Embodiment 2 of the present invention.

FIG. 70 is a block diagram showing the configuration of the data addition circuit 6201 of Embodiment 2. The data addition circuit 6201 starts data addition processing shown in FIG. 71 in accordance with a frame detection signal used as a data output permission signal and transmitted from the AV data processing circuit 112. FIG. 71 is a flowchart showing data addition processing in the data addition circuit 6201.

At the processing step 7301 of FIG. 71, the frame detection signal detected by the AV data processing circuit 112 is input to a FIFO (first-in first-out) memory 6301 together with data.

The frame detection signal output from the FIFO memory 6301 performs synchronous reset processing for a counter 6304 used as an input data counter means. A comparator 6302 outputs an input data selection signal to a selector 6303 in synchronization with this synchronous reset processing.

The selector 6303 starts the output of the input data from the FIFO memory 6301 in synchronization with this input data selection signal. The counter 6304 returns its counter value to 0 in synchronization with the synchronous reset processing, and then counts up in synchronization with the clock.

At the processing step 7302 of FIG. 71, the comparator 6302 reads the counter value of the counter 6304. Next, at judgment step 7303, the comparator 6302 compares the counter value read from the counter 6304 with the amount of data (120,000 bytes) corresponding to the DV format audiovisual frames stored in reference information 6305.

If the counter value is 120,000 bytes or more at judgment step 7303, the sequence advances to processing step 7304. At the processing step 7304, the comparator 6302 outputs a wait signal to make the data output from the FIFO memory 6301 stand by.

The FIFO memory 6301 uses the wait signal as a read enable signal, and does not update the output data while the wait signal is output. Simultaneously, the comparator 6302 outputs input data selection signal to the selector 6303.

The selector 6303 applies synchronous reset to the counter 6304 in accordance with this selection signal, and switches input data to an additional data pattern. The counter 6304 returns its counter value to 0 in synchronization with the synchronous reset, and then counts up in synchronization with the clock.

At processing step 7305, the comparator 6302 reads the counter value of the counter 6304. Next, at judgment step 7306, the comparator 6302 compares the counter value read from the counter 6304 with the amount of data (2,880 bytes) of additional data stored in the reference information 6305.

If the counter value is 2,880 bytes or more, the comparator 6302 reads the data output permission signal from the AV data processing circuit 112 at processing step 7307.

At judgment step 7308, a judgment is made as to whether data output is permitted on the basis of the data output permission signal read by the comparator 6302 or not. When data output from the FIFO memory 6301 is permitted, the sequence returns to processing step 7301, and the counter 6304 undergoes synchronous reset, and an input data selection signal is output to the selector 6303.

The selector 6303 starts outputting input data from the FIFO memory 6301 in synchronization with this input data selection signal. The counter 6304 returns its counter value to 0 in synchronization with the synchronous reset, and then counts up in synchronization with the clock. In this way, the selector 6303 alternatively selects the input data from the FIFO memory 6301 and the additional data pattern in synchronization with the input data selection signal from the comparator 6302.

On the other hand, at judgment step 7308, when an output stop command is received, the data addition processing is ended.

In the magnetic disk apparatus of Embodiment 2, a predetermined amount of additional data is added to the audiovisual frames, and recorded frame data wherein a predetermined amount of additional data is added to the received audiovisual frames is output to the buffer memory 108 and stored.

Figure 72:
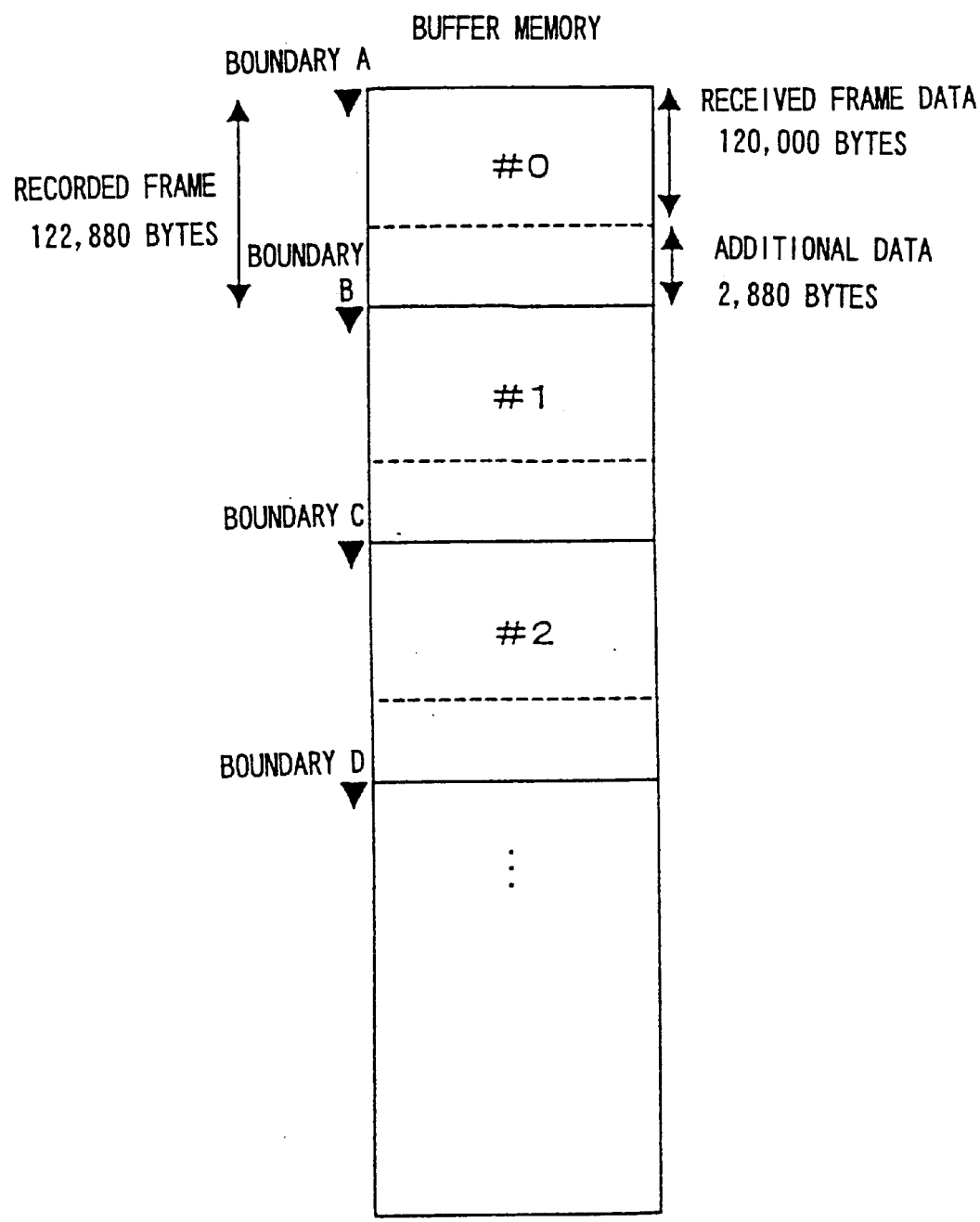
FIG. 72 is an explanatory view showing record frames formed in a buffer memory in accordance with Embodiment 2 of the present invention.

FIG. 72 is an explanatory view showing the data storage condition in the buffer memory 108.

In FIG. 72, 2,880 bytes (stuffing bytes) are added as additional data to the received frame data (120,000 bytes in the case of DV stream) to generate record frame data. The data stored in the buffer memory 108 is transferred and recorded sequentially on the magnetic disk 101 in record frame units.

Embodiment 3

Figure 73:
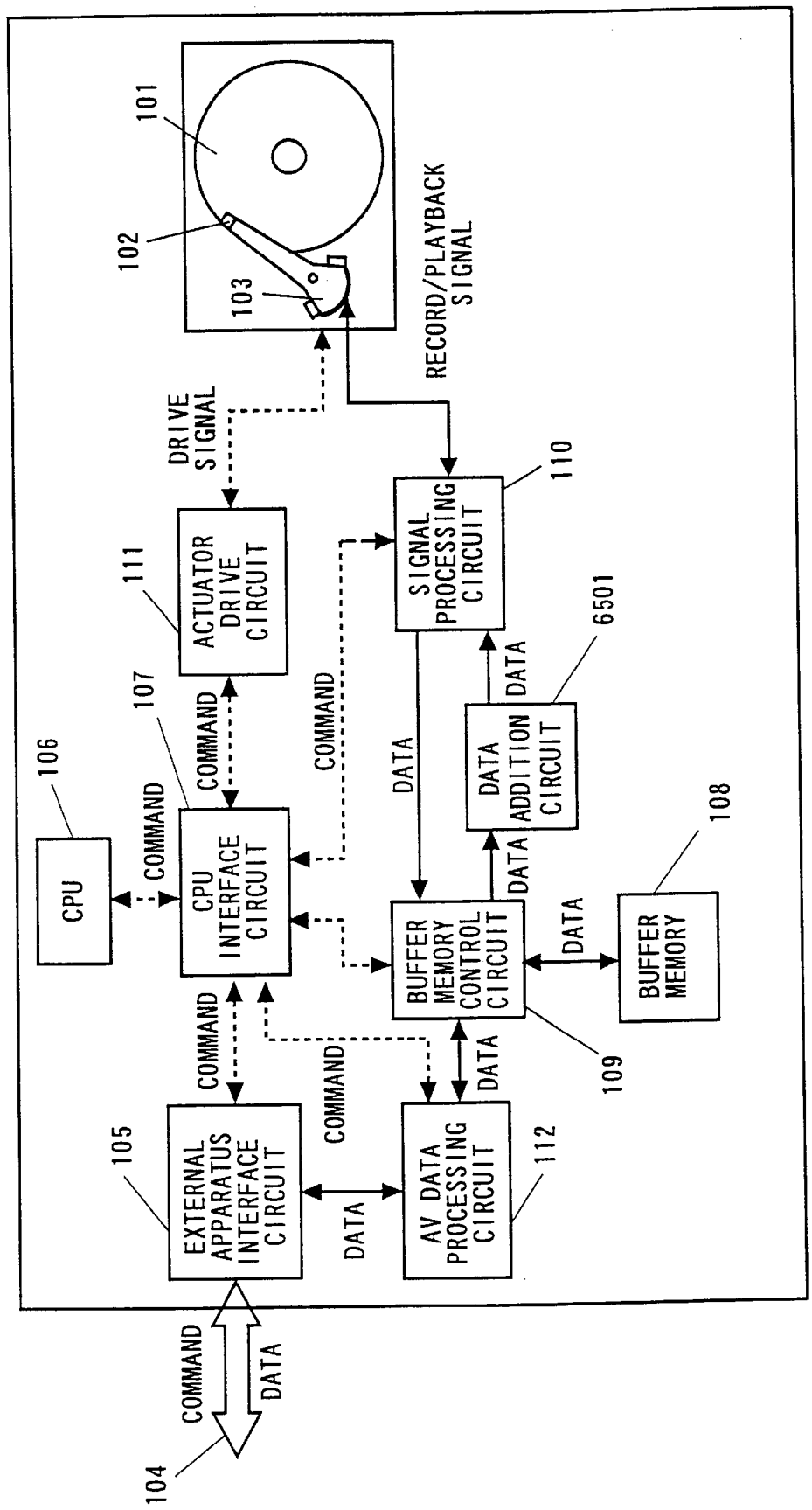
FIG. 73 is a block diagram showing the configuration of a magnetic disk apparatus in accordance with Embodiment 3 of the present invention.

Next, a magnetic disk apparatus in accordance with Embodiment 3 of the present invention will be described. FIG. 73 is a block diagram showing the configuration of the magnetic disk apparatus of Embodiment 3.

In FIG. 73, the magnetic disk apparatus of Embodiment 3 has a CPU 106, a CPU interface circuit 107 for transmitting and receiving commands and data to and from the CPU 106, a buffer memory 108 used as a temporary storage circuit, and a buffer memory control circuit 109 for controlling data input/output to the buffer memory 108.

In addition, the magnetic disk apparatus is provided with a signal processing circuit 110 for controlling data input/output to a magnetic disk 101 used as a disk-shaped disk medium, an actuator drive circuit 111 for carrying out the positional control of a magnetic head 102 by applying a drive signal to the positioning mechanism 103, and an AV data processing circuit 112 for carrying out predetermined processing in accordance with audiovisual data received via an external apparatus interface circuit 105.

It is configured that commands and data from an external apparatus are transmitted via an input/output bus 104, and the external apparatus interface circuit 105 carries out transmission and reception of commands, data and parameters between the circuit and the external apparatus via the input/output bus 104. The configurations and functions of these circuits are the same as those of the circuits of the above-mentioned Embodiment 1, and the same reference numbers are assigned to these circuits and the explanations of them are omitted.

The magnetic disk apparatus of Embodiment 3 differs from that of the above-mentioned Embodiment 1 in that a data addition circuit 6501 is provided between the buffer memory control circuit 109 and the signal processing circuit 110 as a data addition means.

In addition, the buffer memory control circuit 109 of Embodiment 3 stores the frame detection signal received from the AV data processing circuit 112, and outputs the frame detection signal and data corresponding to the frame detection signal to the data addition circuit 6501.

Just like the data addition circuit 6201 of the above-mentioned Embodiment 2, the data addition circuit 6501 has the internal configuration shown in FIG. 70, and performs the same operation as that of the data addition circuit 6201 in accordance with the data and the frame detection signal output from the buffer memory control circuit 109.

In Embodiment 3, the counter 6304 shown in FIG. 70 has the function of counting the amount of data output from the buffer memory as an output data counter means. The data addition circuit 6501 of Embodiment 3 internally has the function of outputting 2,880 bytes of predetermined pattern data, as an addition data generation means.

In the magnetic disk apparatus of Embodiment 3, when the REC command is input from the external apparatus, the external apparatus interface circuit 105 and the AV data processing circuit 112 perform the same record processing as that of the above-mentioned Embodiment 1.

Figure 74:
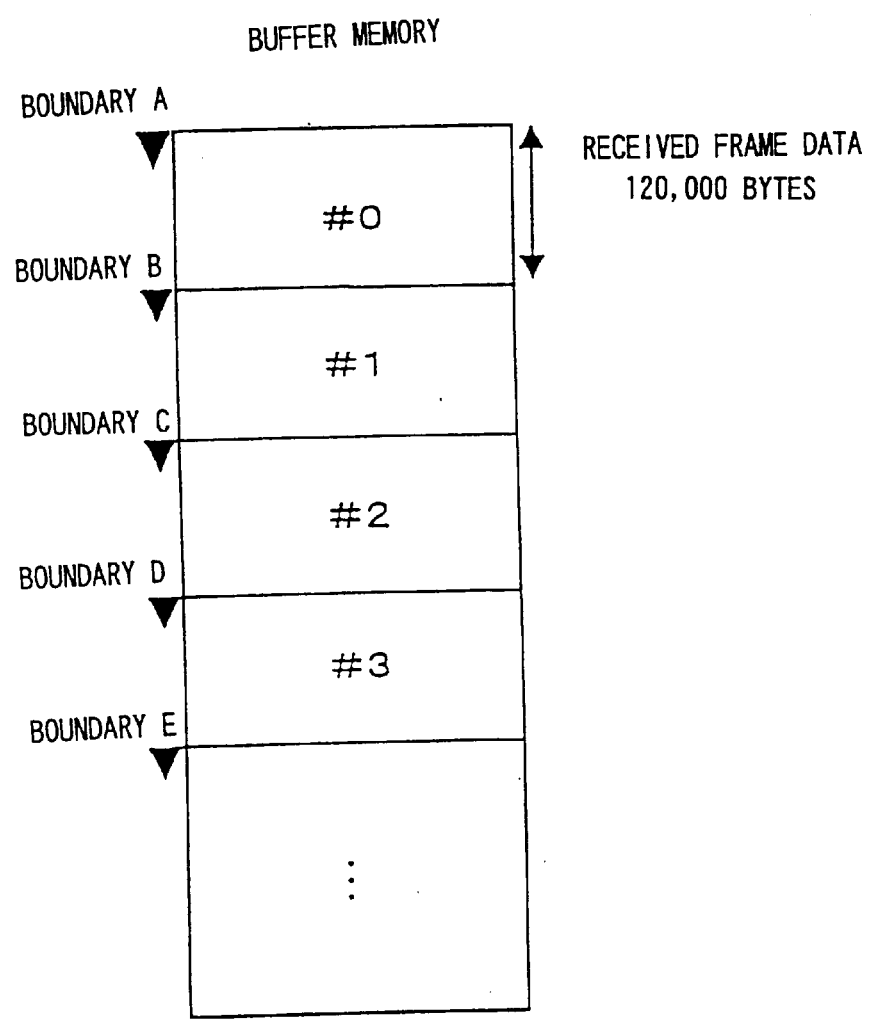
FIG. 74 is a view showing the placement of audiovisual frame data in a buffer memory in accordance with Embodiment 3 of the present invention.

FIG. 74 is an explanatory view showing the data storage condition in the buffer memory 108 of Embodiment 3. In the buffer memory 108, received audiovisual frames (120,000 bytes) are stored sequentially (#0, #1, #2, . . . ) as shown in FIG. 74.

The audiovisual frame data stored in the buffer memory 108 is sequentially transferred from the frame address corresponding to the boundary A. For example, the data addition circuit 6501 counts 120,000 bytes of data in the audiovisual frame #0, and then performs input signal switching, thereby to output 2,880 bytes of predetermined pattern data.

Figure 75:
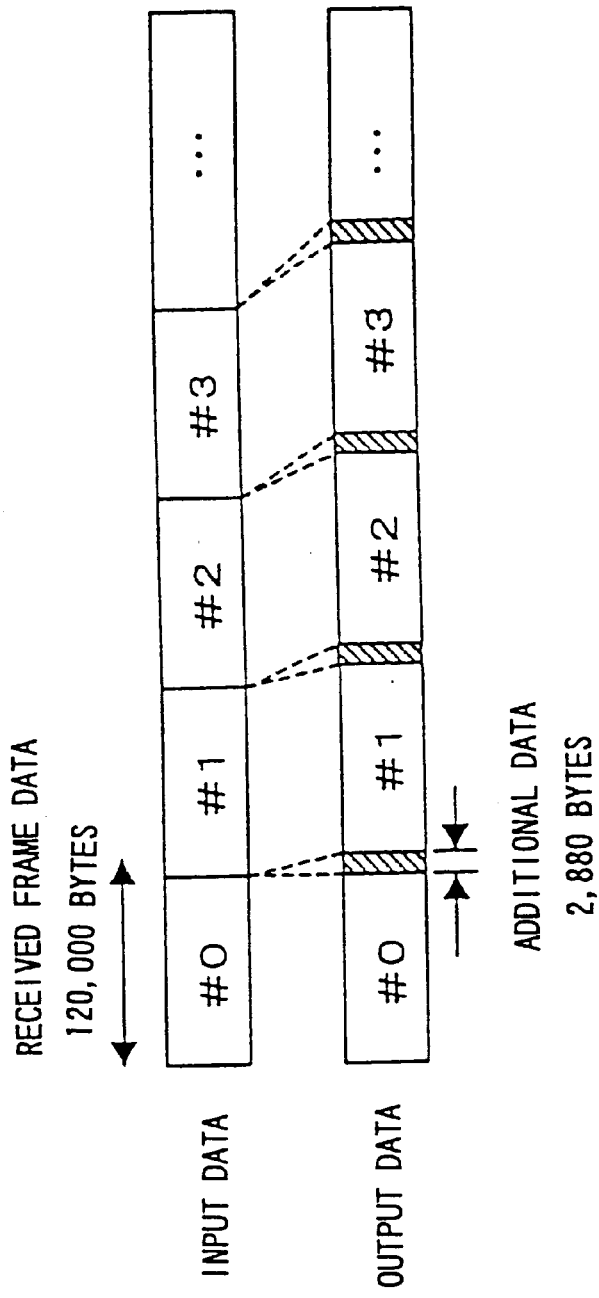
FIG. 75 is an explanatory view showing the input/output data of a data addition circuit in accordance with Embodiment 3 of the present invention.

By repeating the above-mentioned processing in audiovisual frame units, the data shown above in FIG. 75 is input so that the output data indicated below is output to the signal processing circuit 110. FIG. 75 shows data input to and output from the data addition circuit 6501, and also shows that 2,880 bytes of additional data is added to each piece of audiovisual frame data (120,000 bytes).

Therefore, the audiovisual frame data to be output to the magnetic disk 101 has 122,880 bytes; this corresponds to 240 sectors and is stored in the magnetic disk 101 in sector units.

Since the magnetic disk apparatus of Embodiment 3 is provided with the data addition circuit 6501 as described above, data capable of being quantized for each audiovisual frame in sector units can be recorded on the magnetic disk 101.

Embodiment 4

Next, a magnetic disk apparatus in accordance with Embodiment 4 of the present invention will be described. The configuration of the magnetic disk apparatus of Embodiment 4 is the same as the configuration of Embodiment 1. Therefore, the following explanation is given by using FIG. 1.

Figure 76:
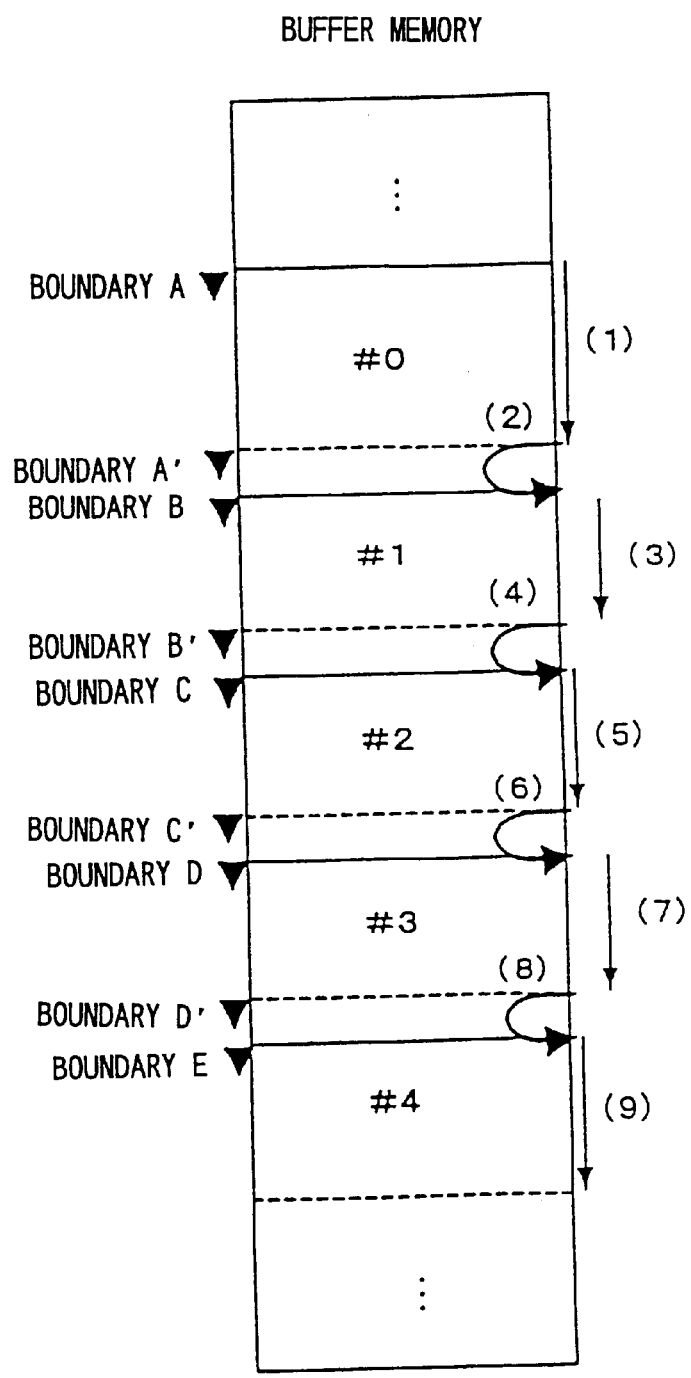
FIG. 76 is a view showing the placement of frames in a buffer memory in accordance with Embodiment 4 of the present invention.

In the magnetic disk apparatus of Embodiment 4, just like the magnetic disk apparatus of the above-mentioned Embodiment 1, DV format audiovisual data having been input from an external apparatus is input continuously to the buffer memory 108. The placement of the audiovisual data stored in the buffer memory 108 is as shown in FIG. 76. FIG. 76 is a view explaining the storage condition of the audiovisual data in the magnetic disk apparatus of Embodiment 4.

The AV data processing circuit 112 detects the audiovisual frame boundaries of audiovisual data, and issues a notice to the CPU 106. The CPU 106 performs the following processing in accordance with the frame boundary detection notice from the AV data processing circuit 112.

First, address skip setting from the boundary A' to the boundary B is performed to the AV data processing circuit 112 in accordance with the detection notice for the head header (boundary A) of the audiovisual frame #0 (FIG. 76). Therefore, the AV data processing circuit 112 performs the same operation as that of the above-mentioned Embodiment 1 to store data for one audiovisual frame from the boundary A to the boundary A', then moves the address pointer to the boundary B, and starts the storage processing of the data of the audiovisual frame #2.

When the AV data processing circuit 112 detects the head header of the audiovisual frame #2, it issues a frame detection notice again to the CPU 106. The CPU 106 performs address skip setting from the boundary B' to the boundary C in accordance with the frame detection notice. In accordance with this skip setting, the AV data processing circuit 112 performs address skip from the boundary B' to the boundary C.

By repeatedly carrying out the above-mentioned processing, record frame data including the received audiovisual frame data and a blank area added thereto can be generated in the buffer memory 108.

The record frame data in the buffer memory 108 is written sequentially on the magnetic disk 101 in frame units.

In the above-mentioned Embodiments 1 to 4, the operation for the audiovisual data wherein one audiovisual frame has 120,000 bytes is described; however, when the data size of one audiovisual frame has a fixed length, the disk apparatus of the present invention can carry out the same processing as those of the above-mentioned Embodiments 1 to 4 in frame units.

Embodiment 5

Next, an audiovisual data processing apparatus 7700 in accordance with Embodiment 5 of the present invention will be described.

Figure 77:
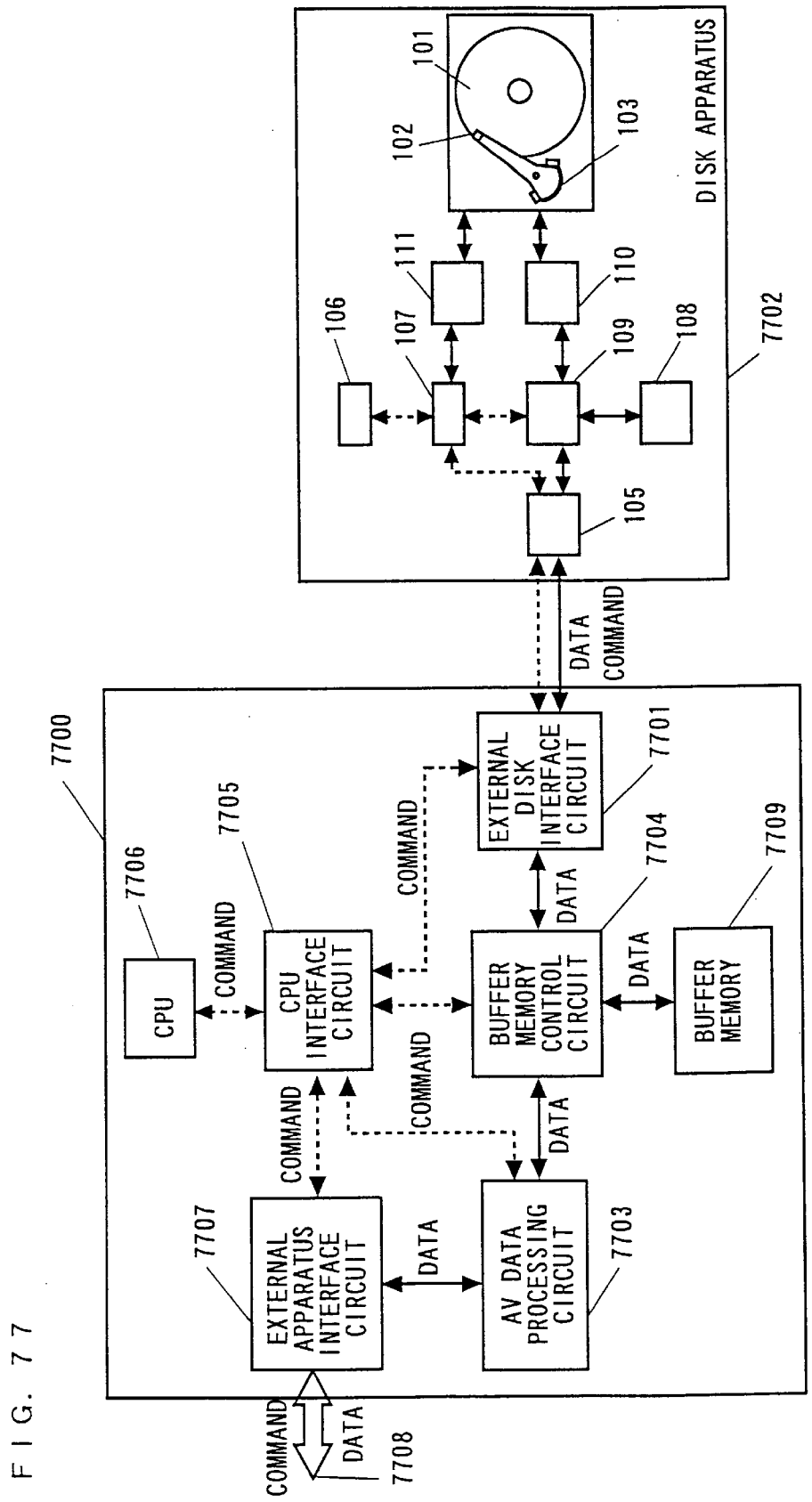
FIG. 77 is a block diagram showing the configuration of an audiovisual data processing apparatus in accordance with Embodiment 5 of the present invention.

FIG. 77 is a block diagram showing the configuration of the audiovisual data processing apparatus 7700 of Embodiment 5.

The audiovisual data processing apparatus 7700 of Embodiment 5 shown in FIG. 77 is connected to an input/output bus 7708 for transmitting commands and data from an external apparatus (not shown), and provided with an external apparatus interface circuit 7707 for receiving and transmitting commands, data and parameters between the circuit and the external apparatus, such as an audiovisual apparatus, via this input/output bus 7708.

As shown in FIG. 77, the audiovisual data processing apparatus 7700 of Embodiment 5 comprises a CPU 7706, a CPU interface circuit 7705 for transmitting and receiving commands and data from the CPU 7706, a buffer memory 7709 used as a temporary storage circuit, and a buffer memory control circuit 7704 used as a buffer memory control means for controlling data input/output to this buffer memory 7709.

The CPU 7706 used as an additional data generation means has a function of adding dummy data of a predetermined size to the audiovisual frames of the audiovisual data stored in the buffer memory 7709. Furthermore, the CPU 7706 receives additional information, such as playback direction and playback speed information, in accordance with the PLAY command and the like received from the external apparatus.

The CPU 7706 used as a playback data selection means has a function of selecting audiovisual data to be transmitted externally in accordance with the additional information in audiovisual frame units. Furthermore, the CPU 7706 used as a stream data selection means carries out control to select the audiovisual data stored in the buffer memory 7709 in audiovisual frame units and to transmit the data to the external apparatus as continuous data.

Furthermore, the CPU 7706 used as a data extraction means has a function of extracting and selecting only the data to be transmitted to the external apparatus from among the audiovisual data stored in the buffer memory 7709, and of continuously transmitting the data to the external apparatus.

Furthermore, the audiovisual data processing apparatus 7700 of Embodiment 5 is provided with an AV data processing circuit 7703 for carrying out predetermined processing in accordance with the audiovisual data received via the external apparatus interface circuit 7707.

The AV data processing circuit 7703 used as a data division management means has a function of managing the frame boundary information of audiovisual data, and notifies the frame boundary information to the CPU 7706. In Embodiment 5, the AV data processing circuit 7703 manages the storage addresses in the buffer memory corresponding to the head data of the audiovisual frames of the audiovisual data as frame boundary information.

Furthermore, the audiovisual data processing apparatus 7700 of Embodiment 5 is provided with an external apparatus interface circuit 7701 for transmitting audiovisual data to an external disk apparatus 7702, such as a hard disk apparatus.

The disk apparatus 7702 connected to the audiovisual data processing apparatus 7700 has writing means and reading means, such as a signal processing circuit 110, a positioning mechanism 103, a magnetic head 102 and an actuator drive circuit 111, and has a function of writing audiovisual data on a disk medium and a function of reading the data from the disk medium.

The disk apparatus 7702 connected to the audiovisual data processing apparatus 7700 of Embodiment 5 is assumed to be the disk apparatus 7702 having been used conventionally and generally. Therefore, the disk apparatus 7702 is not provided with the AV data processing circuit 112 for processing audiovisual data described in Embodiment 1.

The audiovisual data processing apparatus 7700 of Embodiment 5 is configured as the audiovisual data processing apparatus 7700 by extracting the circuit portions for processing audiovisual data from the disk apparatus of Embodiment 1.

This audiovisual data processing apparatus 7700 is connected to the disk apparatus 7702 having been used conventionally and generally, and carries out the same processing as the audiovisual data record/playback processing described in Embodiment 1. Therefore, in Embodiment 5, the explanation of the audiovisual data record/playback processing is omitted.

As described above, the magnetic disk 101 used as a recording medium, the actuator drive circuit 111 and the signal processing circuit 110 are not provided for the audiovisual data processing apparatus 7700 of Embodiment 5, unlike the configuration of the disk apparatus of the above-mentioned Embodiment 1; instead of them, the external disk interface circuit 7701 is provided to carry out interface control to the disk apparatus 7702.

As described above, the audiovisual data processing apparatus of Embodiment 5 is configured so that the conventional disk apparatus 7702 is connected to the audiovisual data processing apparatus and so that the same processing as the audiovisual data processing in the above-mentioned Embodiment 1 can be performed via the external disk interface circuit 7701 and the external apparatus interface circuit 7707.

The audiovisual-data processing apparatus of Embodiment 5 can process audiovisual data input from the external audiovisual apparatus, just like the processing by the disk apparatus of Embodiment 1, can store the data in the external disk apparatus 7702, and can issue commands to the disk apparatus 7702 in response to various requests from the external apparatus.

Therefore, the audiovisual data processing apparatus of Embodiment 5 has the same effect as the effect of the disk apparatus described in the above-mentioned Embodiment 1, and can add audiovisual data record/playback processing function to the conventional disk apparatus.

Embodiment 6

Next, an audiovisual data processing apparatus 7800 in accordance with Embodiment 6 of the present invention will be described.

Figure 78:
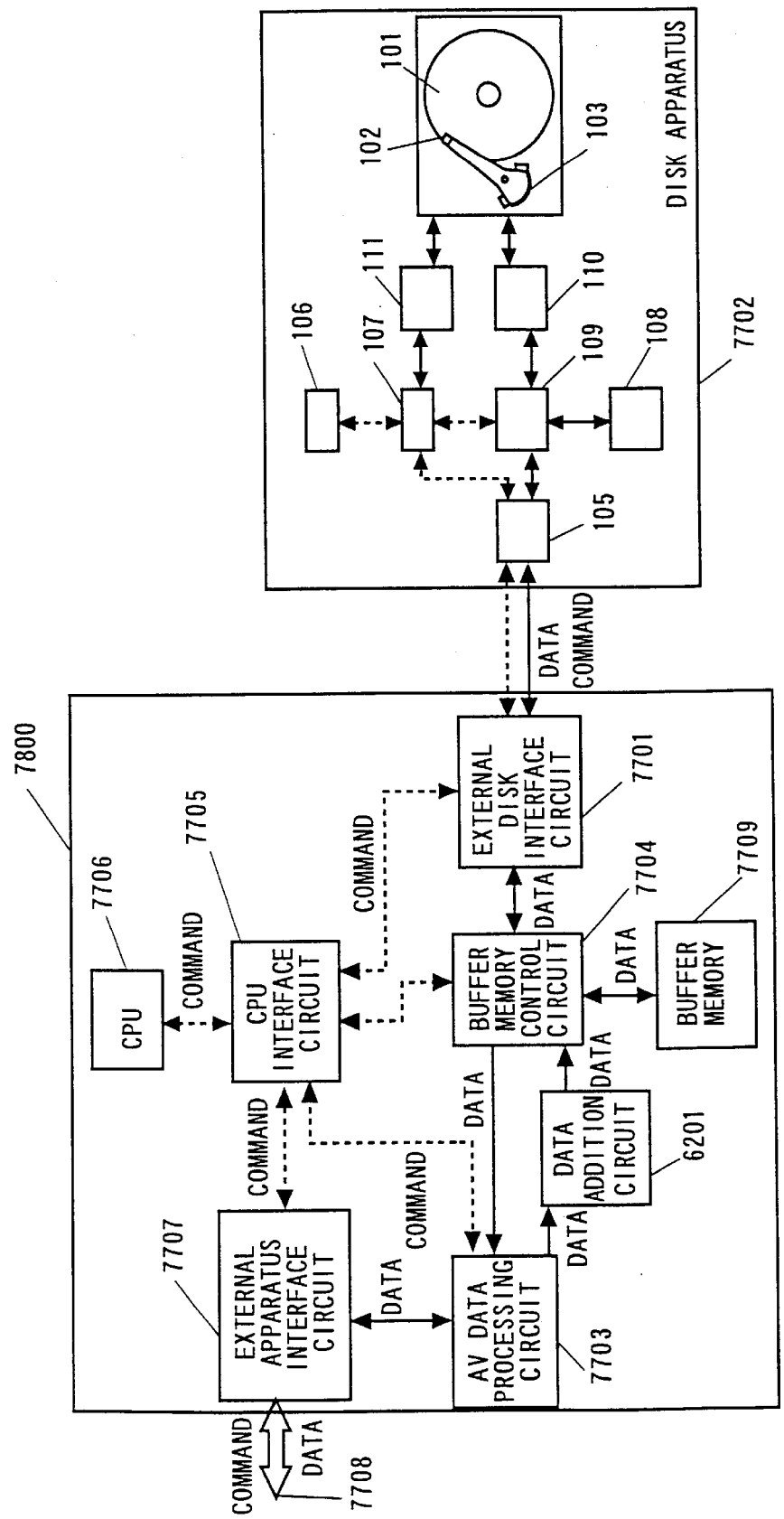
FIG. 78 is a block diagram showing the configuration of an audiovisual data processing apparatus in accordance with Embodiment 6 of the present invention.

FIG. 78 is a block diagram showing the configuration of the audiovisual data processing apparatus 7800 of Embodiment 6.

In FIG. 78, the audiovisual data processing apparatus 7800 of Embodiment 6 comprises a CPU 7706, a CPU interface circuit 7707 for receiving/transmitting commands and data from this CPU 7706, a buffer memory 7709 used as a temporary storage circuit and a buffer memory control circuit 7704 for controlling data input/output to this buffer memory 7709.

Furthermore, the audiovisual data processing apparatus 7800 of Embodiment 6 is provided with an AV data processing circuit 7703 for carrying out predetermined processing in accordance with the audiovisual data received via the external apparatus interface circuit 7707.

It is configured that commands and data from an external apparatus, such as an audiovisual apparatus, is transmitted by an input/output bus 7708, and the external apparatus interface circuit 7707 receives and transmits commands, data and parameters between the circuit and the external apparatus via the input/output bus 7708. The configurations and functions of these circuits are the same as those of the circuits of Embodiment 2 shown in FIG. 69 and Embodiment 5; therefore, their explanations are omitted.

The audiovisual data processing apparatus 7800 of Embodiment 6 is provided with an external disk interface circuit 7701 for transmitting audiovisual data to an external disk apparatus 7702, such as a hard disk apparatus.

The disk apparatus 7702 connected to this audiovisual data processing apparatus has writing means and reading means, such as a signal processing circuit 110, a positioning mechanism 103, a magnetic head 102 and an actuator drive circuit 111, and has a function of writing audiovisual data on a magnetic disk 101 and a function of reading the data from the magnetic disk.

The audiovisual data processing apparatus 7800 of Embodiment 6 differs from the audiovisual data processing apparatus 7700 of the above-mentioned Embodiment 5 in that a data addition circuit 6201 is provided as a data addition means between the AV data processing circuit 7703 and the buffer memory control circuit 7704.

As described above, the audiovisual data processing apparatus 7800 of Embodiment 6 is configured as the audiovisual data processing apparatus 7800 by extracting the circuit portions for processing audiovisual data from the disk apparatus shown in the above-mentioned Embodiment 2, and is configured to be used in connection to the disk apparatus 7702 having been used conventionally and generally.

The disk apparatus 7702 connected to the audiovisual data processing apparatus 7800 is assumed to be a disk apparatus having been used conventionally and generally. Therefore, the disk apparatus 7702 is not provided with the AV data processing circuit 112 for processing audiovisual data described in Embodiment 2.

The audiovisual data processing apparatus 7800 of Embodiment 6 is connected to the disk apparatus 7702 having been used conventionally and generally, and carries out the same processing as the audiovisual data record/playback processing described in Embodiment 2. Therefore, in Embodiment 6, the explanation of the audiovisual data record/playback processing is omitted.

As described above, the magnetic disk 101 used as a recording medium, the actuator drive circuit 111 and the signal processing circuit 110 are not provided for the audiovisual data processing apparatus 7800 of Embodiment 6, unlike the configuration of the disk apparatus of the above-mentioned Embodiment 2; instead of them, the external disk interface circuit 7701 is provided to carry out interface control to the disk apparatus 7702.

As described above, the audiovisual data processing apparatus 7800 of Embodiment 6 is configured so that the conventional disk apparatus 7702 is connected to the external apparatus and so that the same processing as the audiovisual data processing in the above-mentioned Embodiment 2 can be performed via the external disk interface circuit 7701 and the external apparatus interface circuit 7707.

The audiovisual data processing apparatus 7800 of Embodiment 6 can process audiovisual data input from the external audiovisual apparatus, just like the processing by the disk apparatus of Embodiment 2, can store the data in the external disk apparatus 7702, and can issue commands to the disk apparatus 7702 in response to various requests from the external apparatus.

Therefore, the audiovisual data processing apparatus 7800 of Embodiment 6 has the same effect as the effect of the disk apparatus described in the above-mentioned Embodiment 2, and can add audiovisual data record/playback processing function to the conventional disk apparatus.

Embodiment 7

Next, an audiovisual data processing apparatus 7900 in accordance with Embodiment 7 of the present invention will be described.

Figure 79:
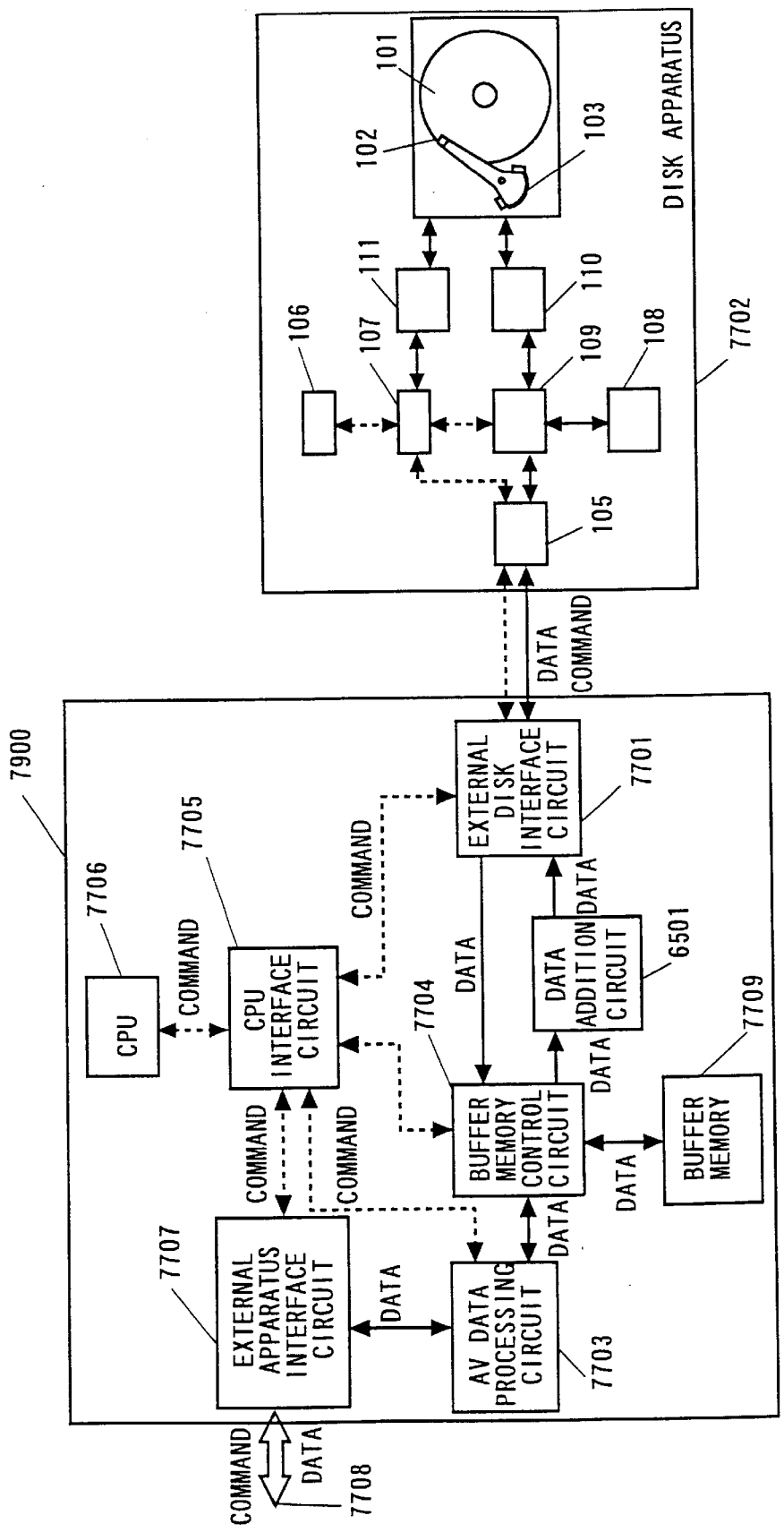
FIG. 79 is a block diagram showing the configuration of an audiovisual data processing apparatus in accordance with Embodiment 7 of the present invention.

FIG. 79 is a block diagram showing the configuration of the audiovisual data processing apparatus 7900 of Embodiment 7.

In FIG. 79, the audiovisual data processing apparatus 7900 of Embodiment 7 comprises a CPU 7706, a CPU interface circuit 7705 for receiving/transmitting commands and data from this CPU 7706, a buffer memory 7709 used as a temporary storage circuit and a buffer memory control circuit 7704 for controlling data input/output to this buffer memory 7709.

Furthermore, the audiovisual data processing apparatus 7900 of Embodiment 7 is provided with an AV data processing circuit 7703 for carrying out predetermined processing in accordance with the audiovisual data received via the external apparatus interface circuit 7707.

It is configured that commands and data from an external apparatus, such as an audiovisual apparatus, is transmitted by an input/output bus 7708, and the external apparatus interface circuit 7707 receives and transmits commands, data and parameters between the circuit and the external apparatus via the input/output bus 7708. The configurations and functions of these circuits are the same as those of the circuits of Embodiment 3 shown in FIG. 73, Embodiment 5 and Embodiment 6; therefore, their explanations are omitted.

The audiovisual data processing apparatus 7900 of Embodiment 7 differs from the audiovisual data processing apparatus of the above-mentioned Embodiment 5 in that a data addition circuit 6501 is provided as a data addition means between the buffer memory control circuit 7704 and an external disk interface circuit 7701.

As described above, the audiovisual data processing apparatus 7900 of Embodiment 7 is configured as the audiovisual data processing apparatus 7900 by extracting the circuit portions for processing audiovisual data from the disk apparatus shown in the above-mentioned Embodiment 3, and is configured to be used in connection to the disk apparatus 7702 having been used conventionally and generally.

The disk apparatus 7702 connected to the audiovisual data processing apparatus 7900 is assumed to be a disk apparatus having been used conventionally and generally. Therefore, the disk apparatus 7702 is not provided with the AV data processing circuit 112 for processing audiovisual data described in Embodiment 3.

The audiovisual data processing apparatus 7900 of Embodiment 7 is connected to the disk apparatus 7702 having been used conventionally and generally, and carries out the same processing as the audiovisual data record/playback processing described in Embodiment 3. Therefore, in Embodiment 7, the explanation of the audiovisual data record/playback processing is omitted.

As described above, the magnetic disk 101 used as a recording medium, the actuator drive circuit 111 and the signal processing circuit 110 are not provided for the audiovisual data processing apparatus 7900 of Embodiment 7, unlike the configuration of the disk apparatus of the above-mentioned Embodiment 3; instead of them, the external disk interface circuit 7701 is provided to carry out interface control to the disk apparatus 7702.

As described above, the audiovisual data processing apparatus 7900 of Embodiment 7 is configured so that the conventional disk apparatus 7702 is connected to the external apparatus and so that the same processing as the audiovisual data processing in the above-mentioned Embodiment 3 can be performed via the external disk interface circuit 7701 and the external apparatus interface circuit 7707.

The audiovisual data processing apparatus 7900 of Embodiment 7 can process audiovisual data input from the external audiovisual apparatus, just like the processing by the disk apparatus of Embodiment 3, can store the data in the external disk apparatus 7702, and can issue commands to the disk apparatus 7702 in response to various requests from the external apparatus.

Therefore, the audiovisual data processing apparatus 7900 of Embodiment 7 has the same effect as the effect of the disk apparatus described in the above-mentioned Embodiment 3, and can add audiovisual data record/playback processing function to the conventional disk apparatus.

Embodiment 8

Next, an audiovisual data processing apparatus in accordance with Embodiment 8 of the present invention will be described. The audiovisual data processing apparatus of Embodiment 8 has the same configuration as that of the audiovisual data processing apparatus of Embodiment 5 shown in FIG. 77.

The audiovisual data processing apparatus of Embodiment 8 is configured as the audiovisual data processing apparatus by extracting the circuit portions for processing audiovisual data from the magnetic disk apparatus of the above-mentioned Embodiment 4. The audiovisual data processing apparatus of Embodiment 8 is configured so that a disk apparatus having been used conventionally and generally can be connected thereto.

The configuration of the audiovisual data processing apparatus of Embodiment 8 is the same as the configuration of Embodiment 5, and its operation is the same as the operation of Embodiment 4; therefore, the following explanation is given by using FIGS. 76 and 77.

In the audiovisual data processing apparatus of Embodiment 8, just like the audiovisual data processing apparatus of the above-mentioned Embodiment 5, DV format audiovisual data having been input from the external apparatus is input continuously to the buffer memory 7709.

The placement of the audiovisual data stored in the buffer memory 7709 is as shown in FIG. 76. FIG. 76 is a view explaining the storage condition of the audiovisual data in the magnetic disk apparatus of Embodiment 4.

The AV data processing circuit 7703 detects the audiovisual frame boundaries of audiovisual data, and issues a notice to the CPU 7706. The CPU 7706 performs the following processing in accordance with the frame boundary detection notice from the AV data processing circuit 7703.

First, address skip setting from the boundary A' to the boundary B is performed to the AV data processing circuit 7703 in accordance with the detection notice for the head header (boundary A) of the audiovisual frame #0 (FIG. 76). Therefore, the AV data processing circuit 7703 performs the same operation as that of the above-mentioned Embodiment 5 to store data for one audiovisual frame from the boundary A to the boundary A', then moves the address pointer to the boundary B, and starts the storage processing of the data of the audiovisual frame #2.

When the AV data processing circuit 7703 detects the head header of the audiovisual frame #2, it issues a frame detection notice again to the CPU 7706. The CPU 7706 performs address skip setting from the boundary B' to the boundary C in accordance with the frame detection notice. In accordance with this skip setting, the AV data processing circuit 7703 performs address skip from the boundary B' to the boundary C.

By repeatedly carrying out the above-mentioned processing, record frame data including the received audiovisual frame data and a blank area added thereto can be generated in the buffer memory 7709.

The record frame data in the buffer memory 7709 is transmitted from the external disk interface circuit 7701 to the disk apparatus 7702. The record frame data transmitted from the audiovisual data processing apparatus is written sequentially to the magnetic disk 101 of the disk apparatus 7702 in frame units.

As described above, the audiovisual data processing apparatus of Embodiment 8 is configured so that audiovisual data from an audiovisual apparatus is processed and transmitted to the disk apparatus 7702 via the external disk interface circuit 7701, and then recorded and played back.

In the above-mentioned Embodiments 5, 6, 7 and 8, the operation for the audiovisual data wherein one audiovisual frame has 120,000 bytes is described; however, when the data size of one audiovisual frame has a fixed length, the audiovisual data processing apparatus of the present invention can carry out the same processing as those of the above-mentioned Embodiments 5, 6, 7 and 8 in frame units.

As clarified from the above-mentioned detailed descriptions of Embodiments, the present invention has the following effects.

According to the present invention, it is possible to provide a disk apparatus, an audiovisual data processing apparatus and an audiovisual control method having functions of dividing and processing stream data, i.e., audiovisual data, in audiovisual frame units and processing various commands in digital VCRs and being capable of meeting various processing requests for stream data from an external apparatus.

The disk apparatus and the audiovisual data processing apparatus of the present invention is provided with audiovisual data processing functions of forming audiovisual frame data so that stream data, i.e., audiovisual data, received from the external apparatus is divided in audiovisual frame units and stored on a disk medium, of forming stream data by combining the audiovisual frame data read from the disk medium, and of continuously transmitting the audiovisual data to the external apparatus, and the like.

The disk apparatus and the audiovisual data processing apparatus of the present invention have audiovisual data processing functions as described above, whereby audiovisual data can be received continuously without requiring execution of command transmission/reception to and from the external apparatus. As a result, according to the present invention, it is possible to obtain a disk apparatus and an audiovisual data processing apparatus having high data transfer efficiency.

Furthermore, according to the present invention, the external apparatus for transmitting audiovisual data to the disk apparatus and the audiovisual processing apparatus is not required to have the function of dividing audiovisual data and the like, whereby audiovisual data processing functions for the external apparatus can be reduced.

The disk apparatus and the audiovisual data processing apparatus in accordance with the present invention is configured to detect the audiovisual frame boundaries of audiovisual data and to divide the audiovisual data received continuously from the external apparatus in accordance with the detected audiovisual frame boundaries in audiovisual frame units, whereby the writing of audiovisual data on a disk medium can be controlled in the divided audiovisual frame units.

As a result, the disk apparatus and the audiovisual data processing apparatus in accordance with the present invention can control the writing of data on the disk medium by using existing technology. Therefore, according to the present invention, it is possible to simplify the control of the writing of audiovisual data received continuously from the external apparatus on the disk medium.

The audiovisual control method in accordance with the present invention is configured to detect the audiovisual frame boundaries of audiovisual data and to divide the audiovisual data received continuously from the external apparatus in accordance with the detected audiovisual frame boundaries in audiovisual frame units, whereby the writing of audiovisual data on a disk medium can be controlled in the divided audiovisual frame units.

Therefore, the audiovisual control method in accordance with the present invention can control the writing of data on the disk medium by using existing technology, whereby it is possible to simplify the control of the writing of audiovisual data received continuously from the external apparatus on the disk medium.

Furthermore, in the disk apparatus, the audiovisual data processing apparatus and the audiovisual control method in accordance with the present invention, audiovisual data can be written on a disk medium in audiovisual frame units at the timing of detecting audiovisual frame boundaries, thereby being effective in that the recording of audiovisual frames on the disk medium can be carried out periodically in the case that the audiovisual frames are received periodically (DV data or the like transmitted to the IEEE 1394 bus). Therefore, in accordance with the present invention, it is possible to simplify record timing control for the disk medium.

Furthermore, in the disk apparatus, the audiovisual data processing apparatus and the audiovisual control method in accordance with the present invention, the audiovisual data recorded on the disk medium in audiovisual frame units is read in audiovisual frame units from the head of the audiovisual frames and transmitted externally, thereby being effective in that a display apparatus connected externally can play back from the head of desired audiovisual frames without causing disturbances in video images.

In the disk apparatus, the audiovisual data processing apparatus and the audiovisual control method in accordance with the present invention, audiovisual data to be transmitted externally is automatically selected in audiovisual frame units from among the audiovisual data recorded on a disk medium in accordance with the playback command from an external apparatus or additional information such as the playback direction and playback speed information corresponding to the playback command, and the playback processing of the selected audiovisual data is carried out continuously.

Therefore, an external apparatus connected to the disk apparatus can play back the audiovisual data stored on the disk medium in the same procedure as that carried out when a playback start command is used for a VCR apparatus, whereby the external apparatus can be provided with the same operability as that of the VCR apparatus.

In the disk apparatus, the audiovisual data processing apparatus and the audiovisual control method in accordance with the present invention, audiovisual data to be transmitted externally is extracted from among the audiovisual data read from a disk medium, thereby being effective in that the writing or reading unit of audiovisual data for the disk medium can be set as desired, and that the writing/reading control for the disk medium can be carried out easily.

In the disk apparatus and the audiovisual data processing apparatus in accordance with the present invention, the CPU can grasp the audiovisual data to be input and output to the disk apparatus in audiovisual frame time units depending on the detection signal output by the audiovisual frame detection means. As a result, the CPU can grasp the amount of data in the buffer memory in real time, whereby data transfer control can be carried out so that the buffer memory does not cause overflow or underflow.

Furthermore, the disk apparatus and the audiovisual data processing apparatus in accordance with the present invention is configured so as to be combined with a frame address management means and the like to grasp frame boundary addresses stored in the buffer memory; therefore, audiovisual frames can be grasped not only in time units but also in data amount units.

As a result, the CPU can gain access to the audiovisual data in the buffer memory in frame units, and can also gain access regardless of the sequence of storage, whereby special playback and the like can be attained easily.

In the disk apparatus, the audiovisual data processing apparatus and the audiovisual control method in accordance with the present invention, the record start address information of the head audiovisual frame data of recorded audiovisual data, the record start address information of the end audiovisual frame data of the recorded audiovisual data and the head address information of the unrecorded area on a disk medium are managed, updated and written in predetermined areas on the disk medium.

Therefore, in accordance with the present invention, the audiovisual data recorded on the disk medium can be managed without using complicated management means. In addition, in the disk apparatus, the audiovisual data processing apparatus and the audiovisual control method of the present invention, the audiovisual data on the disk medium is played back on the basis of the address information, whereby the audiovisual data unrecorded portion on the disk medium can be prevented from being played back.

Furthermore, in accordance with the present invention, by recording audiovisual data on the disk medium on the basis of the address information, additional recording can be carried out continuously without causing unrecorded areas.

Furthermore, the above-mentioned effects can be attained by using software wherein the processing steps of the audiovisual control method are implemented, and the same effects can also be obtained in the case that the steps are implemented as software for computers or as software for microcomputers built in apparatuses.

Industrial Usability

The present invention provides a disk apparatus, an audiovisual data processing apparatus and an audiovisual control method capable of easily recording and playing back audiovisual data by using a hard disk as a video server for carrying out storage, delivery and the like of audiovisual data.

What is claimed is:

1. A disk apparatus comprising:

a disk medium capable of recording/playing back data, a buffer memory for temporarily storing audiovisual data capable of dividing into audiovisual frame units, buffer memory control means for controlling the input/output of said audiovisual data for said buffer memory, audiovisual frame detection means for detecting audiovisual frame boundaries from said audiovisual data and outputting a frame detection signal, transmitted/received data amount calculation means for calculating an amount of audiovisual data stored in said buffer memory in frame units on the basis of said frame detection signal, frame address management means for performing division management of addresses regarding said audiovisual frame boundaries of said audiovisual data stored in said buffer memory as frame address information in accordance with said frame detection signal, and writing means for writing said audiovisual data on said disk medium in accordance with said frame address information.

2. A disk apparatus in accordance with claim 1, wherein said audiovisual frame detection means comprises an audiovisual data comparison means for comparing said audiovisual data with a preset audiovisual frame data pattern, a frame data amount count means for counting an amount of data to be input to said audiovisual data comparison means in audiovisual frame units, and a frame detection signal generation means for judging said frame boundaries on the basis of signals from said audiovisual data comparison means and said frame data amount count means, and thereby generating said frame detection signal.

3. A disk apparatus comprising:

a disk medium capable of recording/playing back data, playback data selection means for selecting said audiovisual data to be output to an external apparatus in audiovisual frame units from among said audiovisual data recorded on said disk medium, reading means for reading said audiovisual data selected by said playback data selection means from said disk medium, a buffer memory for temporarily storing audiovisual data in audiovisual frame units read from said disk medium, buffer memory control means for controlling input/output of said audiovisual data read from said disk medium for said buffer memory, and stream data selection means for generating stream data by selecting the data stored in said buffer memory in audiovisual frame units.

4. A disk apparatus in accordance with claim 3, wherein said stream data selection means generates stream data by combining said audiovisual data in said buffer memory in audiovisual frame units at plural times, and outputs said stream data continuously to an external apparatus.

5. A disk apparatus in accordance with claim 3, wherein said playback data selection means selects said audiovisual data to be output to an external apparatus in audiovisual frame units from among said audiovisual data recorded in said buffer memory, notifies the storage address in said buffer memory corresponding to said selected audiovisual data to said buffer memory control means, and said buffer memory control means selects said audiovisual data for external output in said buffer memory on the basis of said storage address, outputs said selected audiovisual data.

6. A disk apparatus in accordance with claim 3, wherein said playback data selection means sequentially selects said audiovisual data to be output to an external apparatus in audiovisual frame units from among said audiovisual data recorded on said disk medium, sorts said plural pieces of selected audiovisual frame data in accordance with the placement sequence on said disk medium corresponding thereto, and notifies to said reading means, said reading means reads said audiovisual frame data notified by said playback data selection means in said placement sequence on said disk medium, and transfers to said buffer memory control means, said buffer memory control means stores said audiovisual frame data transferred from said reading means into said buffer memory in the sequence for outputting to an external apparatus, and said stream data selection means sequentially combines said audiovisual frame data in said buffer memory in the sequence for outputting to an external apparatus.

7. A disk apparatus in accordance with claim 3, wherein said playback data selection means thins out and selects said audiovisual data recorded on said disk medium in audiovisual frame units.

8. A disk apparatus in accordance with claim 3, wherein said playback data selection means selects said audiovisual data thinned out from said audiovisual data recorded on said disk medium in audiovisual frame units as data to be output to an external apparatus, and said stream data selection means generates stream data by combining said audiovisual data in said buffer memory in audiovisual frame units at plural times.

9. An audiovisual data processing apparatus comprising:

external disk interface means for controlling record/playback of audiovisual data capable of dividing into audiovisual frame units for a disk apparatus, external audiovisual apparatus interface means for controlling record/playback of said audiovisual data for an audiovisual apparatus, a buffer memory for temporarily storing said audiovisual data, disposed between said external disk interface means and said audiovisual apparatus interface means, buffer memory control means for controlling the input/output of said audiovisual data for said buffer memory, audiovisual frame detection means for detecting audiovisual frame boundaries from said audiovisual data and for outputting a frame detection signal, and transmitted/received data amount calculation means for calculating an amount of audiovisual data stored in said buffer memory in frame units on the basis of said frame detection signal, frame address management means for dividing and managing addresses regarding said audiovisual frame boundaries of the audiovisual data stored in said buffer memory as frame address information in accordance with said frame detection signal, and writing means for writing said audiovisual data on said disk medium in accordance with said frame address information, wherein said external disk interface means is configured to transmit said audiovisual data to said disk apparatus in accordance with said frame address information.

10. An audiovisual data processing apparatus in accordance with claim 9, wherein said audiovisual frame detection means comprises an audiovisual data comparison means for comparing said audiovisual data with a preset audiovisual frame data pattern, a frame data amount count means for counting an amount of data to be input to said audiovisual data comparison means in audiovisual frame units, and a frame detection signal generation means for judging said frame boundaries on the basis of signals from said audiovisual data comparison means and said frame data amount count means, and thereby generating said frame detection signal.

11. An audiovisual data processing apparatus comprising:

external disk interface means for controlling record/playback of audiovisual data capable of dividing into audiovisual frame units for a disk apparatus, external audiovisual apparatus interface means for controlling record/playback of said audiovisual data for an audiovisual apparatus, playback data selection means for selecting said audiovisual data to be transmitted to said external audiovisual apparatus interface means in audiovisual frame units from among said audiovisual data recorded in said disk apparatus, reading means for reading said audiovisual data selected by said playback data selection means from said disk apparatus to said buffer memory via said external disk interface means, a buffer memory for temporarily storing said audiovisual data in audiovisual frame units read from said disk medium, disposed between said external disk interface means and said audiovisual apparatus interface means, buffer memory control means for controlling the input/output of said audiovisual data for said buffer memory, and stream data selection means for generating stream data by selecting the data stored in said buffer memory in audiovisual frame units.

12. An audiovisual data processing apparatus in accordance with claim 11, wherein said playback data selection means selects said audiovisual data thinned out from said audiovisual data recorded on said disk medium in audiovisual frame units as data to be output to an external apparatus, and said stream data selection means generates stream data by combining said audiovisual data in said buffer memory in audiovisual frame units at plural times.

13. An audiovisual control method comprising:

a step of temporarily storing audiovisual data capable of dividing into audiovisual frame units in a buffer memory, a frame detection signal generation step of detecting the audiovisual frame boundaries of said audiovisual data and generating a frame detection signal, a step of calculating an amount of audiovisual data stored in said buffer memory in frame units on the basis of said frame detection signal, a step of performing division management of addresses regarding said audiovisual frame boundaries of the audiovisual data stored in said buffer memory as frame address information in accordance with said frame detection signal, and a step of transmitting said audiovisual data to a disk medium in accordance with management information.

14. An audiovisual control method in accordance with claim 13, wherein said frame detection signal generation step comprises a comparison step of comparing said audiovisual data with a preset audiovisual frame data pattern, a counting step of counting an amount of data to be input to said audiovisual data comparison means in audiovisual frame units, and a frame detection signal generation means for judging said frame boundaries on the basis of signals generated in said comparison step and said counting step, and thereby generating said frame detection signal.

15. An audiovisual control method comprising:

a reading step of reading selected audiovisual data from a disk medium, a step of temporarily storing said audiovisual data read in audiovisual frame units from said disk medium into a buffer memory, and a step of generating stream data by selecting stored audiovisual data in audiovisual frame units.

16. An audiovisual control method in accordance with claim 15, wherein said audiovisual data recorded on said disk medium is thinned out in audiovisual frame units at said reading step, and said audiovisual data in said buffer memory is combined in audiovisual frame units at plural times to generate stream data at the step of outputting said stream data continuously to an external apparatus.

* * * * *